(12) United States Patent
Kuiper et al.

(10) Patent No.: US 9,085,419 B2
(45) Date of Patent: Jul. 21, 2015

(54) REMOVABLE CARTRIDGE CLEANER

(71) Applicant: Flexible Steel Lacing Company, Downers Grove, IL (US)

(72) Inventors: Daniel J. Kuiper, Alto, MI (US); Brett E. DeVries, Comstock Park, MI (US); Gregory Lee Westphall, Naperville, IL (US); Richard W. Gilman, Sparta, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 14/299,888

(22) Filed: Jun. 9, 2014

(65) Prior Publication Data

US 2014/0283358 A1 Sep. 25, 2014

Related U.S. Application Data

(60) Division of application No. 13/035,915, filed on Feb. 25, 2011, now Pat. No. 8,757,360, which is a continuation-in-part of application No. 12/421,988, filed on Apr. 10, 2009, now Pat. No. 7,987,966.

(60) Provisional application No. 61/044,050, filed on Apr. 10, 2008, provisional application No. 61/308,840, filed on Feb. 26, 2010.

(51) Int. Cl.
*B65G 47/00* (2006.01)
*B65G 45/12* (2006.01)
*B65G 45/16* (2006.01)

(52) U.S. Cl.
CPC ................ *B65G 45/12* (2013.01); *B65G 45/16* (2013.01); *Y10T 29/49863* (2015.01)

(58) Field of Classification Search
USPC .......................... 198/617, 496, 497, 498, 499
See application file for complete search history.

(56) References Cited

U.S. PATENT DOCUMENTS

| | | | | |
|---|---|---|---|---|
| 3,631,968 A | * | 1/1972 | Ward | 198/497 |
| 3,656,610 A | * | 4/1972 | McWilliams | 198/499 |
| 3,841,469 A | * | 10/1974 | Scott et al. | 198/617 |
| 4,053,045 A | * | 10/1977 | Reiter | 198/499 |
| 4,182,444 A | * | 1/1980 | Fisher | 198/499 |
| 4,533,037 A | * | 8/1985 | Kerr | 198/499 |
| 4,586,600 A | * | 5/1986 | Lindbeck | 198/499 |
| 4,836,356 A | * | 6/1989 | Mukai et al. | 198/499 |
| 4,915,211 A | * | 4/1990 | Dohmeier | 198/499 |
| 7,308,980 B2 | * | 12/2007 | Peterson et al. | 198/617 |
| 8,485,344 B1 | * | 7/2013 | Liland | 198/499 |
| 2005/0121294 A1 | * | 6/2005 | Finger et al. | 198/499 |
| 2006/0108201 A1 | * | 5/2006 | Swinderman | 198/499 |
| 2006/0131136 A1 | * | 6/2006 | Smith et al. | 198/499 |
| 2008/0251358 A1 | * | 10/2008 | Thew | 198/499 |
| 2009/0173599 A1 | * | 7/2009 | Khanania | 198/617 |

* cited by examiner

*Primary Examiner* — Joseph Dillon, Jr.
(74) *Attorney, Agent, or Firm* — Fitch, Even, Tabin & Flannery LLP

(57) ABSTRACT

A removable cartridge cleaner assembly is provided that has an insertion device for ease in installing an elongate cartridge assembly carrying belt cleaner assemblies onto an elongate support extending across a conveyor belt in an operative position thereon. In one form, an elongate lever handle pivotally connected to the elongate cartridge assembly can be used to generate a leveraged insertion force, preferably by an operator that does not need to reach into the operating envelope of the conveyor system, e.g. beyond tensioning mechanisms or under the belt. The handle and the cartridge assembly can have an over-center locking mechanism therebetween for providing the operator tactile feedback as to when pivoting of the lever handle has caused the cartridge assembly to be shifted to its operative position on the support.

7 Claims, 50 Drawing Sheets

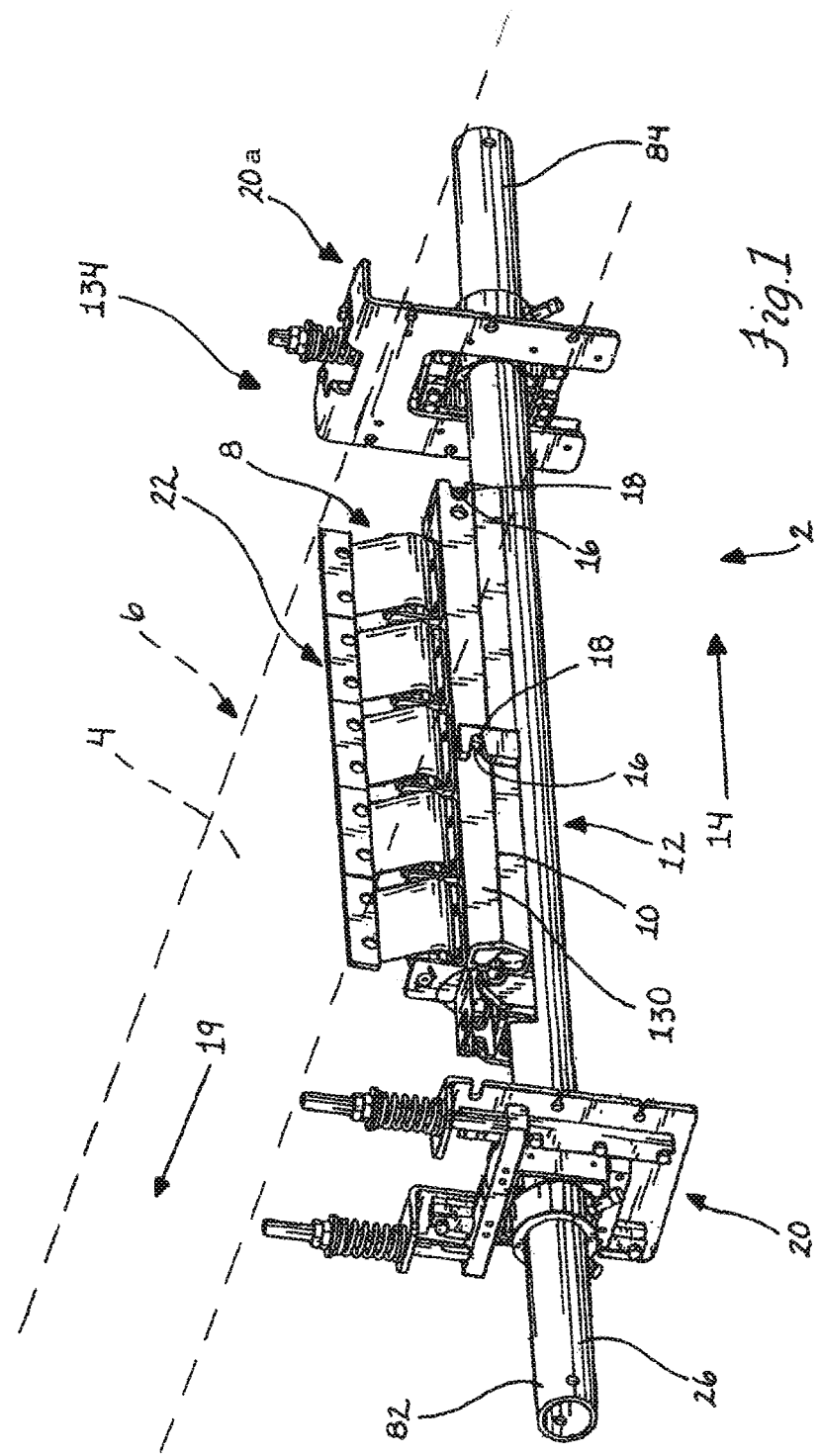

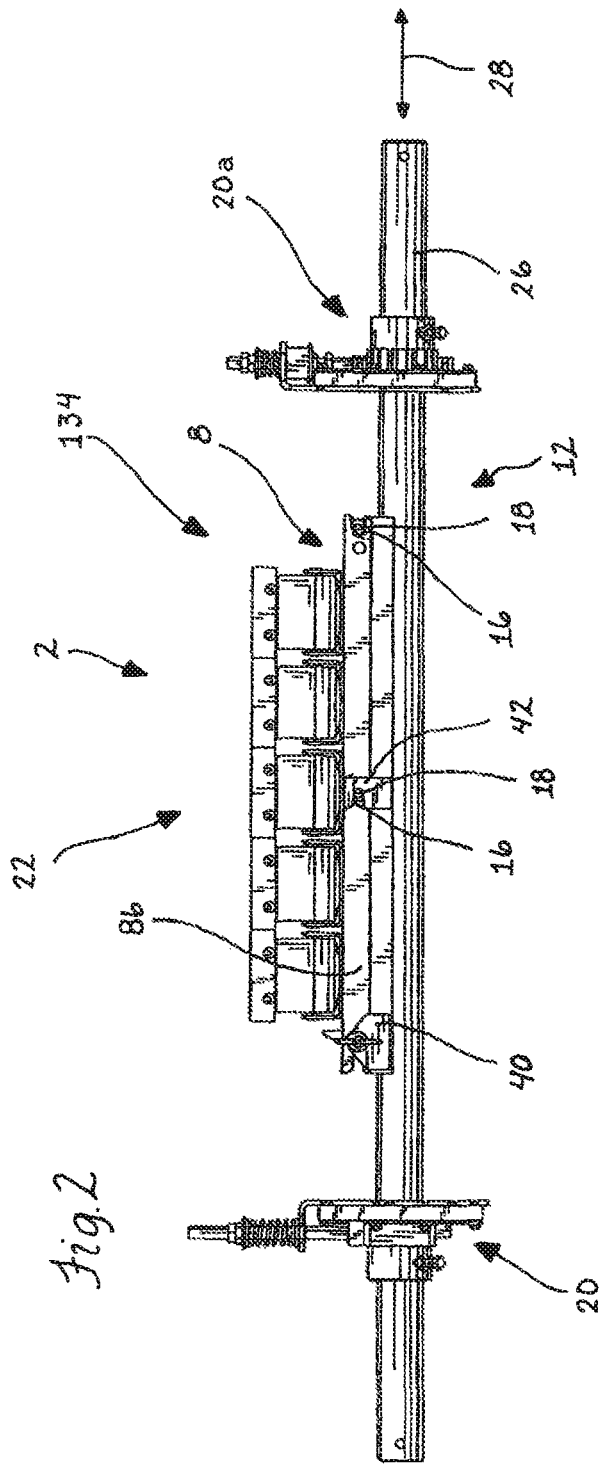

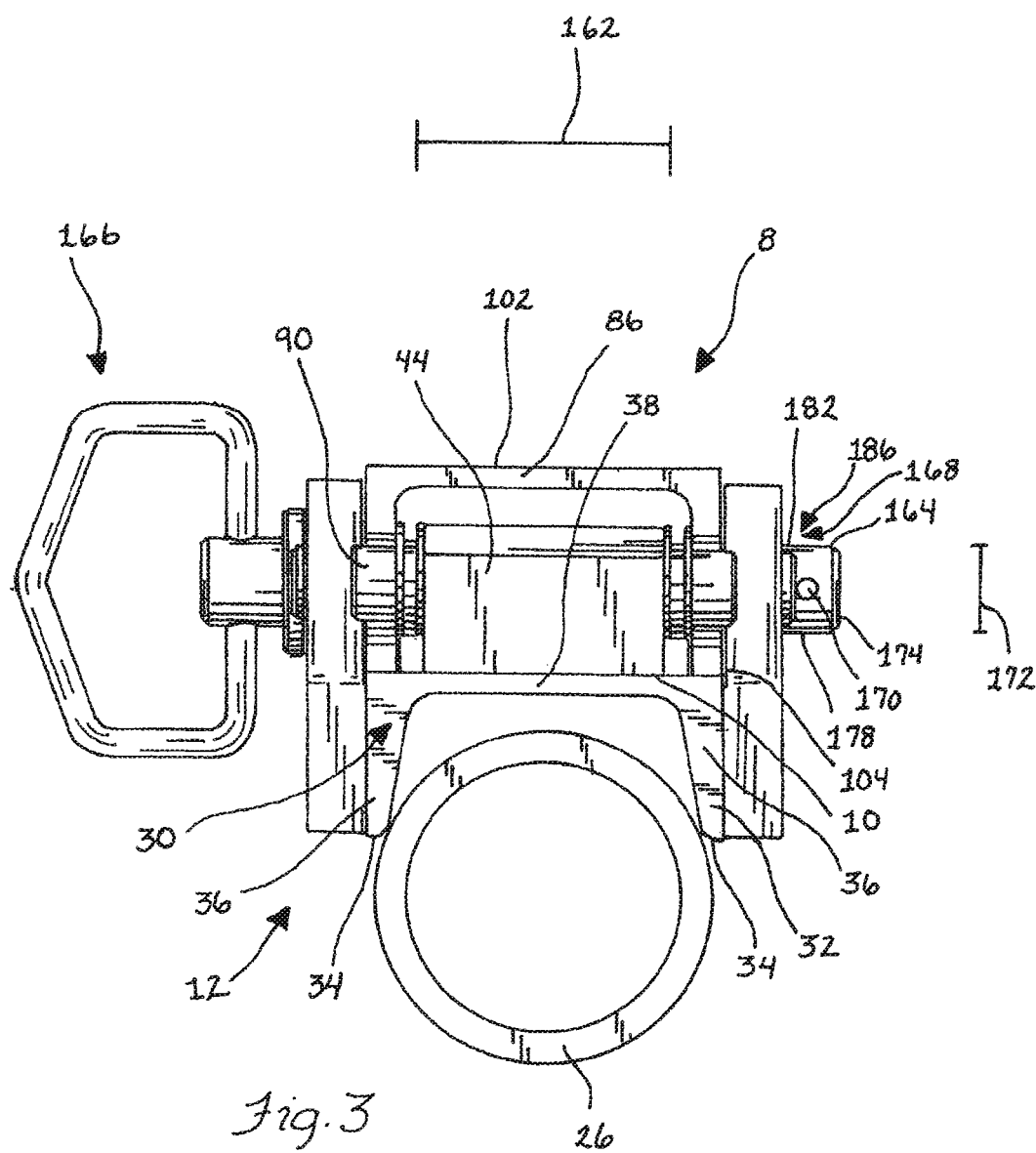

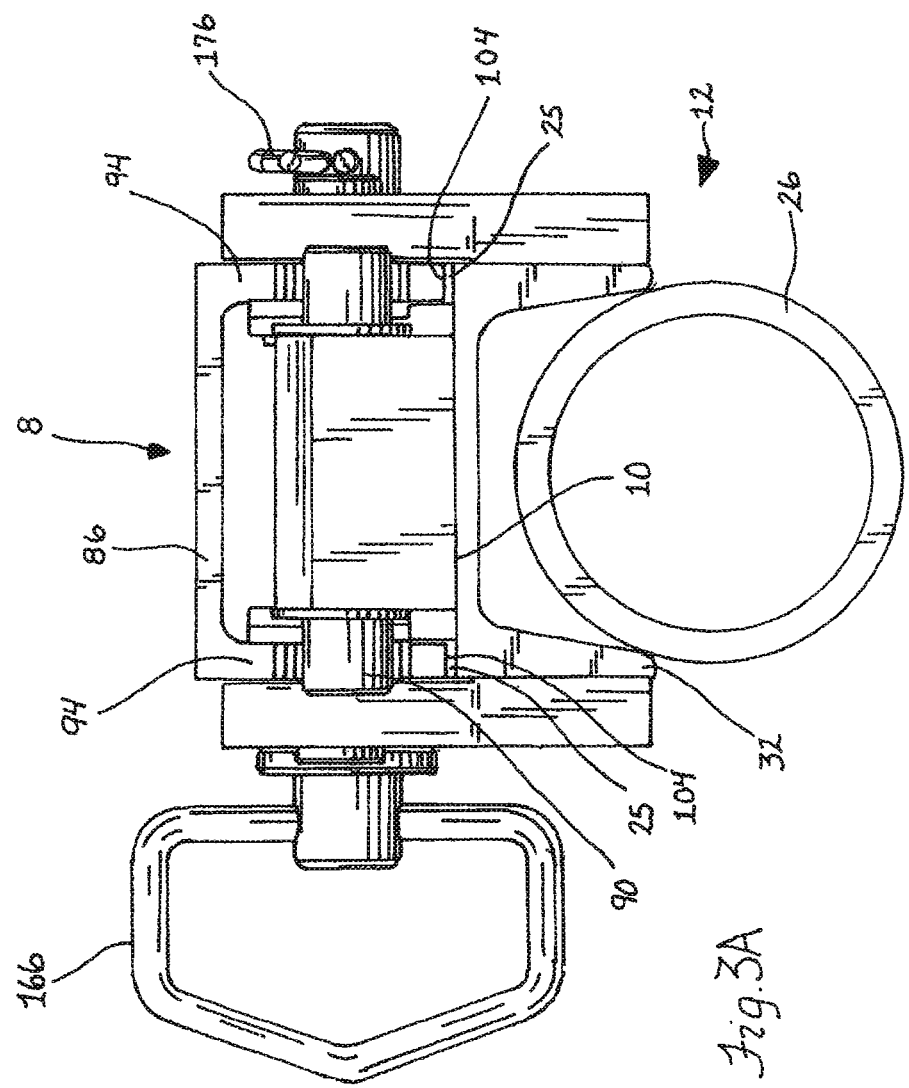

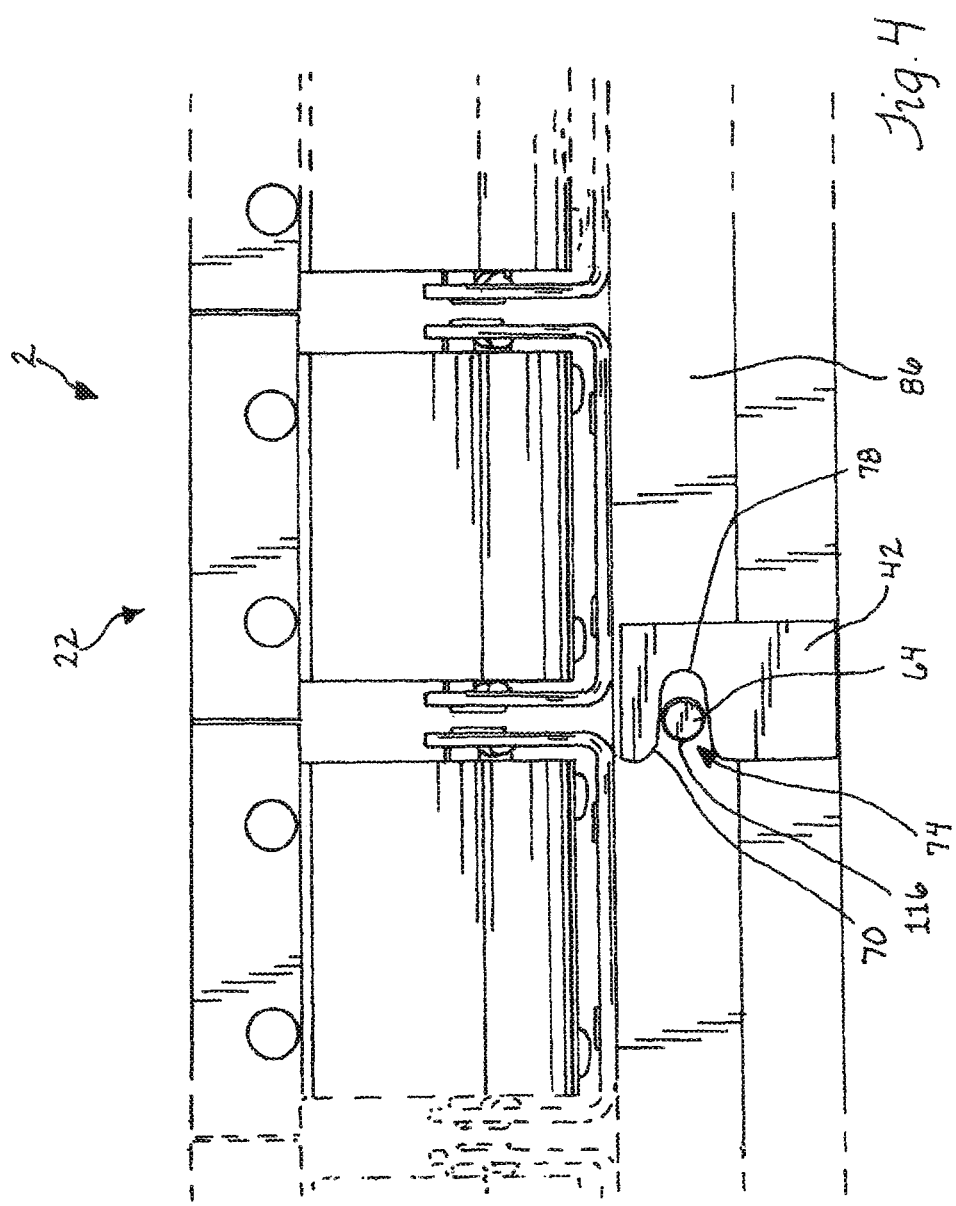

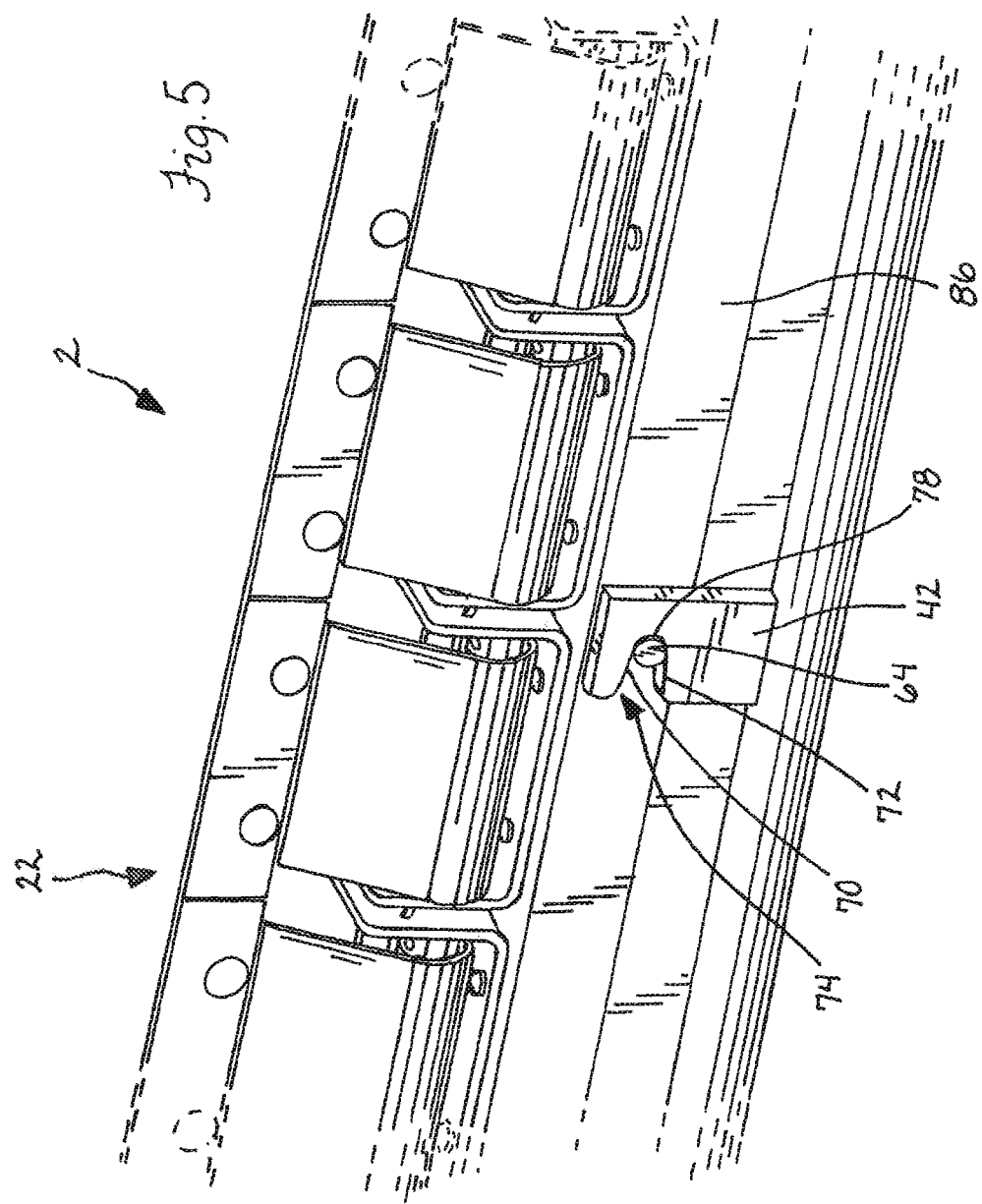

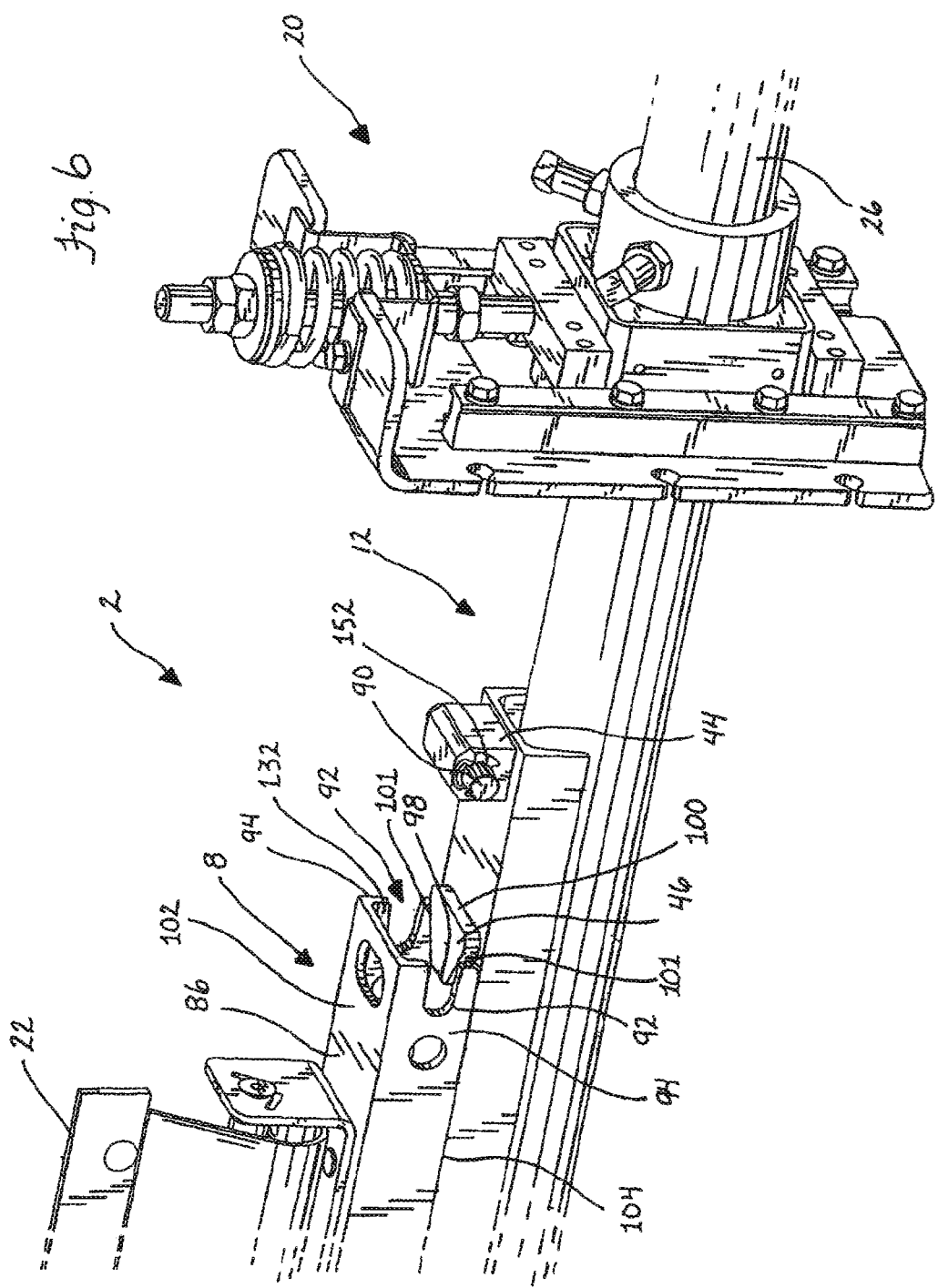

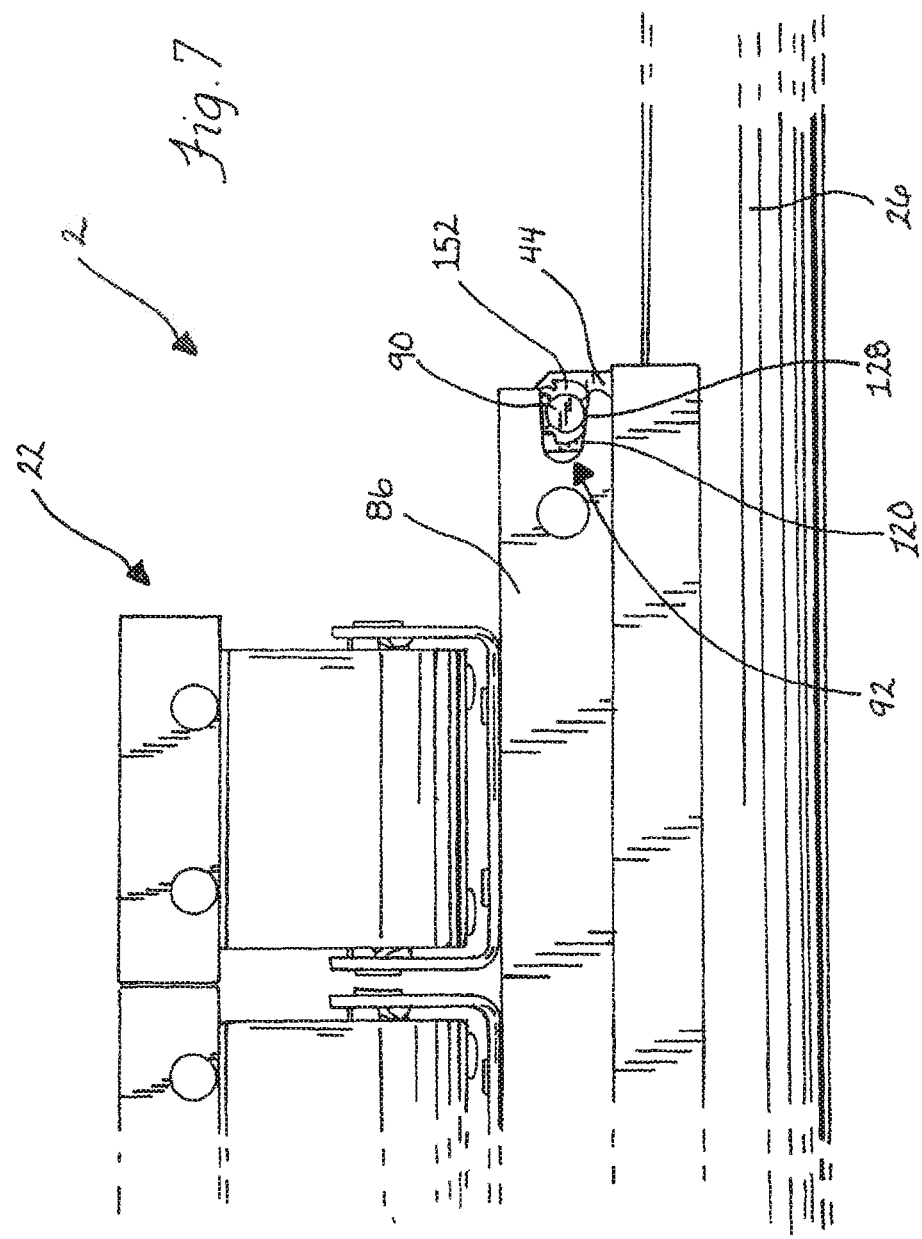

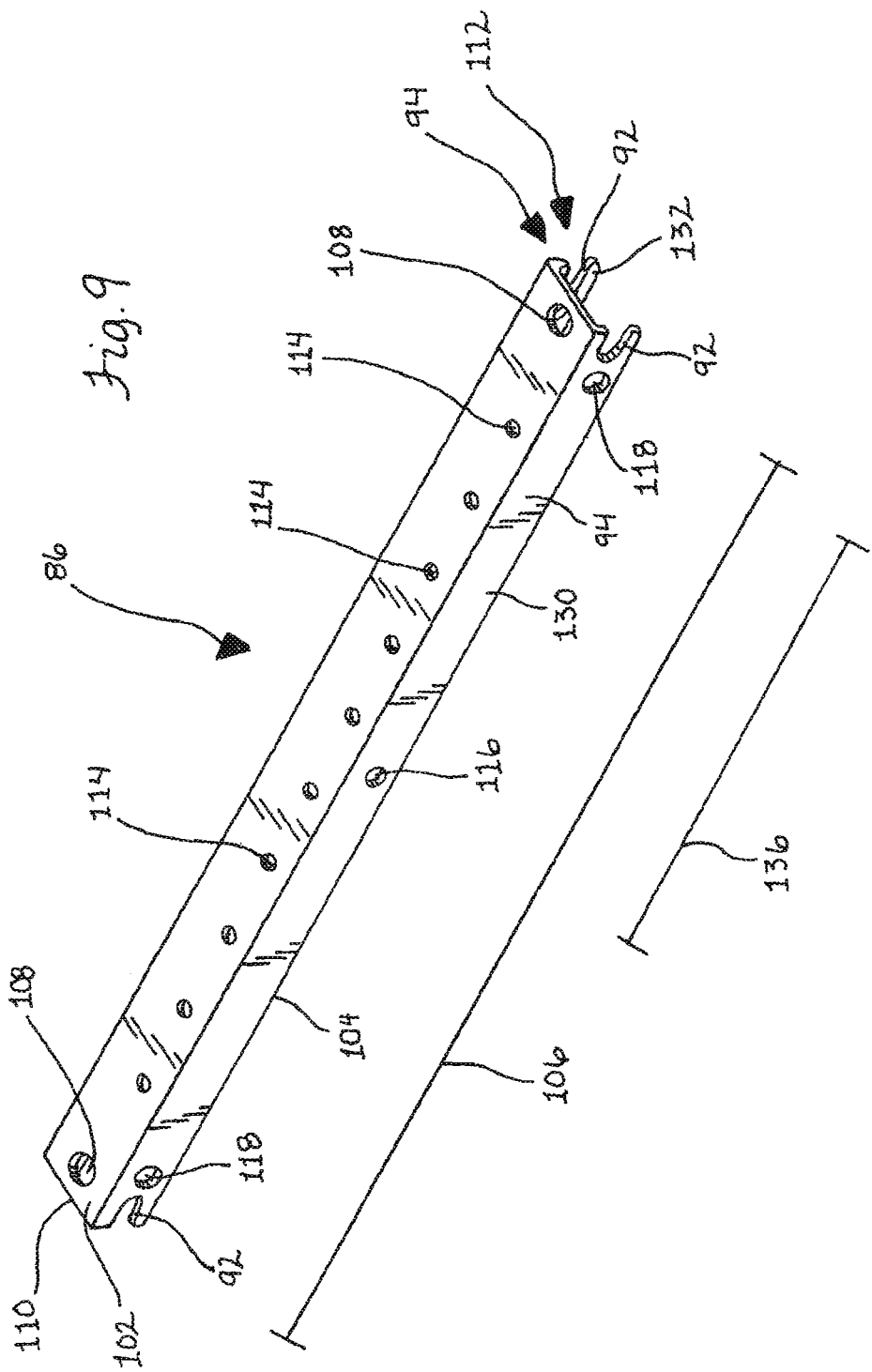

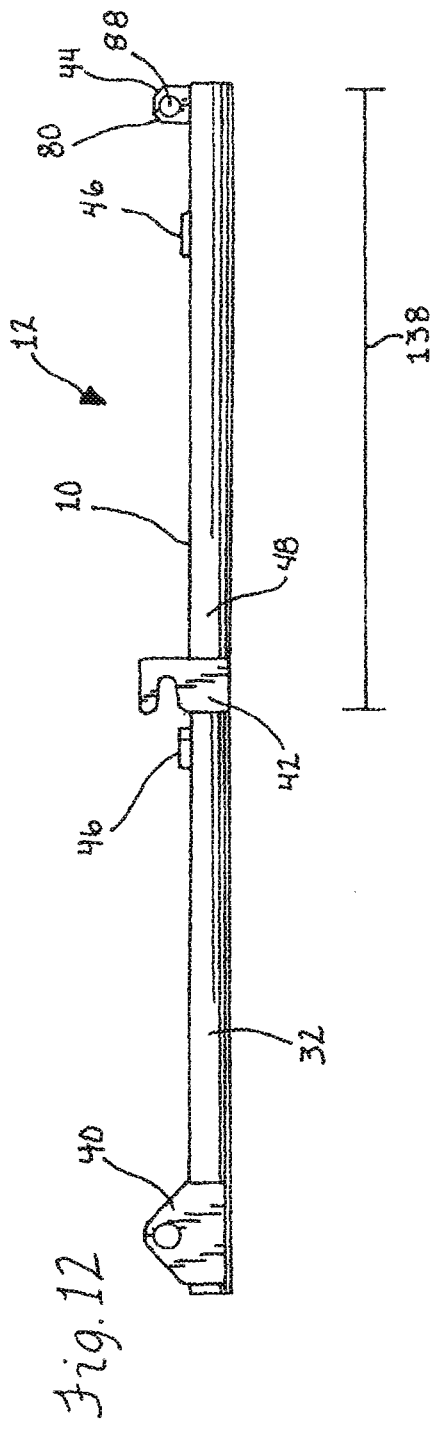
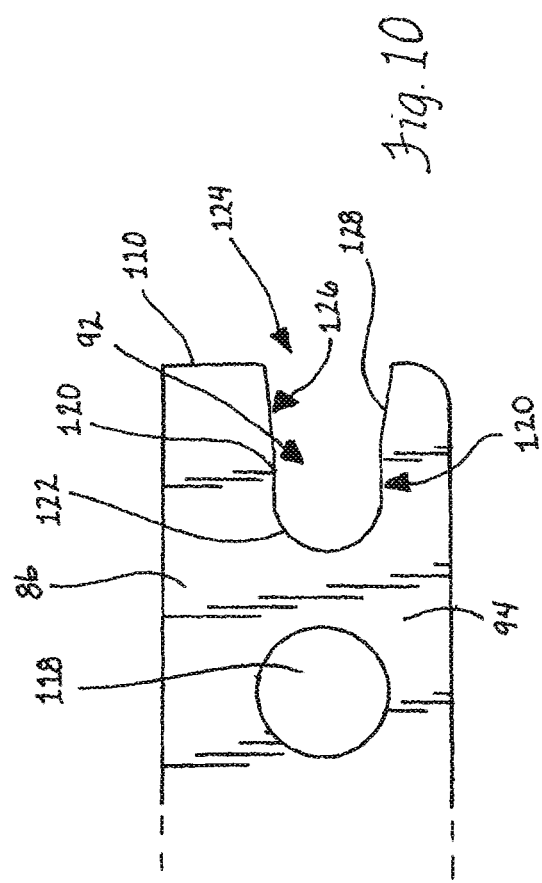

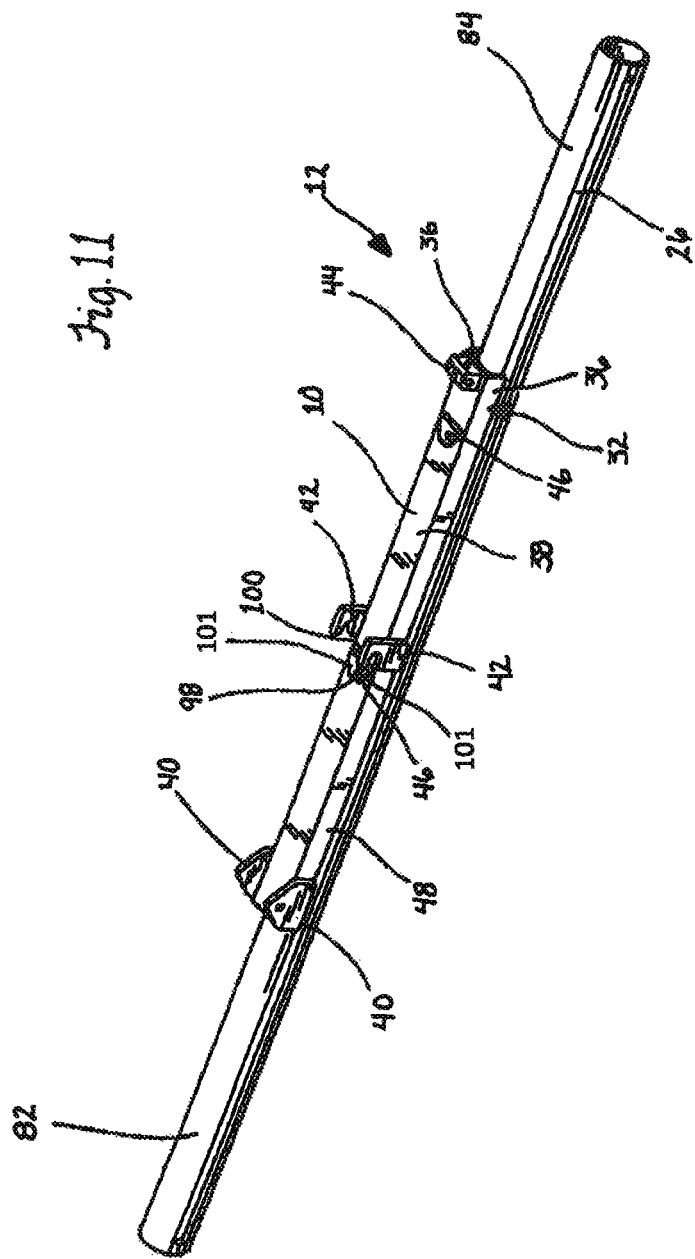

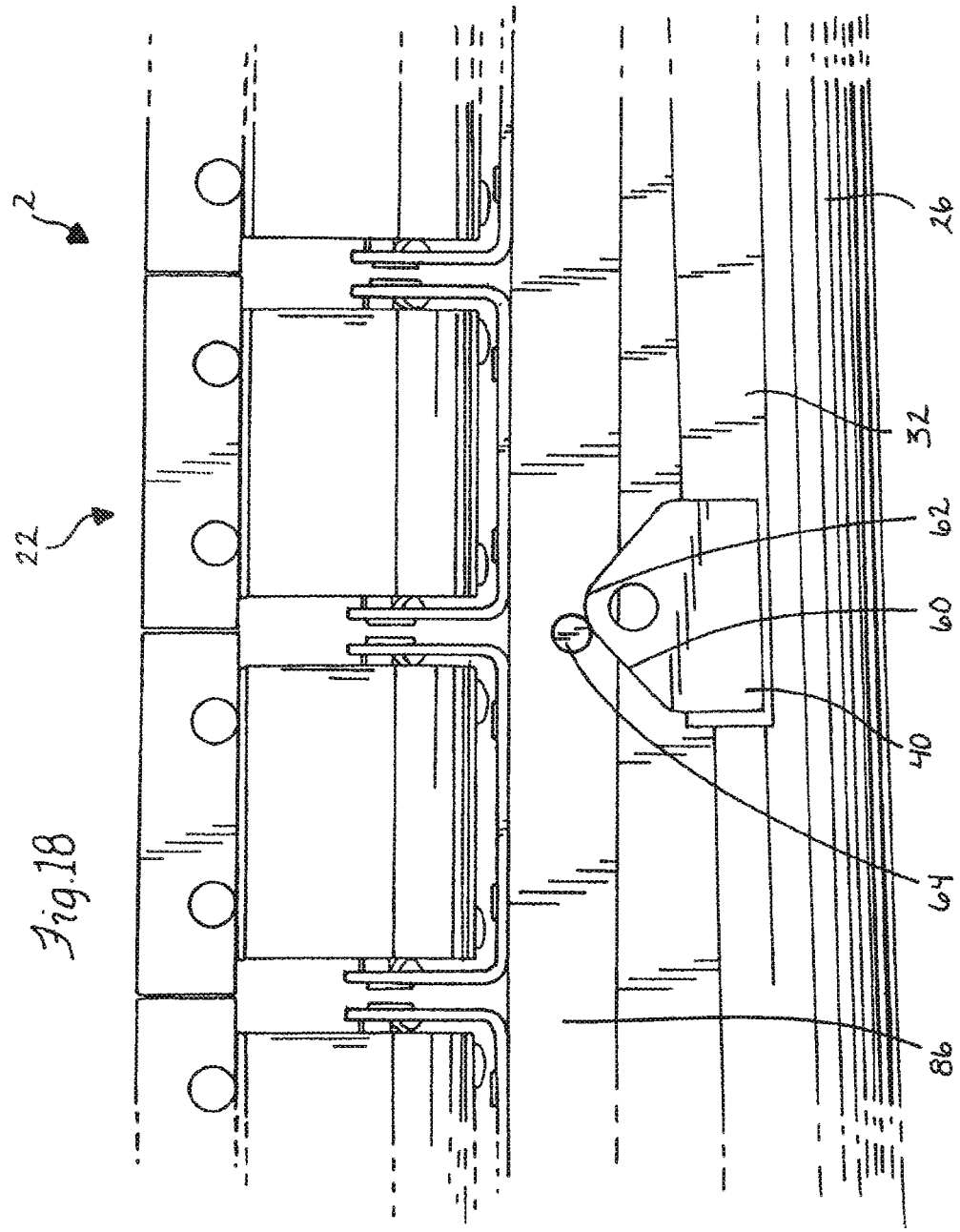

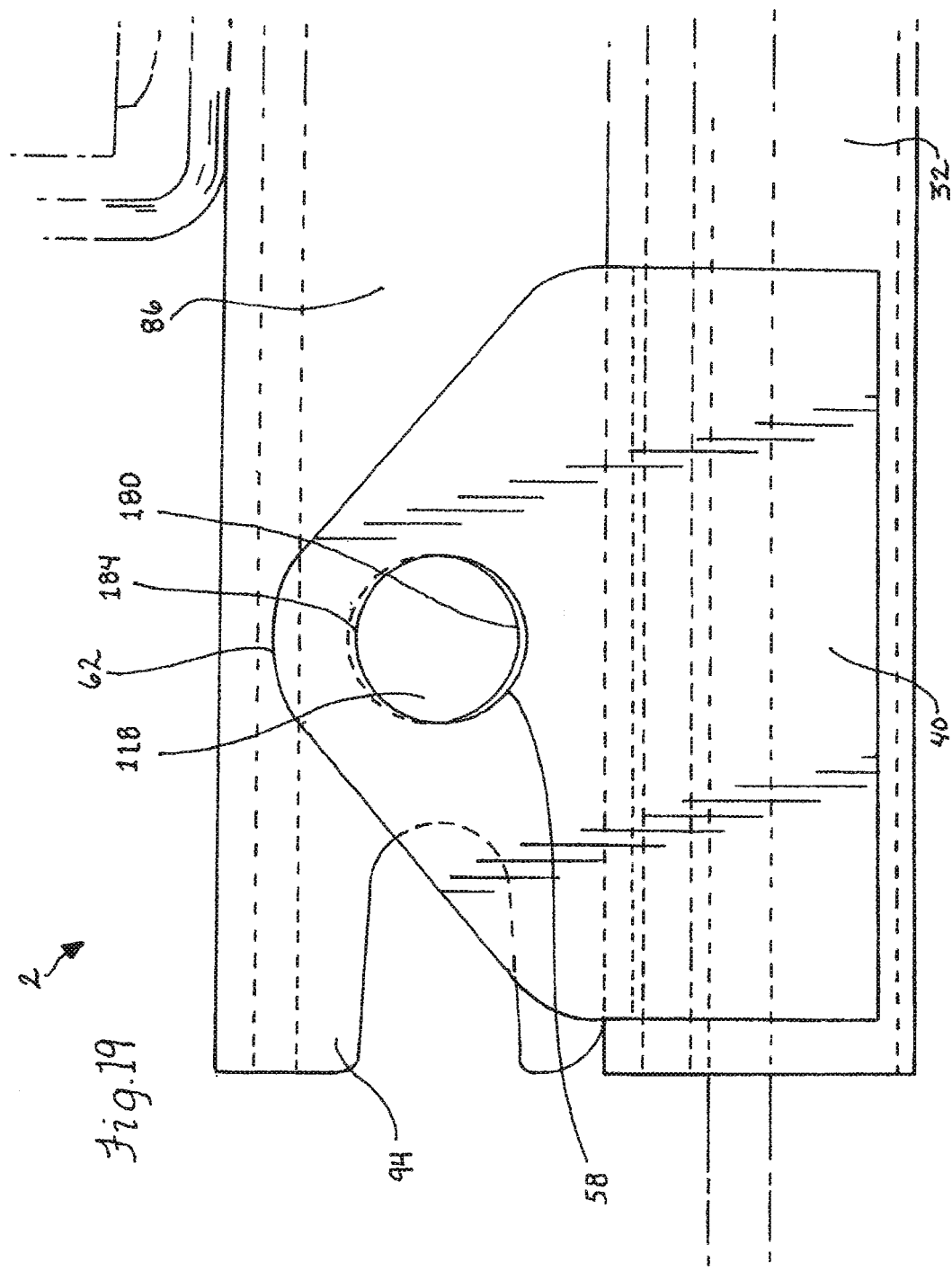

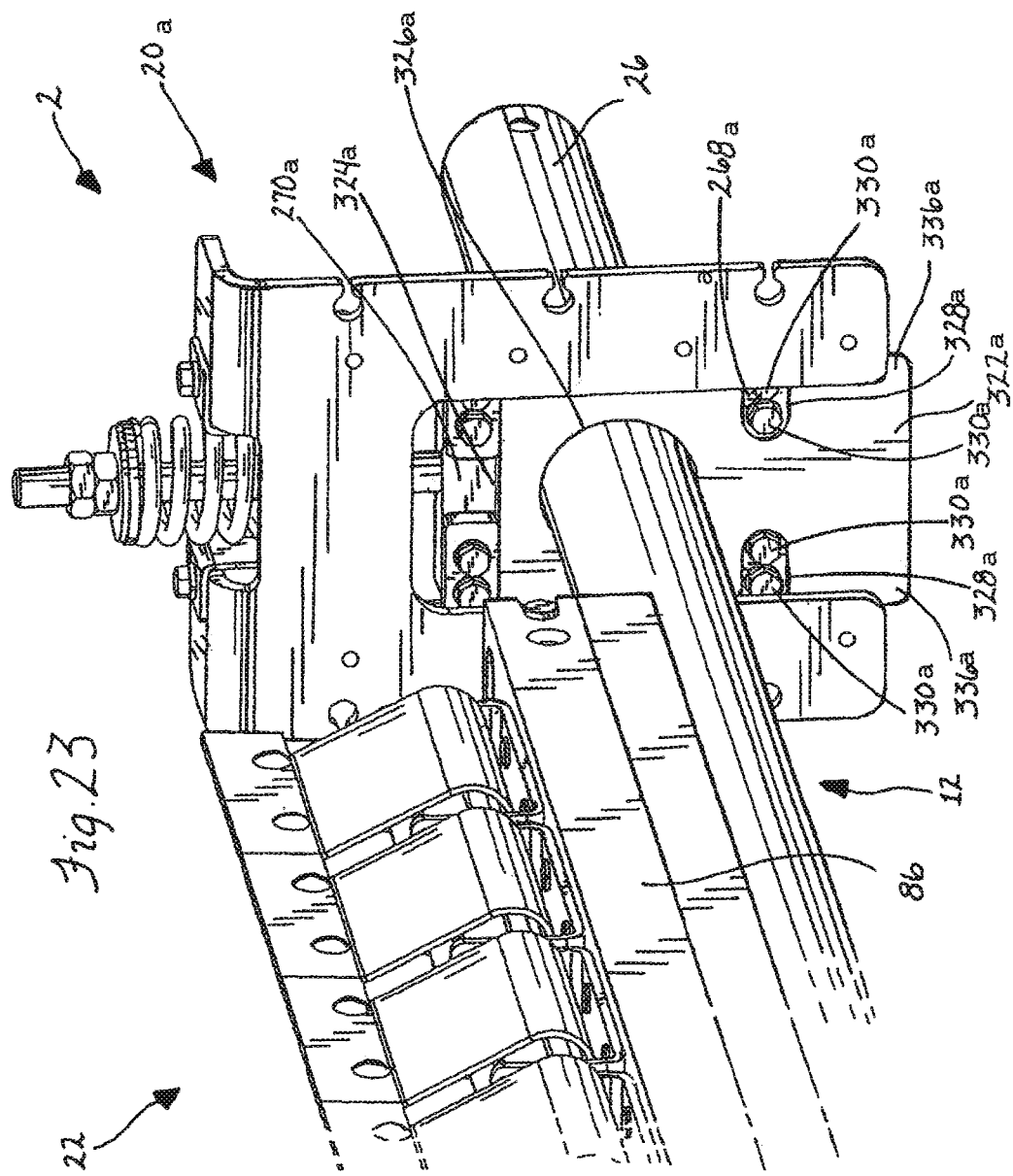

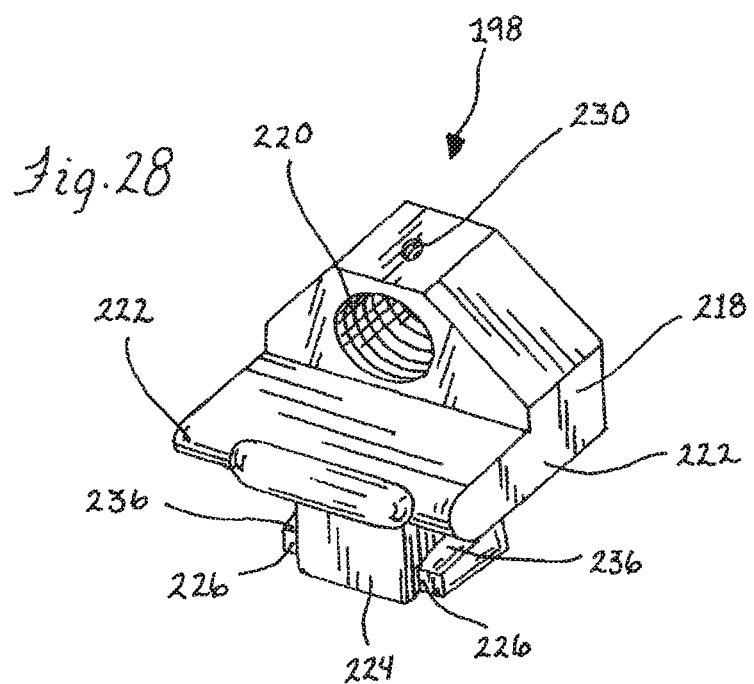
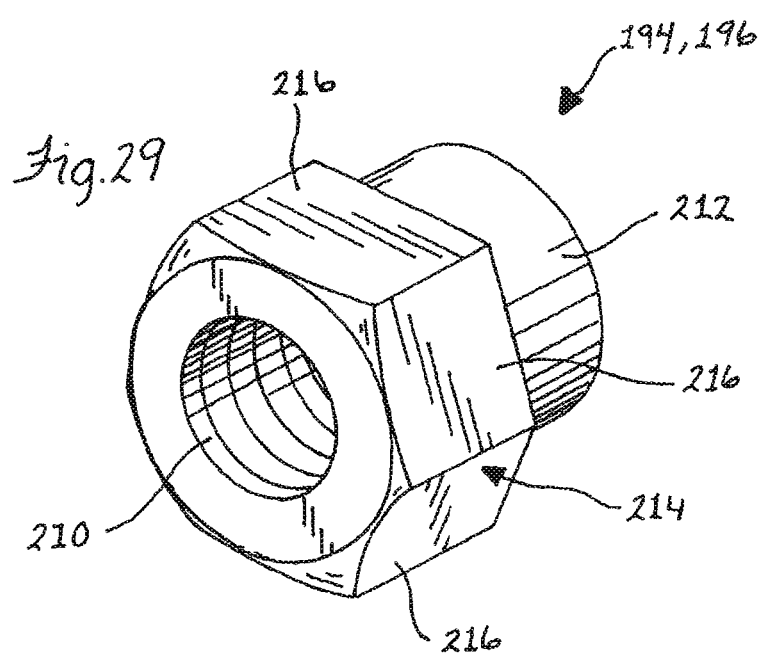

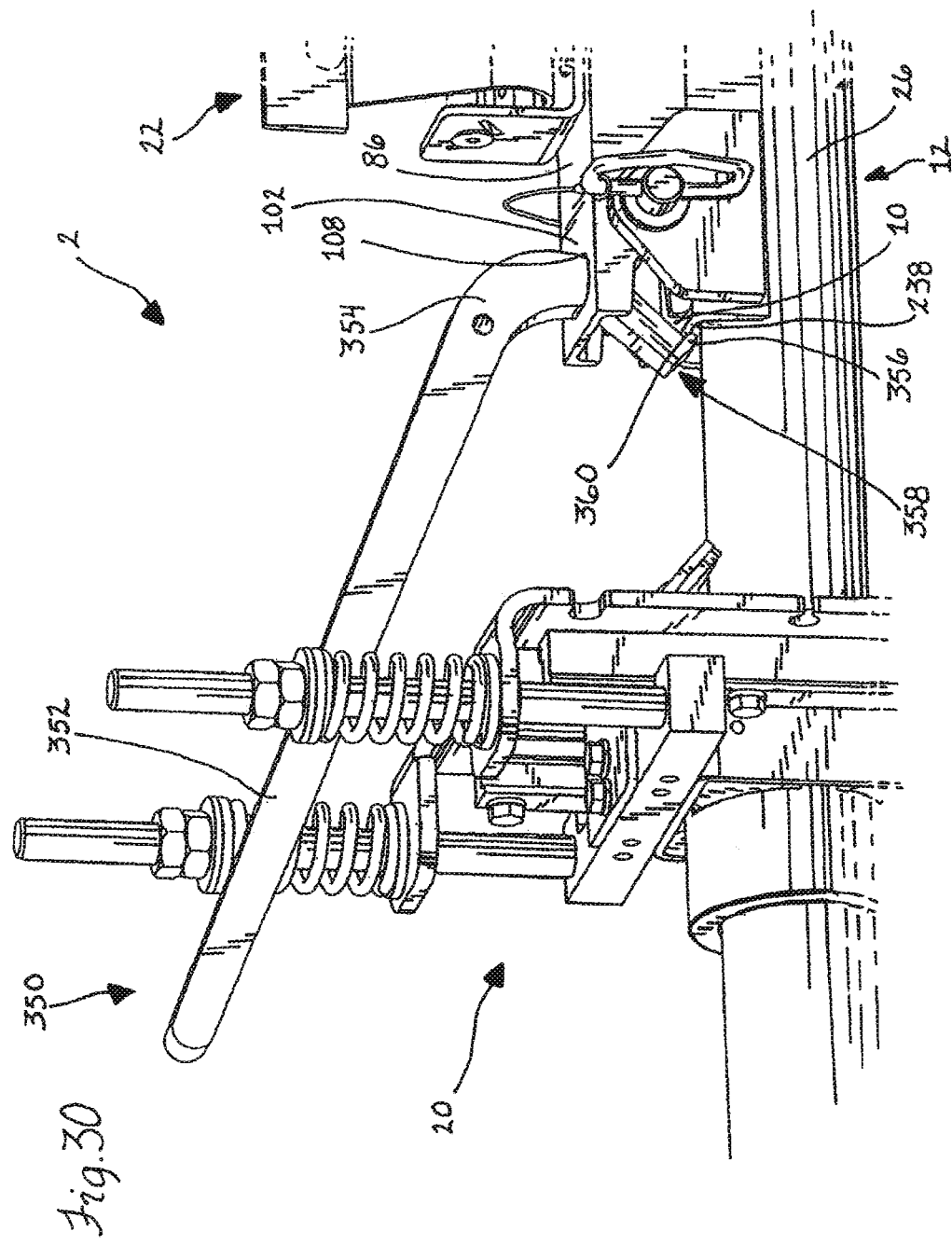

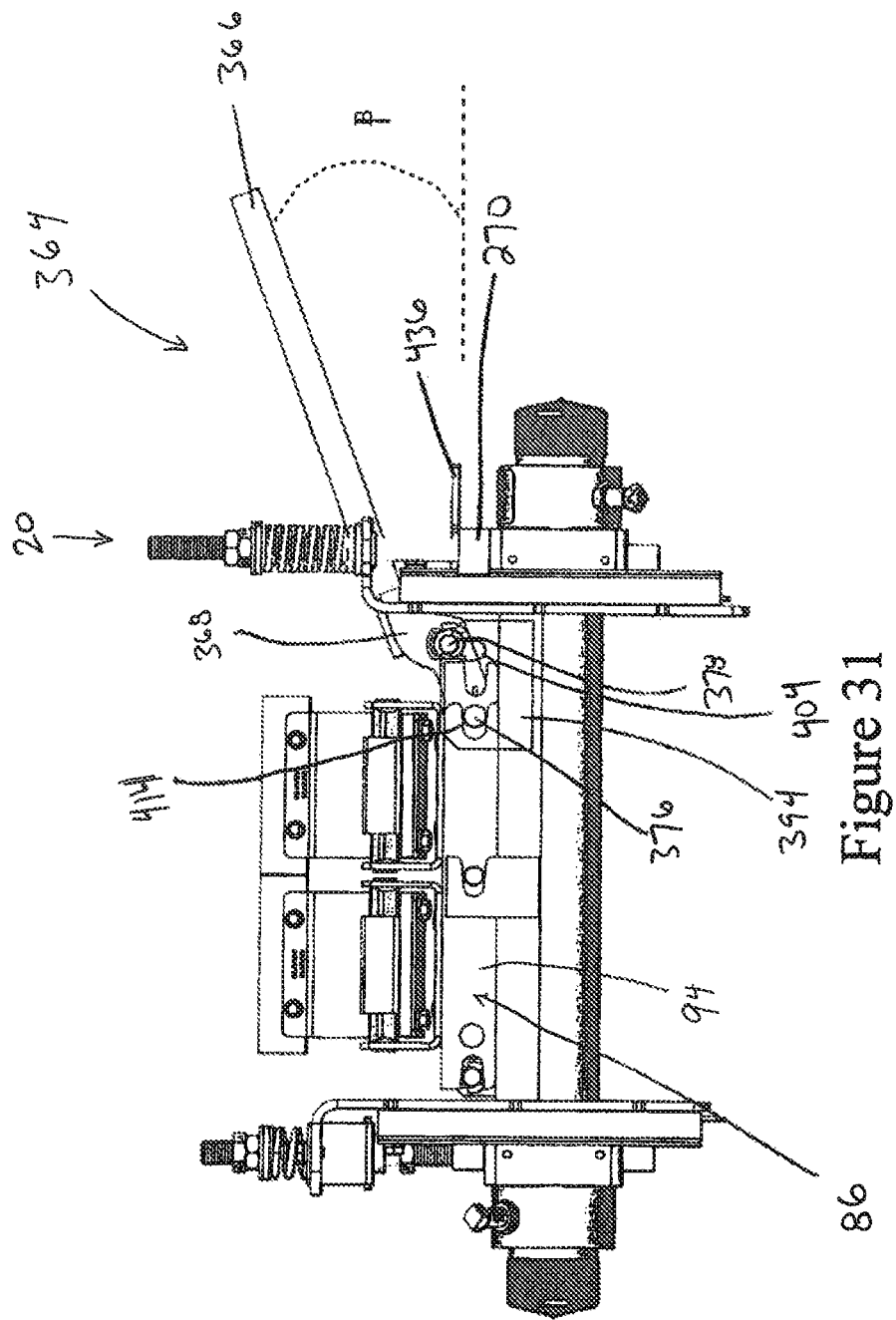

REMOVABLE CARTRIDGE CLEANER

CROSS REFERENCE TO RELATED APPLICATIONS

This application is a divisional of U.S. patent application Ser. No. 13/035,915, filed Feb. 25, 2011, which is a continuation-in-part of U.S. patent application Ser. No. 12/421,988, filed Apr. 10, 2009, now U.S. Pat. No. 7,987,966, which claims the benefit of U.S. Provisional Application 61/044,050, filed Apr. 10, 2008; and prior U.S. patent application Ser. No. 13/035,915 also claims benefit of U.S. Provisional Application 61/308,840, filed Feb. 26, 2010, each of which are hereby incorporated by reference in their entirety.

FIELD OF THE INVENTION

The invention relates to a cleaner assembly for a conveyor belt and, more particularly, to a cleaner assembly that can be easily installed under a conveyor belt and removed therefrom.

BACKGROUND OF THE INVENTION

A variety of industries utilize conveyor belts to transport goods and materials from one place to another. Generally, material is deposited onto the upstream end of the upper or carry run of a belt and is discharged at the downstream end of the carry run of the belt. However, small amounts of material often remain adhered to the belt surface. That material can remain adhered as the belt travels along the lower or return run and back to the carry run. As is known, it is desirable to scrape the belt clean so that it is free of material adhered thereto.

Secondary belt cleaners are mounted downstream of the head pulley under the conveyor belt. Generally the belt cleaners are operatively mounted to an elongate mounting pole that extends below and across the belt. The cleaning blades of the belt cleaners are biased into engagement with the conveyor belt and remove the material adhered thereto.

Resilient mounts located at either end of the elongate pole or support member provide limited vertical and/or rotational movement to minimize damage to the belt and splices formed therealong and maximize material removal. Examples of resilient mounts include spring tensioners and pneumatic tensioners. In addition, resiliently mounted cleaning blades further minimize belt damage and maximize material removal. The resilient mounts typically bias the cleaning blades into engagement with the belt. In addition, the cleaning blades move with the conveyor belt as the cleaning blades encounter surface irregularities, such as metallic belt fasteners used to splice the conveyor belt.

Over time the cleaning blades of belt cleaners require maintenance and/or replacement. Some prior belt cleaners include elongate members removably mounted to the resilient mounts, allowing an operator to remove the elongate member and cleaning blades out from under the conveyor belt to perform maintenance. However, this configuration requires that the operator have access to both ends of the belt scraper assembly to dismount the elongate member. Further, due to the weight and size of the elongate support, removal and reinstallation may require several operators and/or mechanical assistance.

Recent belt cleaners include cleaner blades configured to be laterally translated along the elongate member, thereby allowing an operator to remove and replace the cleaner blades out from under the conveyor belt without having to remove the elongate support member. Further, the operator only needs access to one side of the belt cleaner to remove and replace the cleaner blades. In one prior belt cleaner, disclosed in U.S. Pat. No. 4,249,650 to Stahura, several blade members are linked together to form a single unit under the conveyor belt. This approach requires an operator to individually remove each blade member from the elongate support member, then individually reinstall each blade member on the elongate support assembly. As a result, the operator is required to work below the belt for an extended period of time, during which the belt should be rendered inoperable. Space constraints adjacent the belt scraper assembly could further impede timely maintenance activities.

In other belt cleaners, the scraper blades are mounted onto a removable cartridge member or rail member. In one such configuration, such as described in U.S. Pat. No. 6,581,754 to Law, the rail member defines a cavity extending along its length to receive the elongate support therein. The belt scraper assembly is configured to have clearance between the larger rail member cavity and the smaller elongate support extending along the lengths thereof. The clearance eases installation of the rail member on the elongate support and minimizes friction therebetween. However, material removed from the conveyor belt readily can collect in the clearance. Material accumulated in the clearance adheres to both the rail member and the elongate support along the lengths thereof and effectively binds the rail member to the support so that the belt cleaner cannot be easily manually removed if it is able to be manually removed at all. As a result, an operator must provide sufficient force to overcome the strength of the material adhering to and essentially cementing the rail member to the elongate support, such as by application of multiple mallet blows to the end of the rail member.

Thus, prior belt scraper assemblies suffer from problems with providing simple and quick maintenance in an environment which is subjected to loose material passing therethrough.

SUMMARY OF THE INVENTION

In accordance with one aspect of the invention, a removable cartridge cleaner assembly is provided that allows for faster and easier removal of the belt cleaner blades out from under the conveyor belt. The present removable cartridge cleaner provides a tight engagement between the removable rail member and the elongate support assembly to minimize debris accumulation, as compared to prior cartridge cleaner assemblies which have a loose fit between the removable rail members and the support member, thereby providing spaces and/or gaps which allow debris and other material to collect therein. Such debris solidifies over time and effectively glues the removable channel member in place.

The present removable cartridge cleaner assembly includes an elongate rail or channel member and an elongate support assembly. Lower, free ends of legs of the channel member are configured to slide along an upper surface of the elongate support assembly. An opening of one of the channel member and support assembly includes a biasing surface configured to engage a securing portion of one of the channel member and support assembly and thereby urge the elongate channel member toward the elongate support assembly as the channel member is shifted to an operative position. In the operative position, any space at the interface between the elongate channel member and the elongate support assembly is minimized or eliminated. As a result, the interface between the channel member and elongate support is substantially free of debris, thereby allowing the elongate channel member to freely be shifted along the upper surface of the elongate support assembly. Accordingly, an operator can easily and quickly perform maintenance on the removable cartridge cleaner assembly.

In a preferred form, the removable cartridge cleaner assembly includes an insertion tool to assist an operator in insertion and removing the elongate rail from below the conveyor belt. Further, the insertion tool can provide a securing location out from under the belt so that an operator can secure the elongate rail in place without having to reach under the conveyor belt. The insertion tool can include an elongate handle for leveraging a force applied by an operator to provide an extraction force on an elongate rail sufficient to overcome any bonding that may have occurred due to debris accumulation. In another aspect, the present removable cartridge cleaner assembly includes a rail member slidably mounted on an elongate base member. Both the rail member and base member include lateral portions extending in the belt travel direction configured to engage inclined wedge portions of both the rail member and base member. In this manner, as the lateral portions engage the wedge portions, the rail member is urged toward the base member. Accordingly, space available for the accumulation of debris is reduced. Further, removal and installation of the rail member on the base member is quicker and easier as the interface between the rail member and base member is minimized and relatively free of debris.

In another aspect of the invention, a method for installing a rail member having belt cleaner blades secured thereto is provided that allows for faster and easier removal of the rail member from under the conveyor belt. In this regard, the rail member is slidable along an upper mounting surface of an elongate support member. Engagement of an inclined surface of a receiving portion with a securing portion urges the rail member towards the elongate support and restricts shifting of the rail member beyond the desired operative position. In this manner, the rail member is in tight engagement with the elongate support. Accordingly, the tight engagement of the rail member and elongate support member minimizes the accumulation of debris therebetween and provides for easier and faster servicing of the rail member.

In another aspect of the invention, the removable cartridge cleaner has an insertion device that enables the operator to apply a leveraged insertion force to the channel or rail member of the elongate cartridge assembly so that it is tightly secured onto the elongate support extending under the belt in its operative position thereon. In this regard, an elongate lever handle of the insertion device is pivotably connected to the channel member and is sized to extend out from under the conveyor belt and beyond associated conveyor framework and/or tensioning mechanisms or resilient mounts to allow an operator to apply the leveraged insertion force from outside the operating area or envelope of the conveyor system. The leveraged force has both a downward force component so that the channel member is tightly engaged on the elongate support and an axial component so that cooperating securing portions and openings of the channel member and support tightly interengage each other when the channel member is shifted to its operative position.

The elongate handle portion preferably is removably attached to a coupler pivotally secured to the channel member having the cleaner blades mounted thereto. Guide members secured to the support receive the coupler therebetween with cam portions of each cooperating to provide the leveraged insertion force when the elongate handle is pivoted downwardly. Preferably, the cam portions cooperate to form an over-center locking mechanism to provide the operator with tactile feedback so that they are provided an indication that the channel member has been properly advanced to its operative position. In addition, a locking device can be provided that the operator can connect to either the coupler or the handle itself to ensure that the handle and coupler remain pivoted down with the channel member retained in its operative position.

More specifically, the coupler can include a first pin portion and a second pin portion spaced from the first pin portion. The first pin portion is pivotably connected to the elongate cartridge assembly. The guide members include a first slot for receiving the first pin pivotably connected to the elongate cartridge assembly. Additionally, the guide members include a second slot spaced from the first slot for receiving the second pin portion of the coupler. The second slots have closed end portions so that with the second pin portions of the coupler shifted thereto, the elongate cartridge assembly will be shifted to its operative position on the elongate support. Further, the closed end portions can be configured to resist shifting of the second pin away from the closed end portions of the second slots thereby maintaining the elongate cartridge assembly in the operative position.

In another aspect of the present invention, a method of installing a belt cleaner assembly is provided. The method includes positioning a frame or channel or rail member having belt cleaner assemblies secured thereto under a conveyor belt. Application of a leveraged force to the frame with an elongate handle translates the frame along an elongate support member toward an operative position of the frame. Pivoting a coupler device of the handle and connected to the frame allows protruding portions of the coupler device to be received in slots of guide members of the elongate support. Applying a downward force on the handle urges the protruding portions along the slots and shifts the frame having the belt cleaner assemblies secured thereto along the elongate support member to the operative position of the frame.

In a preferred form, the method of installing a belt cleaner is accomplished without requiring that an operator reach under the conveyor belt or, even more preferably, beyond a tensioning mechanism for the belt cleaner on one side of the conveyor belt.

BRIEF DESCRIPTION OF THE DRAWINGS

FIG. 1 is a perspective view of a removable cartridge cleaner assembly resiliently mounted below the return run of a conveyor belt shown in phantom;

FIG. 2 is a side elevational view of the removable cartridge cleaner assembly of FIG. 1 showing the elongate cartridge assembly in the operable orientation and the lower surfaces of the legs of the elongate channel member in tight, flush engagement with the flat upper surface of the elongate support assembly;

FIG. 3 is an end elevational view of the elongate channel member and elongate support assembly of the removable cartridge cleaner assembly of FIG. 1 showing the tight, flush engagement between the lower surfaces of the legs of the elongate rail member and the flat upper surface of the elongate support assembly;

FIG. 3A is an end elevational view of the elongate channel member and elongate support assembly of the removable cartridge cleaner assembly of FIG. 1 showing the low friction member between the upper surface of the elongate support assembly and the lower surfaces of the legs of the elongate rail member;

FIG. 4 is an enlarged side elevational view of the elongate channel member and elongate support assembly of the removable cartridge cleaner assembly of FIG. 1 showing the central pin member of the elongate channel member in engagement with the upper inclined surface of the tapered slot of the central lug mount portion of the elongate support assembly;

FIG. 5 is an enlarged perspective view of the elongate channel member and elongate support assembly of the removable cartridge cleaner assembly of FIG. 1 showing the central pin member of the elongate channel member in engagement with closed end of the tapered slot of the central lug mount portion of the elongate support assembly;

FIG. 6 is an enlarged perspective view of the elongate channel member and elongate support assembly of the removable cartridge cleaner assembly of FIG. 1 showing the guide member being received between the depending legs of the elongate channel member;

FIG. 7 is an enlarged side elevational view of the elongate channel member and elongate support assembly of the removable cartridge cleaner assembly of FIG. 1 showing the end pin member of the elongate support assembly in engagement with the lower inclined surface of the tapered slot of the opening of the legs of the elongate channel member;

FIG. 9 is a perspective view of the elongate rail member of the removable cartridge cleaner assembly of FIG. 1 showing the tapered surface configured to engage the end mounting pin and be urged downwardly toward the upper flat surface of the elongate support assembly;

FIG. 10 is a enlarged side elevational view of one end of the rail member of FIG. 9 showing opening including the tapered portion, the horizontal run portion and the semiannular seat portion;

FIG. 11 is a perspective view of the elongate support assembly of the removable cartridge cleaner assembly of FIG. 1 showing the flat upper surface, the manual securing guide portions, the central lug mount portions, securing block portion and guide wedge portions;

FIG. 12 is a side elevational view of the base channel portion of the elongate support assembly of the removable cartridge cleaner assembly of FIG. 1;

FIG. 18 is an enlarged side elevational view of the removable cartridge cleaner assembly of FIG. 1 showing the central pin member shifting over the tapered upper surface of the manual securing guide portions of the elongate support assembly;

FIG. 19 is an enlarged side elevational view of the removable cartridge cleaner assembly of FIG. 1 showing the offset positioning of the throughbores of the manual securing guide portions and the end flange apertures of the elongate channel member;

FIG. 23 is an enlarged perspective view of the removable cartridge cleaner of FIG. 1 showing a dust guard member of the resilient mount extending from the upper block assembly, between the rail members and along the bracket legs;

FIG. 28 is a perspective view of the end locking member of the end securing mechanism of FIG. 26 showing the wedge portions and depending wedge portions;

FIG. 29 is a perspective view of a guide nut member of the end securing mechanism of FIG. 26 showing the threaded interior surface, the annular outer surface portion and the engagable outer surface portion;

FIG. 30 is an enlarged perspective view of the removable cartridge cleaner assembly of FIG. 1 showing the elongate channel member removal tool extending through the web aperture of the elongate channel member and engaging the lower surface of the web of the base channel member of the elongate support assembly;

FIG. 31 is a front elevational view of the removable cartridge cleaner assembly of FIG. 1 showing the insertion tool apparatus connected to the elongate rail;

DETAILED DESCRIPTION OF THE PREFERRED EMBODIMENTS

Figure 8:
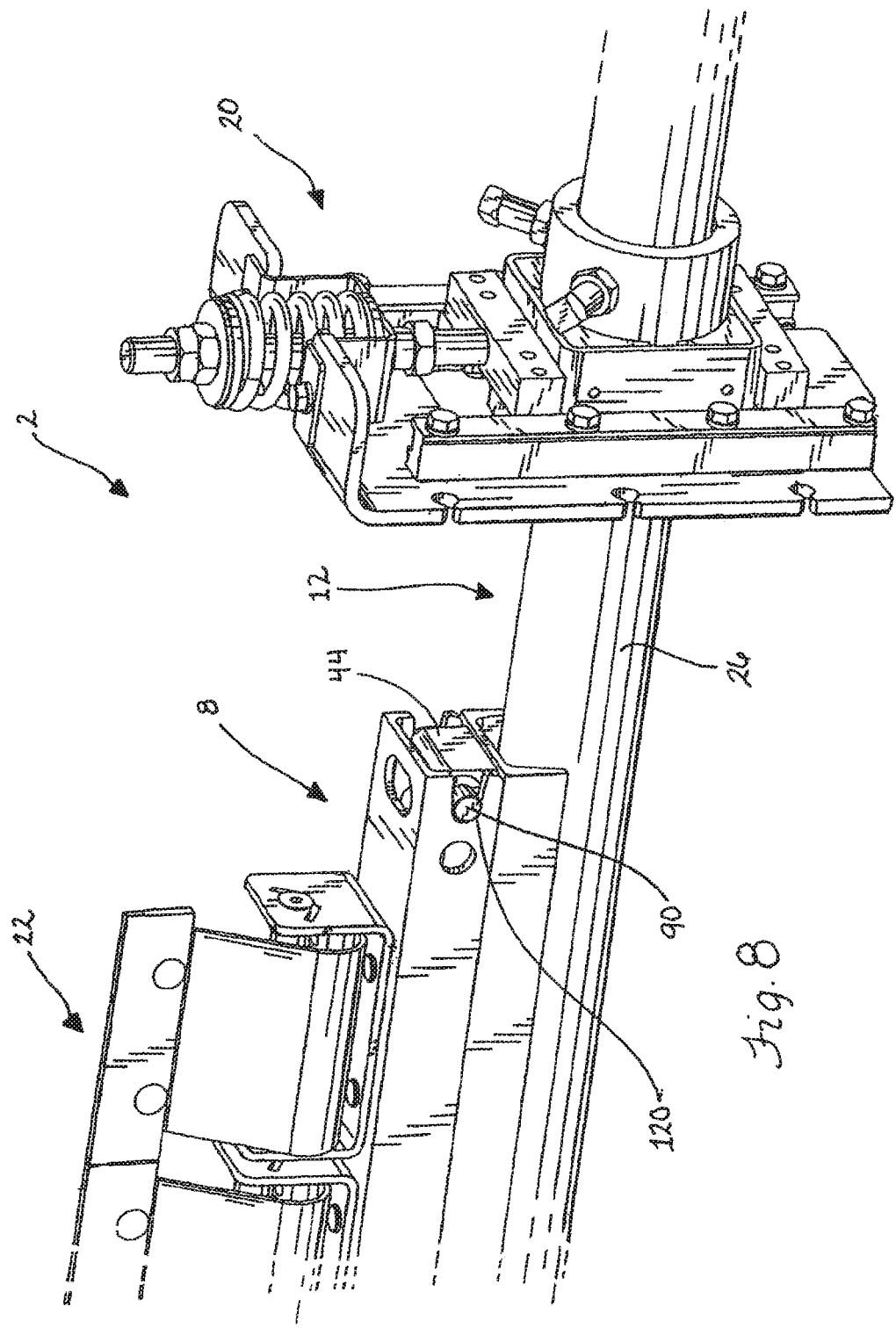
FIG. 8 is an enlarged perspective view of the elongate channel member and elongate support assembly of the removable cartridge cleaner assembly of FIG. 1 showing the end pin member of the elongate support assembly in engagement with horizontal run portion of the opening of the elongate channel member.

In FIGS. 1 and 2, a removable cartridge cleaner assembly 2 is shown for a conveyor belt 4 that can be located adjacent the return run 6 or the head pulley of the conveyor belt 4. The removable cartridge cleaner assembly 2 includes a rail or cartridge assembly 8 biased or urged into tight engagement with an upper mounting surface 10 of an elongate support assembly 12 extending in a lateral assembly direction 14 under and across the conveyor belt 4. One or both of the rail assembly 8 and elongate support assembly 12 include biasing or guide surfaces 16 configured to extend generally obliquely to the lateral assembly direction 14 and engage or be engaged by lateral or securing members 18 of the rail and support assemblies 8, 12 configured to extend generally orthogonal to the lateral assembly direction 14 and parallel to the belt travel direction 19. The tight engagement of the rail and support assemblies 8, 12 minimizes vibration and space between the rail and support assemblies 8, 12 thereby reducing or minimizing space available for debris accumulation.

The removable cartridge cleaner assembly 2 is further operable to engage the conveyor belt 4 and minimize damage thereto. For this purpose, the removable cartridge cleaner assembly 2 includes a resilient mount 20 at either end of the elongate support assembly 12. The mounts 20 are configured to bias belt cleaner blades 22 of the rail assembly 8 into engagement with the belt 4 and permit limited vertical movement of the elongate support assembly 12 and rail assembly 8 to both maximize debris removal and minimize damage to the belt 4 and minimize vibration of the removable cartridge cleaner assembly 2. As discussed herein, the removable cartridge cleaner assembly 2 is positioned adjacent the return run 6 of the belt 4, however placement of the removable cartridge cleaner assembly 2 adjacent the pulleys is contemplated.

As is shown in FIGS. 1, 2 and 4-8, a slide interface is defined between the rail assembly 8 and the upper mounting surface 10 of the elongate support assembly 12. In this manner, the rail assembly 8 can be slid along the upper surface 10 of the elongate support assembly 12 as the rail assembly 8 is shifted in the lateral assembly direction 14. The upper surface 10 is configured to minimize friction between the elongate support assembly 12 and the rail member 8 as the rail member 8 travels thereacross. Optionally, as shown in FIG. 3A, the upper surface 10 can include a low friction, quasi-compressible member 25 attached thereto, such as ultra high molecular weight plastic. The low friction member 25 is attached to the upper surface 10 by known means, such as adhesives and bonding.

As can be seen in FIGS. 1 and 2, the elongate support assembly 12 includes an elongate base portion or pole 26 having a longitudinal axis 28 extending below and across the conveyor belt 4 in a lateral assembly direction 14. The elongate support assembly 12 can further include an elongate base reinforcing assembly 30 attached thereto. As shown in FIGS. 2, 11 and 12, the base reinforcing assembly 30 includes a base channel member 32 connected to the elongate base member 26, lower surfaces 34 of flanges or legs 36 of the base channel member 32 being in contact with the base member 26, as shown in FIG. 3. As further shown in FIG. 3, the base portion 26 extends upwardly between the flanges 36 and toward the web 38 of the base channel member 32.

The elongate support assembly 12 further includes an upper mounting surface 10, a pair of manual securing guide portions 40, a pair of central lug mount portions 42, a securing block portion 44, and a pair of guide wedge portions 46. As shown in FIGS. 11 and 12, the manual securing guide portions 40 and the central lug mount portions 42 are connected to the outer surface 48 of the flanges 36 of the base channel member 32 and extend upwardly away from the base member 26 and above the upper flat surface 10 of the base channel member 32. To accommodate the elongate rail assembly 8 therebetween, the manual securing guide portions 40 and the central lug mount portions 42 can include a step 50, 52 therein along inner faces 54, 56 thereof to ease insertion of the elongate rail assembly 8 therebetween, such as shown in FIGS. 15 and 16.

Figure 15:
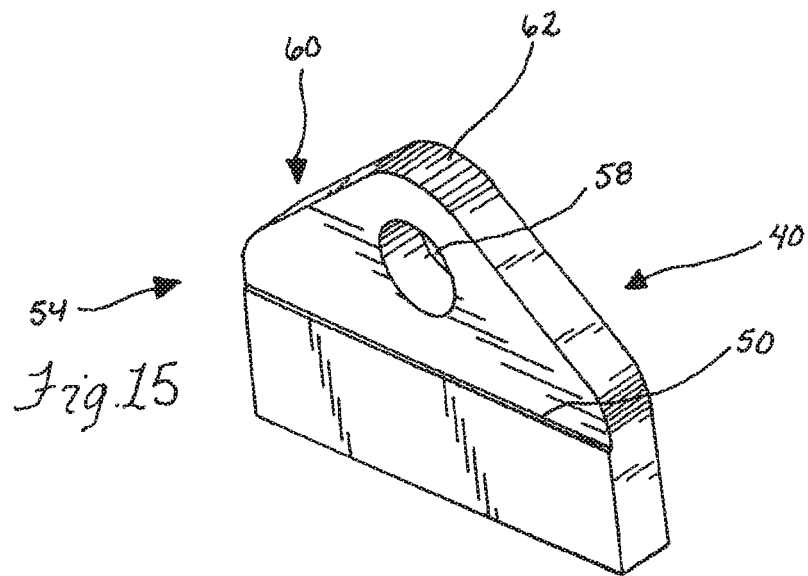
FIG. 15 is a perspective view of the manual securing guide portion of the elongate support assembly of the removable cartridge cleaner assembly of FIG. 1 showing the tapered upper surface thereof.

As shown in FIG. 15, the manual securing guide portions 40 include a throughbore 58 therethrough and a tapered upper surface 60 which extends upwardly to an apex portion 62. As shown in FIG. 18, the tapered upper surface 60 is configured to permit a central pin member 64 to shift therealong, as will be discussed further below.

Figure 16:
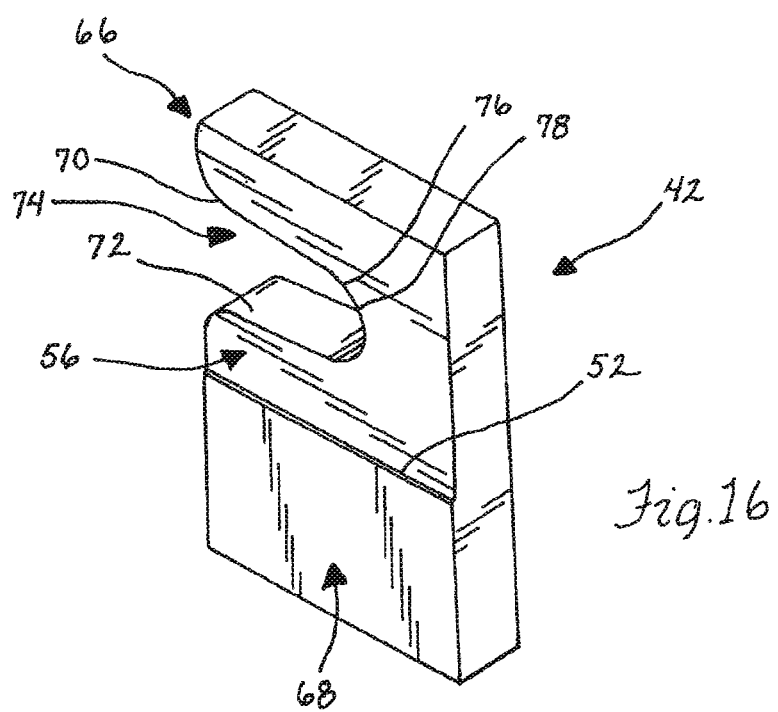
FIG. 16 is a perspective view of the central lug mount portion of the elongate support assembly of the removable cartridge cleaner assembly of FIG. 1 showing the upper inclined surface of the tapered slot configured to engage the center mounting pin and urge the pin downwardly toward the flat upper surface of the elongate support assembly.

The central lug mount portions 42, as shown in FIG. 16 each include a lug portion 66 and a base portion 68, the lug portion 66 and base portion 68 defining upper and lower inclined surfaces or wedge portions 70, 72. The upper and lower inclined surfaces 70, 72 extend obliquely to the longitudinal axis 28 of the elongate support assembly 12 and toward one another to define a tapered slot 74 therebetween. A closed end 76 of the tapered slot 74 comprises a stop portion 78 configured to be engaged by the central pin member 64.

Figure 17:
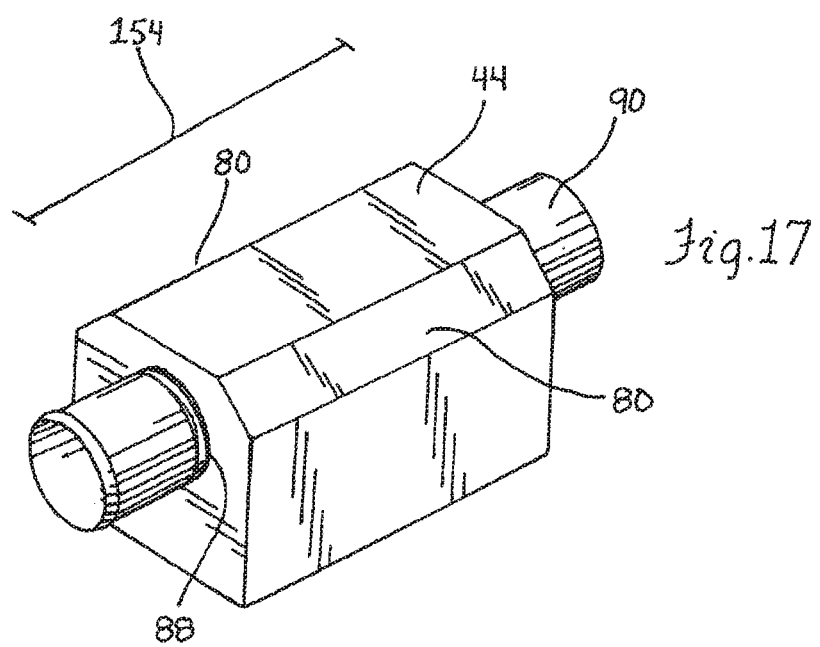
FIG. 17 is a perspective view of the securing block portion and end mounting pin of the elongate support assembly of the removable cartridge cleaner assembly of FIG. 1 showing the end pin member received therein.

The securing block portion 44, as shown in FIG. 17, is positioned on the web portion 38 of the upper flat mounting surface 10 of the base channel member 32. The securing block portion 44 includes chamfered upper edges 80 facing toward either end 82, 84 of the elongate support assembly 12 to ease shifting of the rail member 86 over the securing block portion 44. The securing block portion 44 further includes a throughbore 88 extending in the belt travel direction 19. The throughbore 88 is configured to receive the end pin member 90 as shown in FIGS. 7, 8, 13 and 17 and correspond to the end openings 92 of the legs 94 of the elongate rail assembly 8 as discussed below.

The guide wedge portions 46 as shown in FIGS. 6, 11 and 12 have a trapezoidal configuration 96 with the short parallel side 98 and the long parallel side 100 extending in the belt travel direction 19 and the angled sides 101 extending between the shorter and longer parallel sides 98, 100. The short parallel side 98 is positioned to face toward the manual securing guide portions 40 to help guide the legs 94 of the rail member 86 there around.

The elongate rail or cartridge assembly 8, as shown in FIGS. 1 and 2, includes belt cleaner blade assemblies 22, an elongate rail or cartridge member 86, and a central pin member 64. The pin member 64 can be preassembled with the rail member 86, or can be a serviceable item. The elongate rail member 86 is configured to extend along and below the width of the belt 4 such that the belt cleaner blade assemblies 22 are engaged along the width of the belt 4. As shown in FIG. 9, the rail member 86 is a C-channel member including a web portion 102 and a pair of flanges or legs 94 extending parallel to one another, the lower surfaces 104 thereof configured to slide along the upper mounting surface 10 of the elongate support assembly 12. As shown in FIG. 9, the legs 94 are configured to be thin in profile to minimize contact area between the legs 94 and the elongate support assembly 12. The belt cleaner blade assemblies 22 can include known scraper blades, biasing mechanisms, and other known assemblies used in belt cleaning assemblies.

Further, as shown in FIG. 9, the web portion 102 of the rail member 86 includes a series of apertures therein along the length 106 thereof. In particular, the web portion 102 includes a pair of removal apertures 108 located adjacent either end 110 and 112 of the rail member 86. Further, the web portion 102 includes a series of smaller, blade mounting apertures 114 for mounting the cleaner blades assemblies 22 to the rail member 86.

The flanges 94 each include apertures 116 and 118 therein, the apertures 116 and 118 generally located at a central location vertically on the flange 94 and generally corresponding to the throughbore of the securing block portion 44, the tapered slot 74 of the central lug mount portions 42 and the throughbores 58 of the manual securing guide portions 40. A central aperture 116 is located generally centrally along the length 106 of the flange 94. The end apertures 118 are located generally adjacent the ends 110 and 112 of the flanges 94.

In addition, both flanges 94, at either end 110 and 112 thereof, include an opening 92 therein as best shown in FIGS. 7 and 8. The opening 92 is positioned generally centrally vertically along the flanges 94 of the rail member 86 and extends from the end 110 and 112 of each flange 94 toward the end apertures 118 of the flange 94. The opening 92 includes horizontal run portions 120 extending from a semiannular seat portion 122 thereof to the tapered slot portion 124 having upper and lower inclined surface portions 126 and 128 extending obliquely to the longitudinal axis 28 of the elongate support assembly 12 and to the end 110 and 112 of the flange 94.

The rail member 86 is guided along the upper flat surface 10 of the elongate support assembly 12 past the manual securing guide portions 40 and the central lug mount portions 42 adjacent the outer face 130 of the depending legs 94 of the rail member 86, and past guide wedge portions 46 adjacent the inner face 132 of the depending legs 94 of the rail member 86. Both the manual securing guide portions 40 and the central lug mount portions 42 are spaced so as to receive the rail member 86 therebetween. The guide wedge portions 46, as shown in FIG. 6, are configured to be received between the flanges 94 of the rail member 86, the tapered sides 101 configured to guide the rail member 86 along the desired path on the upper flat surface 10 of the elongate support assembly 12. As shown in FIG. 11, the guide wedge portions 46 are positioned adjacent the central lug mount portions 42 and the securing block portion 44 so as to guide the rail member 86 to the appropriate orientation as the rail member 86 is shifted toward the central lug mount portions 42 and the securing block portion 44.

The orientation and design of the manual securing guide portions 40, central lug mount portions 42, and securing block portion 44 are such as to allow the first end 110 of the rail member 86 to be positioned adjacent the manual securing guide portions 40 and slid along the length of the base channel member 32 to the operable position 134. The tapered upper edge 60 of the manual securing guide portions 40 are configured to ease travel of the central pin member 64, which extends outwardly from the flanges 94 of the rail member 86, over the manual securing guide portions 40 as shown in FIG. 18.

As shown in FIGS. 1, 4 and 5, the tapered slots 74 of the central lug mount portions 42 are configured to face toward the manual securing guide portions 40, therefore allowing the central pin member 64 to be received therein as the rail member 86 moves in a lateral assembly direction 14. Additionally, the tapered slots 124 at the ends 110 and 112 of the depending legs 94 of the rail member 86 are configured to receive the end pin member 90 extending from the securing block portion 44 therein, with the securing block portion 44 disposed between the web portion 102 and the depending legs 94 of the rail member 86 and the upper mounting surface 10 of the elongate support assembly 12.

The inclined surfaces 70 and 72, or wedge portions, defining the tapered slots 74 of the central lug mount portions 42 and the flanges 94 at either end 110 and 112 of the flanges 94 of the rail member 86 are configured to engage and/or be engaged by the corresponding pin member 64 and 90. The upper inclined surfaces 70 of the central lug mount portions 42 are configured to be engaged by the central pin member 64 of the elongate rail assembly 8, and, as the rail member 86 is shifted along the upper mounting surface 10 of the elongate support assembly 12, urge the central pin member 64 and rail member 86 downwardly toward the upper flat surface 10 of the elongate support assembly 12. The central pin member 64 is shifted along the upper inclined surface 70 until central pin 64 engages the stop portion 78 of the tapered slot 74. The engagement of the central pin member 64 and the stop portion 78 of the tapered slot 74 restricts movement of the central pin 64 in the vertical direction and in the horizontal lateral assembly direction 14.

In contrast, as shown in FIGS. 7, 9 and 10, the lower inclined surfaces or wedges 128 of the openings 92 of the flanges 94 of the rail member 86 are configured to engage the end pin member 90. As the rail member 86 shifts across the upper flat mounting surface 10 of the elongate support assembly 12, the lower inclined surfaces 128 of the rail member 86 flanges further engage the end pin member 90 and urge the rail member 86 toward the upper flat surface 10 of the elongate support assembly 12. The end pin member 90 further travels along the lower inclined surface 128 to the horizontal run portions 120 of the opening 92. The horizontal run portion 120 is configured to restrict further vertical movement of the rail member 86 relative to the end pin member 90 and includes a semiannular seat portion 122 at the end thereof. As a result, the rail member 86 is shifted into tight engagement with the upper flat surface 10 of the elongate support assembly 12, thereby minimizing any space or gaps at the interface between the lower surface of the flanges 94 of the rail member 86 and the upper flat surface 10 of the elongate support assembly 12.

The openings 92 of the flanges 94 are configured so that the end pin member 90 may or may not shift along the horizontal run portions 120 to the semiannular seat portion 122 or stop portion of the opening 92. The horizontal run portion 120 is configured so that the end pin member 90 does not necessarily engage the semiannular portion 122. While the distance 136 between the flange openings 92 and the central pin member 64 should be generally equal to the distance 138 between the end pin member 90 and the stop portion of the tapered slots 74 of the central lug mount portions 42, the configuration of the horizontal run portion 120 provides a degree of tolerance when new or different rail members 86 with a distance different from the elongate support assembly 12 distance is installed on the same elongate support assembly 12. As a result, movement of the rail member 86 in the lateral assembly direction 14 may be impeded solely by the engagement of central pin member 64 and the central lug mount portions 42.

Figure 13:
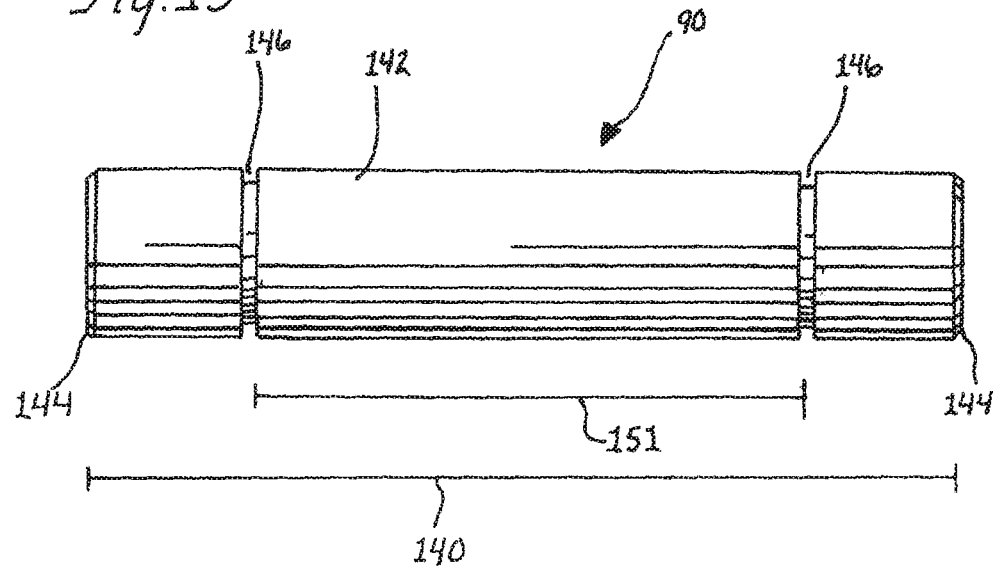
FIG. 13 is an end elevational view of the end mounting pin.
Figure 14:
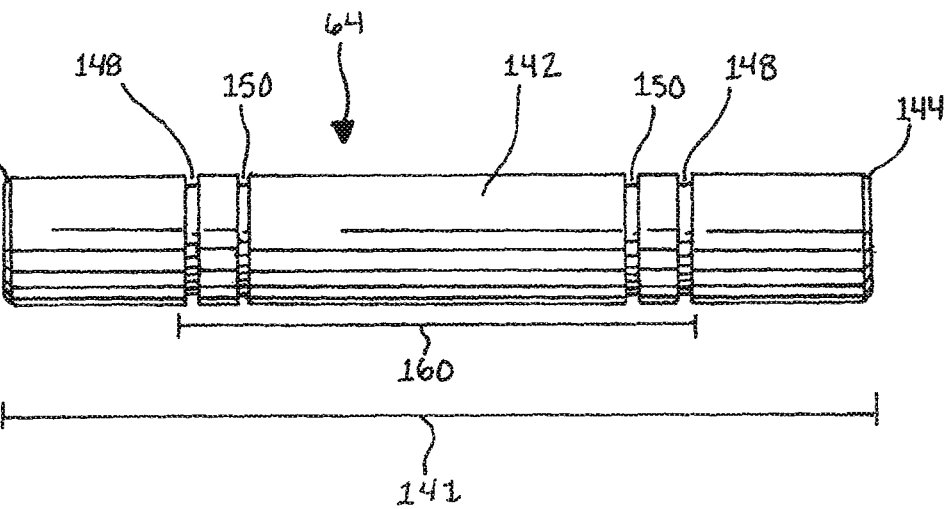
FIG. 14 is an end elevational view of the center mounting pin.

As shown in FIGS. 13 and 14, the end pin member 90 and the central pin member 64 each have a predetermined length 140 and 141, respectively, an annular outer surface 142, chamfered ends 144, and a predetermined number of grooves 146, 148 and 150 positioned along the lengths 140 and 141 of the pin members 64 and 90 and around the annular outer surfaces 142 thereof. The grooves 146, 148 and 150 are configured to receive a securing member 152 therein, such as a clip as shown in FIG. 6. With regards to the end pin member 90 shown in FIG. 13, the grooves 146 are spaced a first distance 151 corresponding to the width 154 of the securing block portion 44. Therefore, when the end pin member 90 is installed in the throughbore 88 of the securing block portion 44, and securing members 152 are inserted into the grooves 146, the end pin member 90 is securely disposed in the securing block portion 44.

With regards to the central pin member 64, as shown in FIG. 14, the central pin member 64 includes a pair of outer grooves 148 and a pair of inner grooves 150. The two outer grooves 148 are separated a distance 160 equal to the distance 162 between the inner surfaces 132 of the flanges of the rail member 86. Thus, when the central pin member 64 is inserted into the central aperture 116 of the flanges of the rail member 86, and the securing members 152 are installed in the grooves 148, the central pin member 64 is securely fastened to the rail member 86.

In order to provide additional support to the rail member 86 and central pin member 64, a reinforcing member (not shown) can be installed along the inner face 132 of the flanges 94. The reinforcing member is positioned so as to overlap with the central flange aperture 116 and extend toward each flange end 110, 112. The reinforcing member includes a throughbore corresponding to the flange central aperture 116 and configured to receive the central pin member 64 therein. Further, to accommodate the reinforcing member, the outer and inner grooves 148, 150 of the central pin member 64 are separated by a distance (not shown) corresponding to the width of the reinforcing member. After securing member 152 are positioned in the inner grooves 150 thus further securing the central pin member 64 in place. The reinforcing member is preferably made of a strong material, such as aluminum or stainless steel, and provides additional strength to the rail member 86 around the central pin member 64.

As shown in FIGS. 1-3A, 24 and 25-27, the rail member 86 is further positively secured in place by a hitch pin 164. As shown in FIG. 3, the hitch pin 164 includes an oversized head portion 166 and a shaft portion 168 configured to extend through the throughbores 58 of the manual securing guide portions 40 and through the end apertures 118 of the flanges 94 of the rail member 86. The shaft 168 of the hitch pin 164 further includes a throughbore 170 extending across the diameter 172 of the shaft 168 adjacent a distal end 174 thereof. The hitch pin 164 is secured in place by a cotter pin 176 configured to be received in the throughbore 170 of the hitch pin 164 and extend therethrough.

As shown in FIG. 19, the throughbores 58 of the manual securing guide portions 40 and the apertures 118 of the flanges 94 are offset from one another and oversized with respect to the shaft 168 of the hitch pin 164. As a result, when the shaft 168 of the hitch pin 164 is used to positively secure the rail member 86 to the elongate support assembly 12, a bottom portion 178 of the hitch pin shaft 168 engages a bottom portion 180 of the flange apertures 118. Additionally, a top portion 182 of the hitch pin shaft 168 engages a top surface portion 184 of the throughbores 58 of the manual securing guide portions 40. As a result, a tighter fit with less friction during installation and removal is achieved because the hitch pin 164 is only engaged along the upper and lower surface portions 178, 182 thereof instead of along the entire annular outer surface 186 of the hitch pin shaft 168.

Figure 26:
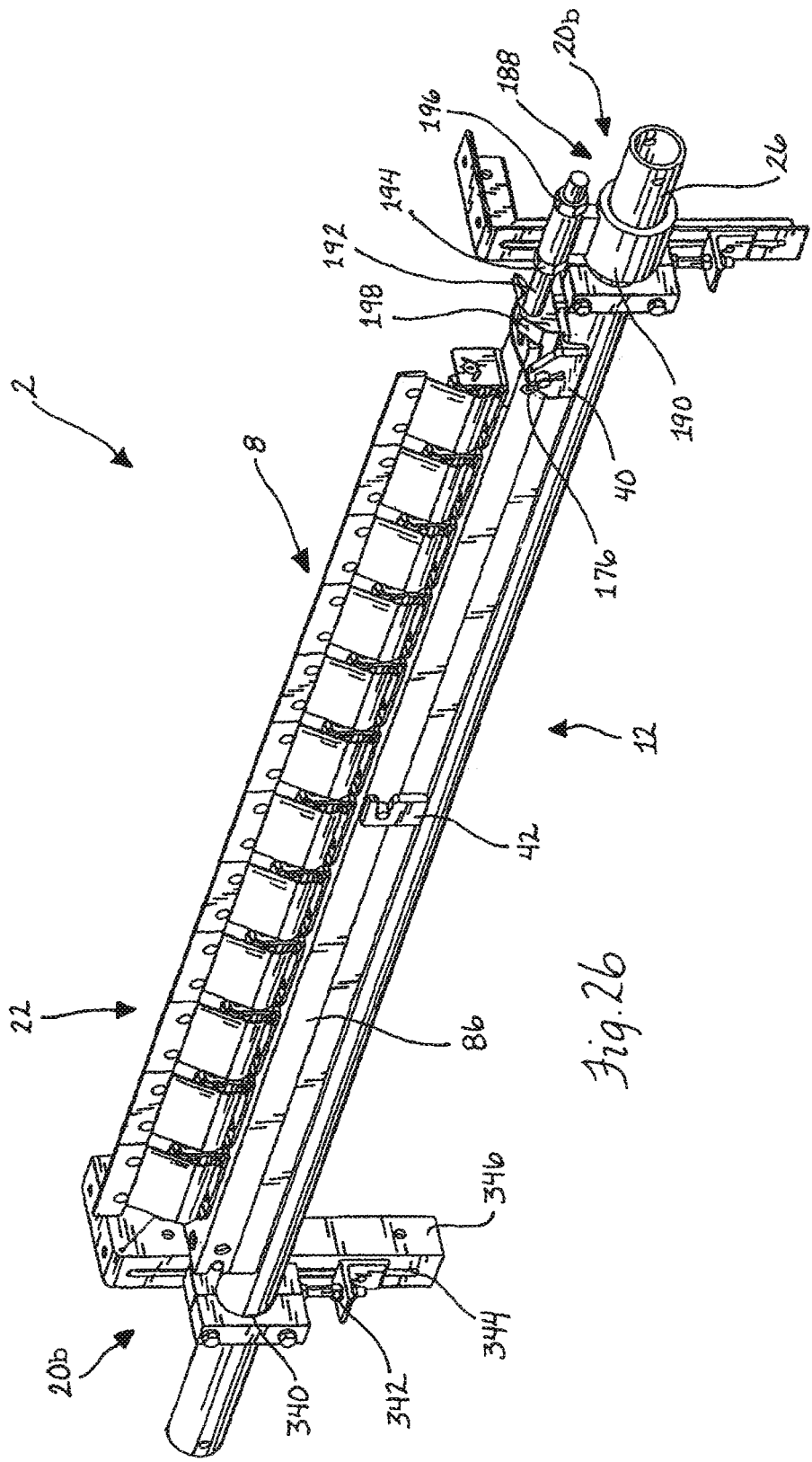
FIG. 26 is a perspective view of an alternative embodiment of the removable cartridge cleaner assembly of FIG. 1 showing an alternative resilient mount and an end securing mechanism for further manually securing the elongate channel member on the elongate support assembly.
Figure 27:
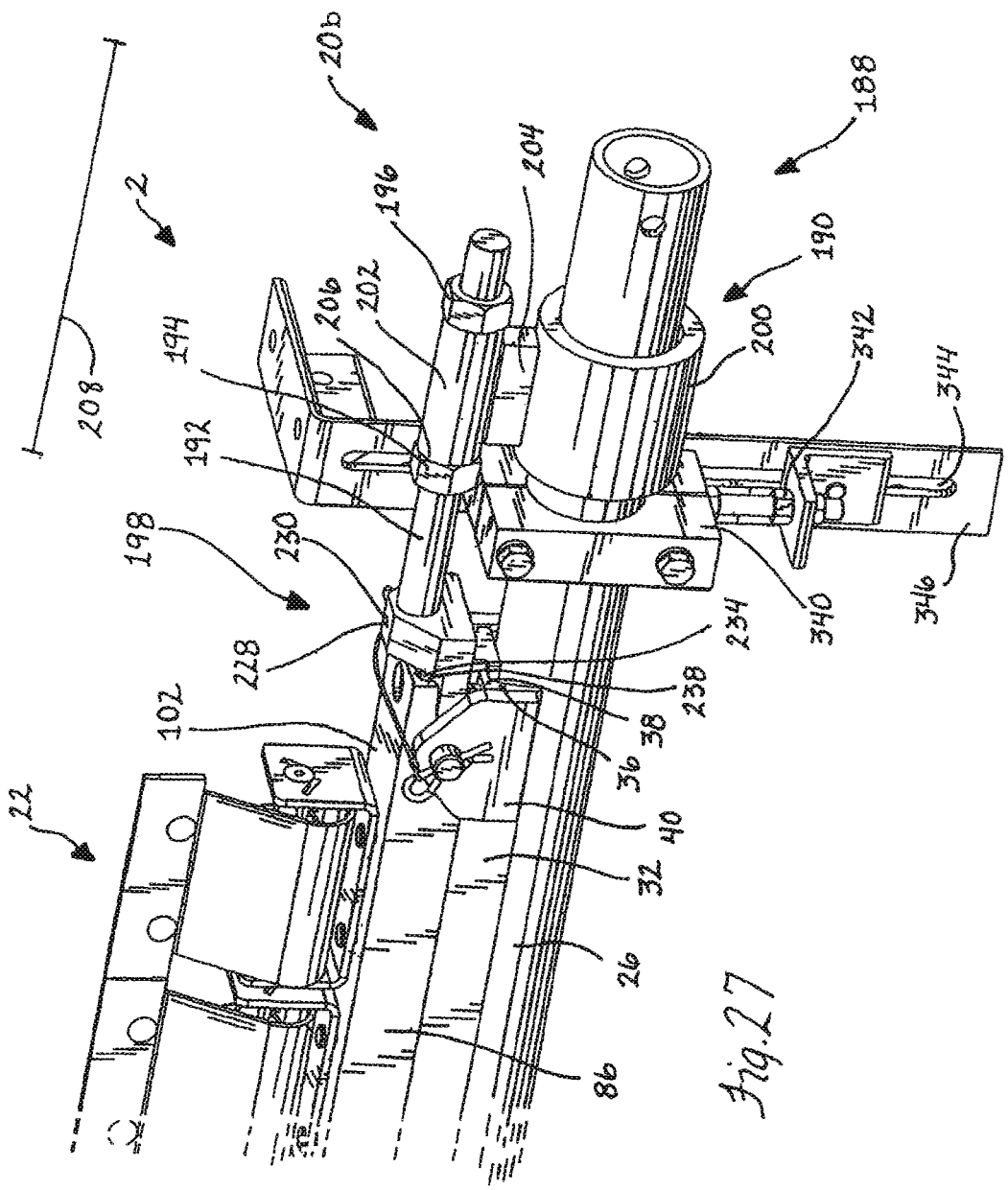
FIG. 27 is an enlarged perspective view of the removable cartridge cleaner assembly of FIG. 26 showing the resilient mount and end securing mechanism.

In one embodiment, the rail member 86 is further secured to the elongate support assembly 12 via an end securing mechanism 188. As shown in FIGS. 26 and 27, the end securing mechanism 188 includes a tubular sleeve member 190, a pole member 192, a pair of guide nut members 194, 196 and an end locking member 198. The sleeve member 190 includes a large tubular sleeve portion 200 configured to receive the base member 26 of the elongate support assembly 12 therethrough and a small tubular sleeve portion 202 configured to receive the pole member 192 therethrough. The large and small sleeve portions 200 and 202 are separated and connected via a block portion 204 sized to position the small sleeve portion 202 at a desired location in relation to the rail member 86. The large sleeve portion 200 is configured to have a running fit with the base member 26 of the elongate support assembly 12 to permit installation and removal of the large sleeve portion 200. The large sleeve portion 200 can be positively secured (not shown) to the base member 26, such as by a bolt or other known means. The small sleeve portion 202 is configured to have an inner diameter 206 sized larger than the pole member 192 as will be discussed below.

The pole member 192 is threaded along its length 208 and is configured to extend from the end locking member 198, through the small sleeve 202 and beyond. The guide nut members 194 and 196, as shown in FIGS. 27 and 29, each include a threaded inner surface 210 configured to interact with and receive the threaded pole member 192 therein. The guide nut members 194 and 196 each include an annular outer surface portion 212 sized to be received in the small sleeve portion 202 of the sleeve member 190. Further, the guide nut members 194 and 196 each include an engagable outer surface portion 214 sized larger than the small sleeve portion 202 of the sleeve member 190 and configured to be engaged to shift the guide nut 194 and 196 along the threaded pole member 192. As shown in FIG. 29, the engagable outer surface portion 214 comprises six flat surfaces 216, and more particularly, three sets of parallel flat surfaces.

The end locking member 198, as shown in FIGS. 27 and 28, is configured to engage the base channel member 32 of the elongate support assembly 12 and the rail member 86, and urge the base channel member 32 and the rail member 86 toward one another. In particular, the end locking member 198 includes a base portion 218, a threaded pole throughbore 220 configured to receive the threaded pole member 192 therein, upper wedge portions 222 configured to be received in the openings 92 of the rail member 86, a depending portion 224, and depending wedge portions 226. The threaded pole member 192 can further be secured to the end locking member 198 by a set screw 228 extending through a threaded set screw throughbore 230 as shown in FIG. 27. The threaded set screw throughbore 230 is configured to transversely intersect the threaded pole throughbore 220.

To accommodate the depending portion 224, the web portion 38 of the base channel member 32 includes a corresponding open ended slot (not shown) formed at the end 234 thereof. The depending portion 224 is configured to be received in and extend through the slot 232 and be received between the legs 36 of the base channel member 32. The depending wedge portions 226 are configured so that inclined upper surfaces 236 thereof engage the lower surface 238 of the web portion 38 of the base channel member 32. As the inclined upper surfaces 236 of the depending wedge portions 226 travel along the lower surface 238 of the web portion 38 the entire end locking member 198 is urged downwardly toward the base member 26 of the elongate support assembly 12. As a result, the rail member 86, which is engaged with the upper wedge portions 226, is further urged into tight engagement with the upper mounting surface 10 of the elongate support assembly 12.

To secure the position of the end locking member 198, a first guide nut member 194 and a second guide nut member 196 are positioned on the threaded pole member 192, with the first guide nut member 194 positioned between the small sleeve portion 202 and the end locking member 198 and the second guide nut member 196 positioned on the opposite side of the small sleeve portion 202, the annular outer surfaces 212 thereof received in the small sleeve portion 202 of the sleeve member 190.

The threaded pole member 192 and end locking member 198 can be shifted away from the rail member 86 by adjusting the first guide nut member 194 away from the small sleeve portion 202 of the sleeve member 190 and toward the end locking member 198. As a result, the pole member 192 can be shifted away from the rail member 86 until the small annular surface 212 of the first guide nut member 194 is received in the small sleeve portion 202 of the sleeve member 190. The second guide nut member 196 can then be subsequently shifted along the threaded pole member 192 toward the small sleeve portion 202 to secure the small sleeve portion 202 between the first and second guide nut members 194, 196.

Alternatively, the threaded pole member 192 and end locking member 198 can be shifted toward the rail member 86 by adjusting the second guide nut member 196 away from the small sleeve portion 202 of the sleeve member 190. As a result, the pole member 192 can be shifted toward the rail member 86 until the small annular surface 212 of the second guide nut member 196 is received in the small sleeve portion 202 of the sleeve member 190. The first guide nut member 194 can then be subsequently shifted along the threaded pole member 192 toward the small sleeve portion 202 to secure the small sleeve portion 202 between the first and second guide nut members 194, 196.

As shown in FIGS. 1 and 2, a resilient mount 20 is positioned adjacent either end 82, 84 of the elongate support assembly 12. As shown in FIG. 1, the resilient mount 20a adjacent to the securing block portion 44 of the elongate support assembly 12 can be any known resilient mount 20a, such as a spring tensioner.

Figure 20:
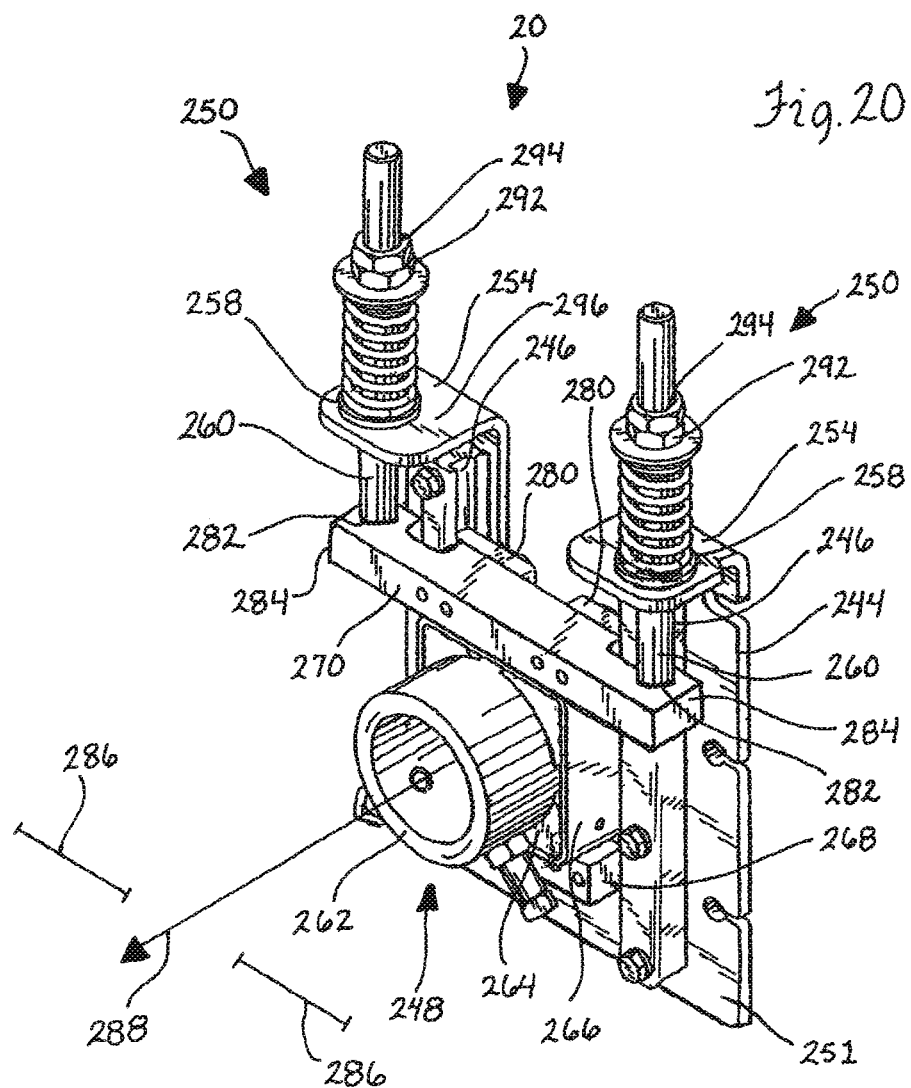
FIG. 20 is a perspective view of the resilient mount of the removable cartridge cleaner assembly of FIG. 1 showing two spaced resilient mechanisms and a U-shaped bracket.
Figure 21:
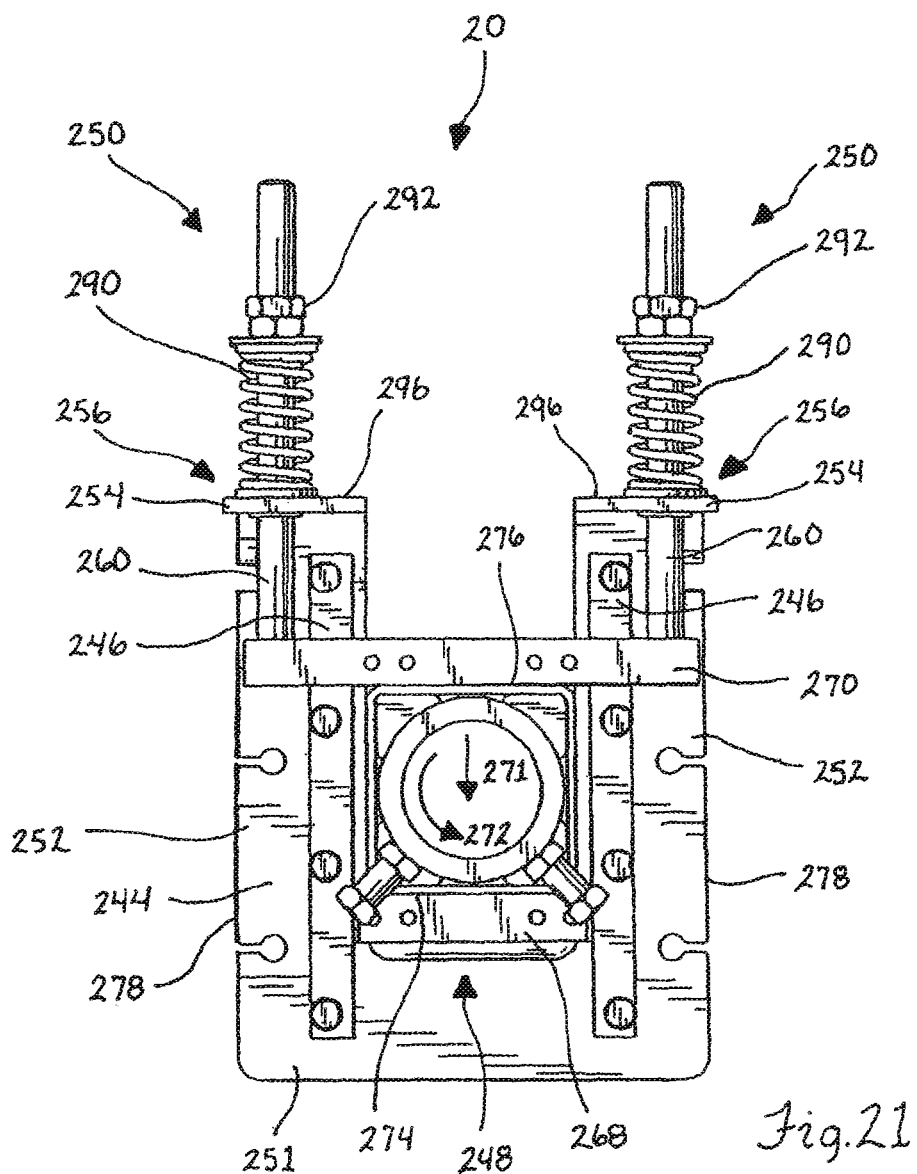
FIG. 21 is an end elevational view of the resilient mount of FIG. 20.

The resilient mount 20 adjacent the manual securing guide portions 40 of the elongate support assembly 12 is configured to permit shifting of the rail member 86 off of the flat upper surface 10 of the elongate support and assembly and out from under the conveyor belt 4. As shown in FIGS. 1, 20 and 21, the resilient mount 20 includes a U-shaped bracket 244, track members 246, a housing assembly 248 configured to travel along the track members 246 of the bracket 244, and resilient mechanisms 250 configured to resist vertical movement of the housing assembly 248. The U-shaped bracket 244 includes a base portion 251 and spaced leg portions 252 extending upwardly therefrom, with a shelf 254 extending transversely from the distal ends 256 of the legs portions 252. As shown in FIG. 20, the shelf 254 includes a leg mounting portion 258, such as an aperture therein configured to receive a threaded pole member 260 of the resilient mechanism 250 therein. The legs 252 are further configured to define a space therebetween to permit the rail member 86 to pass therethrough. As shown in FIG. 1, only one such U-shaped resilient mount 20 having upwardly extending legs 252 can be employed with the cartridge cleaner assembly 2 being installed and removed from this one side of the belt 4 since the other mount 20 has an inverted u-shaped construction with downwardly extending legs 252 which does not permit the cartridge cleaner assembly 2 to fit between split resilient mechanisms 250 such as present on the other U-shaped mount 20. Manifestly, if both sides of the belt 4 have U-shaped resilient mounts 20 arranged with their legs 252 extending upwardly (see FIG. 25) and the elongate support assembly 12 has a double wide configuration with an identical opposing configuration along each half thereof under a wide belt 4, then a pair of the above-described cartridge cleaner assemblies 12 can be installed and removed from opposite sides of the belt 4.

The housing assembly 248 includes a pole receiving portion 262, resilient portions 264, an inner housing portion 266, and lower and upper block assemblies 268 and 270. The pole receiving portion 262 is configured to receive the pole 26 of elongate support assembly 12 extending therethough, and is positioned within the inner housing portion 266. As a result, the inner housing portion 266, and thereby the housing assembly 248, receives vertical and rotational forces 271 and 272 applied to the pole receiving portion 262 by the elongate support assembly 12. As shown in FIG. 20, the resilient portions 264 are positioned between the pole receiving portion 262 and the inner housing portion 266.

As shown in FIGS. 20 and 21, the lower block assembly 268 is secured to the lower outer surface 274 of the inner housing portion 266 and extends between track members 246 of the bracket 244. The lower block assembly 268 further includes guide blocks (not shown) configured to engage the track members 246 and slide therealong.

The upper block assembly 270 is secured to the upper outer surface 276 of the inner housing portion 266 and extends from either outer vertical edge 278 of the bracket 244. The upper block assembly 270 includes upper guide blocks 280 configured to engage the track members 246 and slide therealong. As shown in FIG. 20, the upper block assembly 270 further includes mounting portions 282, such as threaded throughbores adjacent either end 284 thereof configured to receive a threaded rod 260 of the resilient mechanisms 250 therein. As shown in FIGS. 20 and 21, the threaded throughbores 282 are offset a predetermined distance 286 from an axis 288 defined by the base member 26 extending through the pole receiving portion 262 of the housing assembly 248.

As shown in FIGS. 1, 2, 20 and 21, the resilient mechanism 250 includes a threaded pole member 260, a resilient member 290, such as a spring, and a securing member 292, such as a nut having a threaded interior surface 294. As shown in FIG. 20, the threaded pole member 260 is received in the throughbores 282 of the upper block assembly 270 and extends upwardly therefrom. The threaded pole member 260 further extends through and beyond the shelf aperture 258 of the bracket 244. The resilient member 290 is positioned on the upper surface of the shelf 296, with the securing members 292 positioned on the threaded rod 260 adjacent the resilient member 290.

As discussed above, the housing assembly 248 is configured to receive vertical forces 271 and rotational forces 272 from an elongate member 26 received in the pole receiving portion 262, such as the elongate support assembly 12. Vertical forces 271 applied to the housing assembly 248 are resisted by the resilient mechanisms 250 as discussed above. Rotational forces 272, however, are resisted by the engagement of the upper and lower block assemblies 268, 270 with the track portions 246 and the engagement of the resilient mechanism 250 with the leg mounting portion 258 or shelf aperture of the bracket 244. By positioning the mounting portion 282 away from the housing assembly 248, such as adjacent either end 284 of the upper housing block 270, the force acting thereon is reduced. As a result the frictional forces between the resilient mechanisms 250 as it engages the inner surfaces (not shown) of the shelf apertures 258 is further reduced, thereby reducing wear and providing smoother vertical travel of the housing assembly 248.

Figure 24:
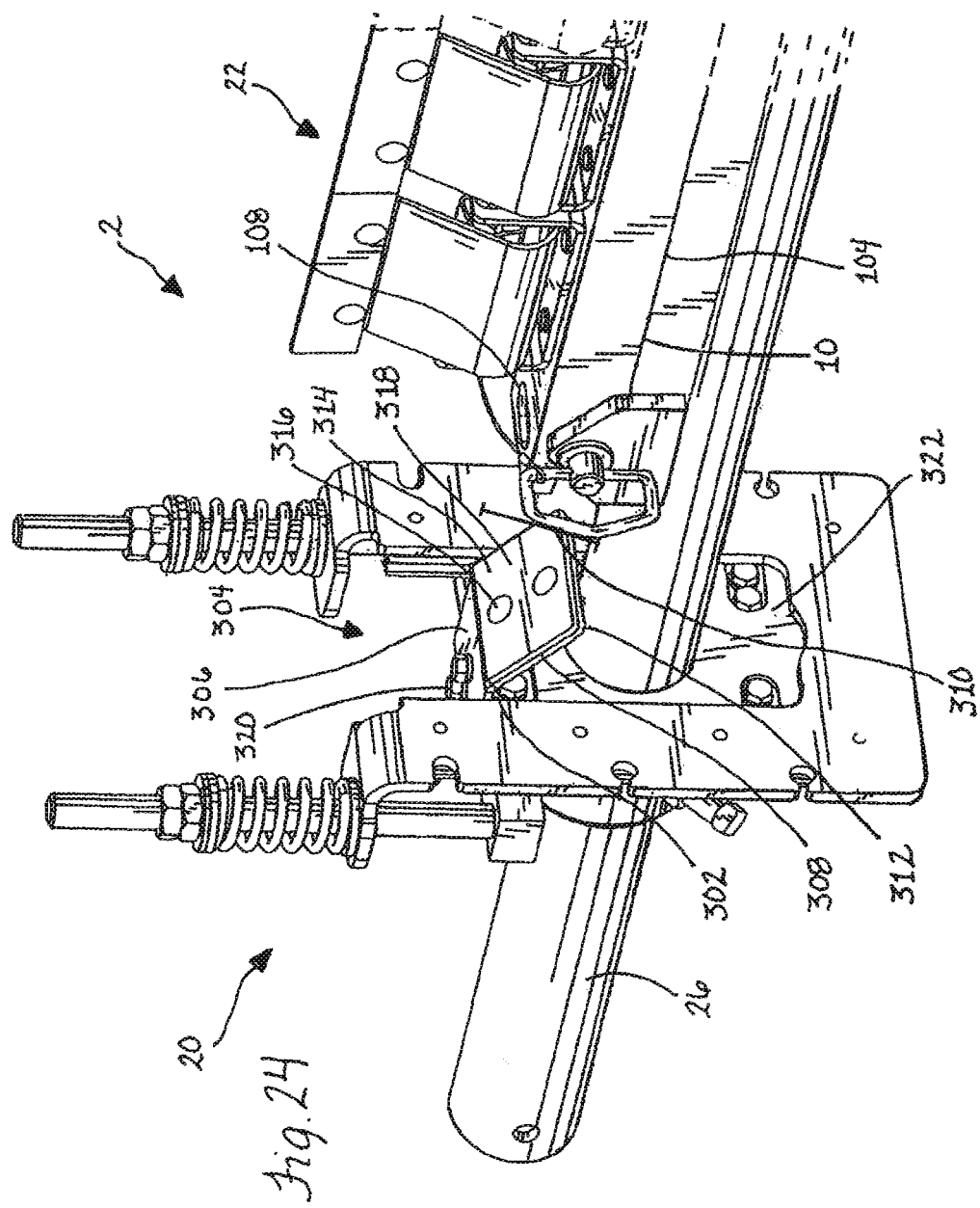
FIG. 24 is an enlarged perspective view of the removable cartridge cleaner of FIG. 1 showing a dust guard member of the resilient mount extending from the upper block assembly, between the rail members and along the bracket legs and further showing a ramp member of the resilient mount including an inclined portion having a low friction material connected to the upper surface thereof.

In some instances, such as shown in FIG. 24, the flat upper mounting surface 10 of the elongate support assembly 12 may be lower than the upper surface 302 of the upper block assembly 270 of the resilient mount 20. To ease removal of the rail member 86, the resilient mount 20 can include a ramp member 304 connected thereto. The ramp member 304 includes a horizontal portion 306 and an inclined portion 308 extending obliquely therefrom and toward the base member 26 of the elongate support assembly 12. The horizontal portion 306 is positively secured to the upper surface 302 of the housing assembly 248 of the resilient mount 20.

The inclined portion 308 extends downwardly toward the base member 26 a distance 310 such that the distal end 312 of the inclined portion 308 is positioned below the flat upper mounting surface 10 of the elongate support assembly 12. As shown in FIG. 24, the inclined portion 308 can include a low friction member 314, made of a material such as UHMW, positively secured, such as by carriage bolts, to the upper surface thereof 316. The low friction member 314 provides a low friction surface 318 for legs 94 of the rail member 86 to slide along the inclined portion 308. In this manner, the inclined portion 308 is configured to allow the legs 94 of the rail member 86 to slide off of the flat upper surface 10 of the elongate support assembly 12 and onto the upper surface 318 of the low friction member 314 of the inclined portion 308 and travel upwardly between the legs 252 of the mounting bracket 244 and away from the elongate support assembly 12. As shown, the horizontal portion 306 of the ramp portion 304 is connected to the upper block assembly 270 by a pair of bolts 320 positioned so that as the rail member 86 slides thereacross the bolts 320 are positioned below the web portion 102 and between the flanges 94 the rail member 86.

In one embodiment, as shown in FIGS. 23 and 24, the resilient mounts 20 and 20a include dust guard members 322 and 322a. The dust guard members 322 and 322a are mounted to the back faces 324 and 324a of the housing assemblies 248 and 248a of the resilient mounts 20 and 20a. As shown in FIGS. 23 and 24, the dust guard members 322 and 322a are configured to extend from the upper block assemblies 270 and 270a of the housing assemblies 248 and 248a and along and beyond the back faces 324 and 324a of the housing assemblies 248 and 248a. As shown, the dust guard members 322 and 322a include pole apertures 326 and 326a to accommodate the base member 26 of the elongate support assembly 12 and fastener apertures 328 and 328a to accommodate the fasteners 330 and 330a of the lower block assemblies 268 and 268a of the housing assemblies 248 and 248a.

Figure 22:
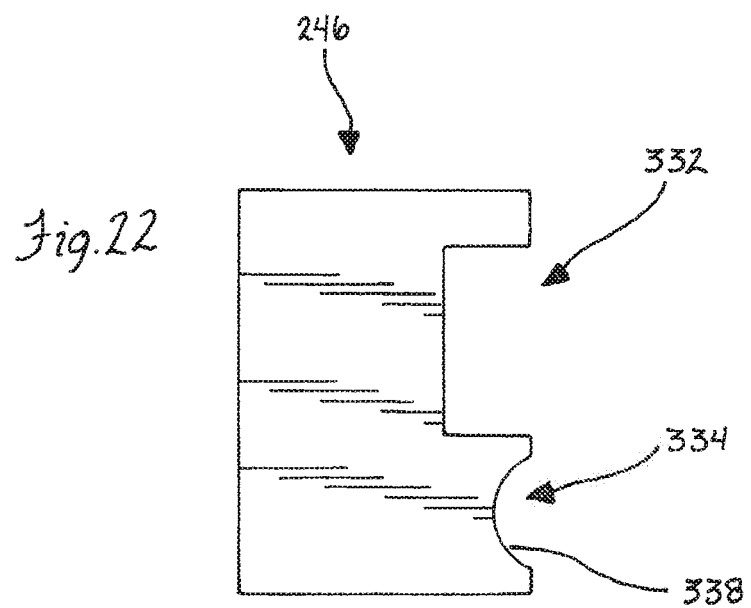
FIG. 22 is a top plan view of the trail rail member of a resilient mount showing a squared track portion and a semiannular track portion.

As described above, the resilient mounts 20 each include a bracket 244 having a base portion 251 and a pair of spaced legs 252. Further, as shown in FIGS. 20, 21 and 23, the resilient mount 20 includes a pair of track members 246 mounted on each of the legs 252. As shown in FIG. 22, the guide track members 246 include rail track portions 332, 334 for mounting the housing assembly 248 and dust guard member 322 thereto. The track portions 246 are further configured to enable the housing assembly 248 and dust guard member 322 to shift along the legs 252 of the bracket 244.

In particular, the track portions 246 include a first, square-shaped track 332 configured to receive the upper and lower block assemblies 268, 270 of the housing assembly 248 and allow the block assemblies 268, 270 to translate therealong. Additionally, the guide tracks 246 include a second track 334 to receive cover portions 336 of the dust guard members 322 therein. As shown in FIG. 22, the second track 334 has a rounded or semiannular configuration 338.

The second track 334 and the dust guard members 322 are configured to permit the dust guards members 322 to translate therealong and restrict dust from moving between the legs 252 of the mounting bracket 244 of the resilient mount 20. Further, the dust guard 322 acts to restrict dust and material interaction with the resilient rubber portions 264 of the housing assembly 248, thereby reducing wear on the resilient rubber portions 264. Additionally, a slide interface between the cover portion 336 and the second track 334 restricts debris movement through the bracket legs 252 and debris accumulation in the track portions 246, particularly the first track 332 along which the housing assembly 248 shifts, thereby providing a smoother slide interface and allowing freer movement of the housing assembly 248 along the tracks 246.

The dust guard members 322 can be composed of any material suitable for the application. In one embodiment, the dust guard members 322 are made of a deformable plastic and are configured to have square edges. Over time, the square edges deform with the rounded or semiannular track 334 to provide a smooth running interface.

Other mounts 20 can be utilized with the removable cartridge cleaner assembly 2, so long as the mounts 20 permit removal of the rail member 86 with the cleaner blades 22 attached thereto. An alternative mount 20b, as shown in FIGS. 26 and 27, includes a clamp block 340 configured to receive the base member 26 of the elongate support assembly 12 therein. The clamp block 340 is supported from below by a threaded member 342, such a bolt. The clamp block 340 is configured to be received in a vertical slot 344 of a support member 346 and shifted therealong.

Figure 25:
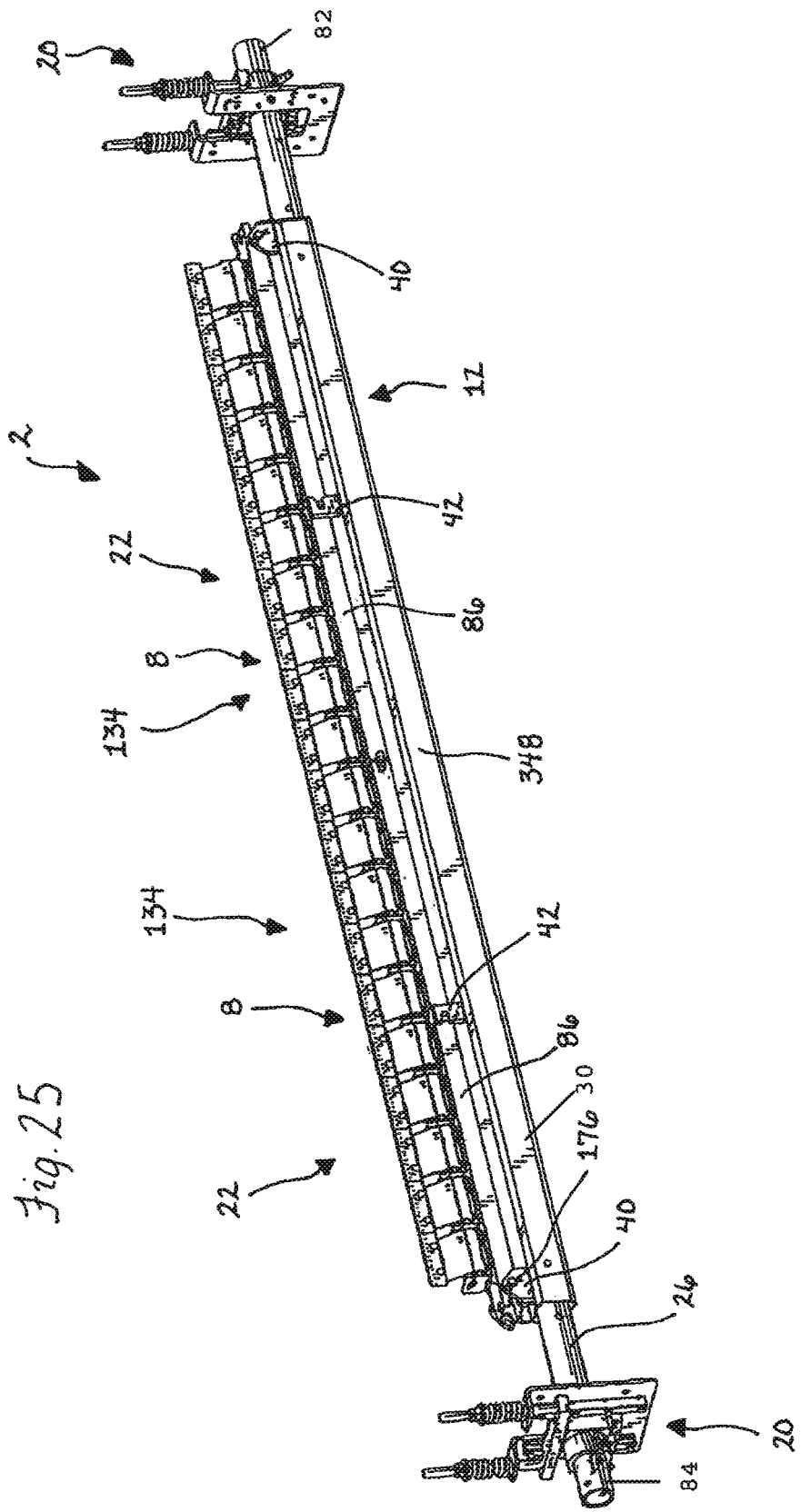
FIG. 25 is a perspective view of an alternative embodiment of the removable cartridge cleaner assembly of FIG. 1 showing a pair of rail members having scraper blades mounted thereon extending a central portion of the elongate support assembly toward either end thereof.

In an alternative embodiment, as shown in FIG. 25, the removable cartridge cleaner assembly 2 may include a pair of rail members 86 mounted on the elongate support assembly 12. As shown in FIG. 25, the elongate support assembly 12 includes a reinforcing portion 30, such as a rectangular tube, extending along a portion of the length of the base member 26. As shown, the reinforcing portion 30 also corresponds to the base channel member 32 of the elongate support assembly 12 discussed above. The reinforcing portion 30 provides additional strength to the elongate support assembly 12 for wider belts, such as belts wider than 72".

To accommodate two rail members 86, each rail member 86 extends from a generally central portion 348 of the elongate support assembly 12 toward either end thereof 82 and 84, the elongate support assembly 12 including a pair of securing block portions 44 located at a generally central portion 348 of the elongate support assembly 12, two pairs of central lug mount portions 42, and two pairs of manual securing guide portions 40 located adjacent either end 82 and 84 of the elongate support assembly 12. In this embodiment, the rail members 86 are installed from either end 82 and 84 of the elongate support assembly 12 and are shifted along the flat upper surface 10 of the reinforcing portion 30 of the elongate support assembly 12 toward an operative position 134 wherein one end of each of the rail members 86 is positioned at a generally central location 348 of the elongate support assembly 12. As shown in FIG. 25, the resilient mounts 20 located at either end 82 and 84 of the elongate support assembly 12 are configured to allow for easy removal and insertion of the rail members 86 from either end 82 and 84 of the elongate support assembly 12.

A method of installing and removing the rail member 86 having cleaning blade assemblies 22 mounted thereon is discussed herein. To install a rail member 86, a first end 110 of the rail member 86, with cleaning blade assemblies 22 mounted thereon, is positioned adjacent the resilient mount 20 nearest the manual securing portions 40. The first end 110 of the rail member 86 is shifted between the upstanding legs 252 of the resilient mount 20 toward the flat mounting surface 10 of the elongate support assembly 12.

As the first end 110 of the rail member 86 is shifted between the upstanding legs 252 of the resilient mount 20 in the lateral assembly direction 14, the distal ends 104 of the flanges 94 of the rail member 86 are positioned on the flat upper surface 10 of the elongate support assembly 12. The rail member 86 is shifted along the flat upper surface 10 of the elongate support assembly 12 until the central pin member 64 engages the tapered upper surface 60 of the manual securing guide portions 40. As the rail member 86 is further shifted in the lateral assembly direction 14 the central pin member 64 shifts along the tapered upper surface 60 of the manual securing guide portions 40, over the apex 62 and down toward the flat upper surface 10.

The rail member 86 is further shifted until the central pin member 64 engages the upper inclined surfaces 70 of the central lug mount portions 42 and the lower inclined surfaces 128 of the tapered slots 124 of the legs of the rail member 86 engages the end pin member 90. The rail member 86 is further shifted in the lateral assembly direction 14 such that the pin members 64 and 90 travel along the inclined surfaces 70, 128, thereby camming the rail member 86 downwardly so that the rail member 86 is urged into tight engagement with the upper mounting surface 10. The rail member 86 is shifted in the lateral assembly direction 14 until the center pin member 64 engages stop portions 78 of the tapered slots 74 of the central lug mount portions 42 and the end pin member 90 is positioned in the horizontal run portion 120 of the slot 92 of the depending legs 94 of the rail member 86, thereby defining the operative position 134 of the rail member 86. As a result, any spaces or gaps at the interface between the distal ends 104 of the legs 94 of the rail member 86 and the flat upper surface 10 of the elongate support assembly 12 are minimized, therefore reducing the spaces available for the debris accumulation.

To secure the rail member 86 in the operative position 134, the second end 112 of the rail member 86 is positively secured to the manual securing guide portions 40 of the elongate support assembly 12. As shown in FIGS. 3 and 19, the shaft 168 of a hitch pin 164 is inserted through the throughbores 58 of the manual securing guide portions 40 and the end apertures 118 of the legs 94 of the rail member 86 adjacent the second end 112 thereof. The hitch pin shaft 168 further includes a throughbore 170 extending therethrough adjacent the distal end 174 of the hitch pin 164. A cotter pin 176 is inserted into the throughbore 170 to restrict movement of the hitch pin 164 and secure the rail member 86 in place. As suggested above, the described installation method can be used to install rail members 86 from either or both ends 82 and 84 of the elongate support assembly 12 depending on the configuration of the elongate support assembly 12.

To remove the rail assembly 8, including the rail member 86 and cleaner blade assemblies 22, the cotter pin 176 is removed from the hitch pin 164 adjacent the second end 112 of the rail member 86. The hitch pin 164 is then removed from the rail member 86.

A rail member removal tool 350, as shown in FIG. 30, is the used to remove the rail member 86. The rail member removal tool 350 includes an elongate handle portion 352, a crook portion 354 and a lip portion 356 at the distal end 358 of the rail member removal tool 350. The distal end 358 of the tool 350 is inserted into the web end removal aperture 108 of the web portion 102 of the second end 112 of the rail member 86 and is positioned such that the upper surface 360 of the lip portion 356 engages the lower surface 238 of the web portion 28 of the base channel member 26 of the elongate support assembly 12. A downward force is exerted on the handle portion 352 of the tool 350, which causes the tool 350 to rotate around the point of engagement between the lip portion 356 and base channel member 26. As a result, the crook portion 354 disposed within the web end removal aperture 108 is engaged therewith and urges the rail member 86 in the removal direction 362 opposite the lateral assembly direction 14.

The configuration of the elongate rail member 86 and the elongate support assembly 12 assist in the removal of the rail member 86. In particular, by minimizing the areas of engagement between the elongate rail member 86 and the elongate support assembly 12, any force needed beyond the normal sliding of the rail member 86 is preferably limited to the initial shifting of the rail member 86 such that the pin members 64, 90 and tapered slots 74 and 124 unengaged from one another. As a result, the leverage provided by the downward force of the rail member removal tool 350 is not required during the entire removal process.

As the rail member 86 is shifted in the removal direction 362 the central pin member 64 disengages the inclined surfaces 70 of the central lug mounting portions 42, and the inclined surfaces 128 of the openings 92 of the legs 94 of the first end 110 of the rail member 86 disengage the end pin member 90. The rail member 86 is then shifted in the removal direction 362 until the rail member 86 is completely removed from the flat upper surface 10 of the elongate support assembly 12. The rail member 86 is shifted such that the distal ends 104 of the flanges 94 of the rail member 86 shift along the upper surface 318 of the ramp member 304 up and away from the base channel member 26 and between the bracket legs 252 of the resilient mount 20. As suggested above, the described installation method can be used to remove rail members 86 from either or both ends 82 and 84 of the elongate support assembly 12 depending on the configuration of the elongate support assembly 12.

Alternatively, as shown in FIGS. 31-53, removable cartridge cleaner assembly 2 can include an insertion apparatus or device 364 connected to the end 122 of the elongate rail member 86 to install, secure and remove the elongate rail member 86. The insertion apparatus or device 364 is configured to cooperate with spaced guide members or camming lugs 394 of the elongate support assembly 12 to install and secure the elongate rail member 86 on the elongate support assembly 12. The insertion apparatus 364 and camming lugs 394 cooperate to secure the rail member 86 in tight engagement with the upper surface 10 of the elongate support assembly 12 in the operable position 134 of the rail member 86, and preferably also resist movement of the elongate rail 86 away from the operative position 134 once installed. Preferably, the camming lugs 394 are configured to provide an over-center lock for securing the insertion apparatus 364 to the camming lugs 394.

As shown in FIGS. 31-34 and 36-41, the insertion tool apparatus or device 364 includes a coupler device 365 for being pivotably connected to an end of the rail member 86 and secured to the elongate support assembly 12. The coupler device 365 includes a coupler body 367 sized to be received between the camming lugs 394. A first set of protruding portions 376 and a second set of protruding portions 378 of the coupler device 365 extend from the coupler body 367 for engaging the camming lugs 394. As shown in FIGS. 36-38 and 41, the first set of protruding portions 376 is a pivot pin member and the second set of protruding portions 378 is a camming pin member. The pivot pin member 376 and camming pin member 378 extending through the throughbores 372 and 374 of the coupler body 367. An elongate lever handle portion 366 of the insertion tool apparatus 364 connects to and extends from the coupler body 367. More particularly, the elongate handle portion 366 is sized to extend beyond the resilient mount 20 and be engaged by a user out from under the conveyor belt 4 during installation and removal of the rail assembly 8, as shown in FIGS. 31-33 and 52-53.

Figure 36:
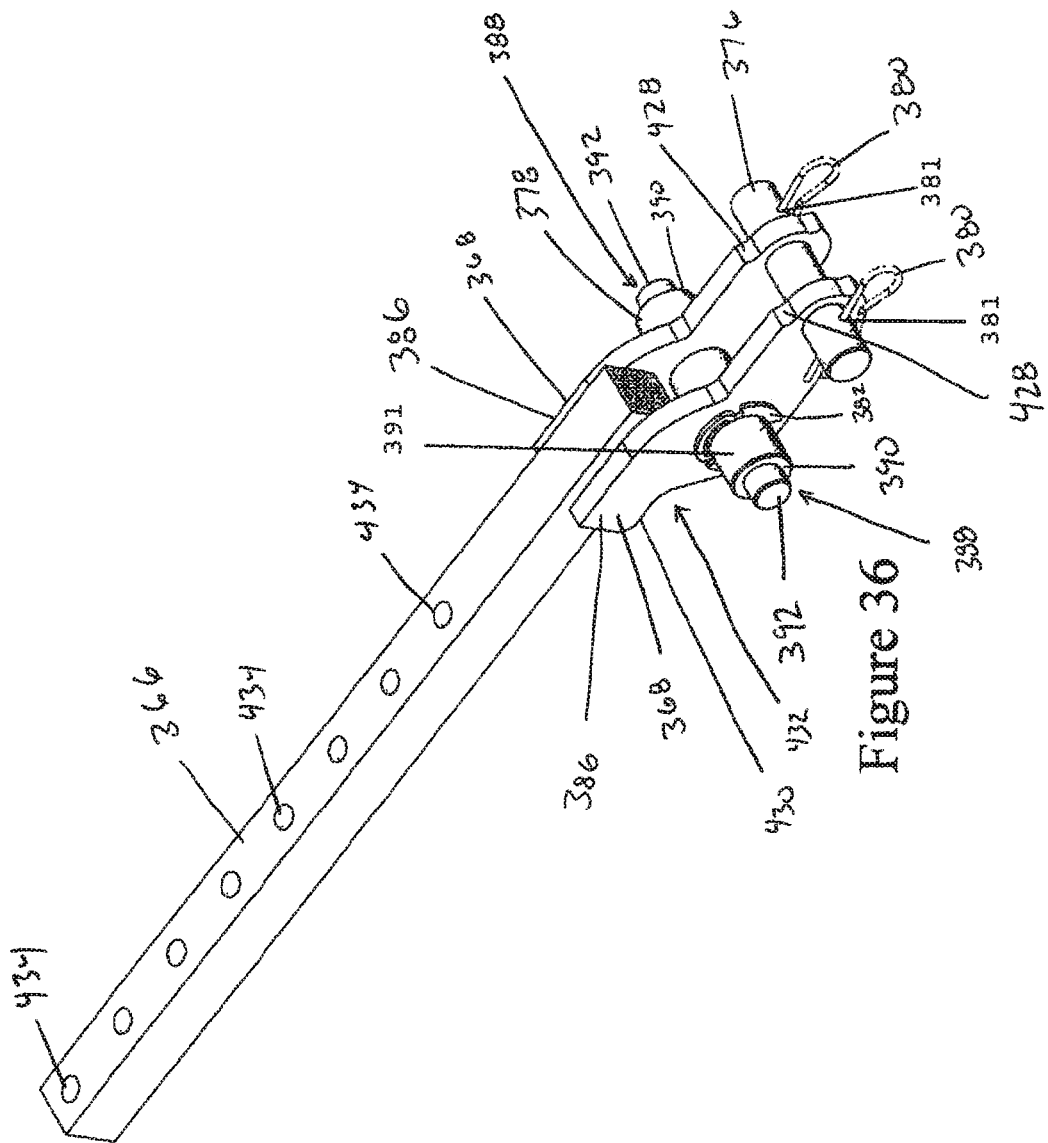
FIG. 36 is a perspective view of the insertion tool apparatus of the removable cartridge cleaner assembly of FIG. 1 showing spaced flanges connected to the handle and the setting pin and camming pin extending through and beyond the spaced flanges.
Figure 37:
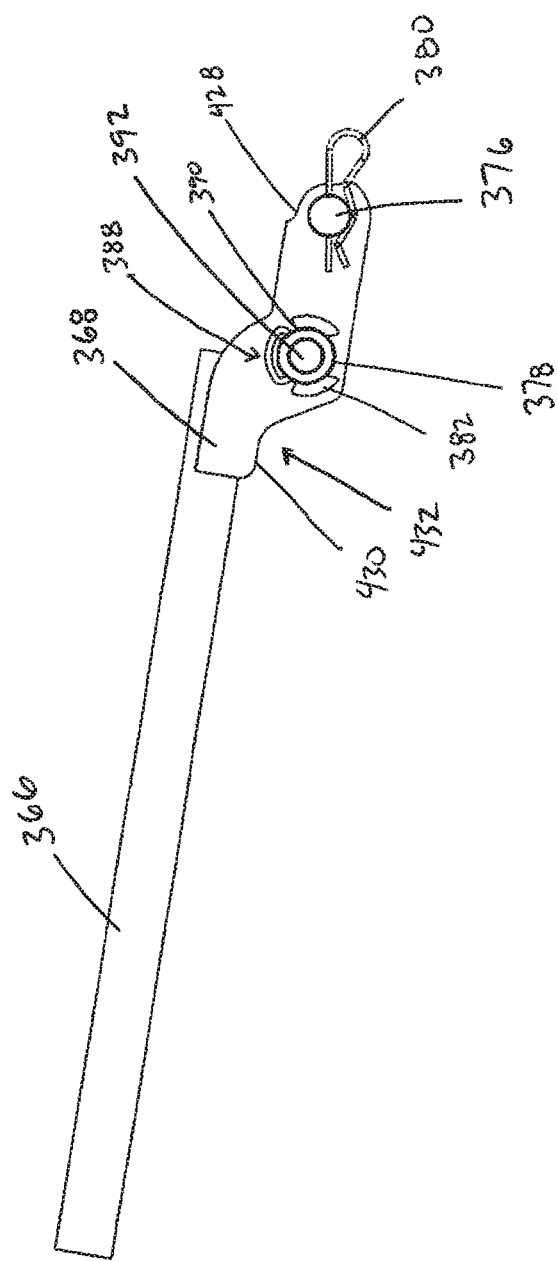
FIG. 37 is a front elevational view of the insertion tool apparatus of the removable cartridge cleaner assembly of FIG. 1.
Figure 38:
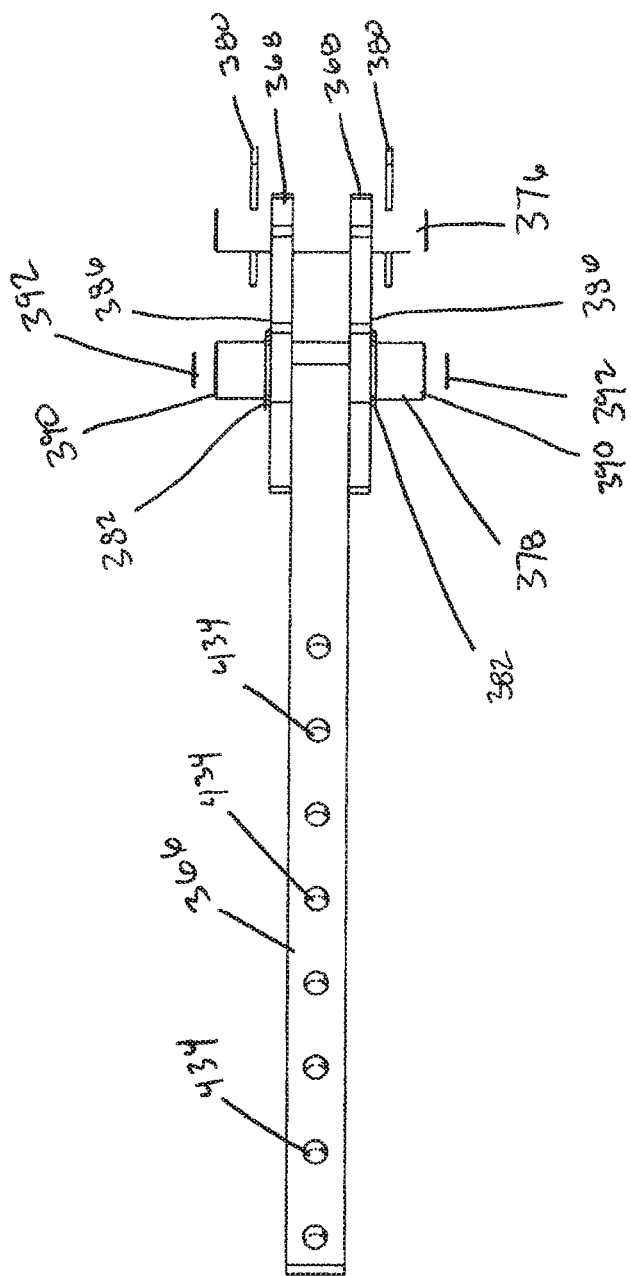
FIG. 38 is a top plan view of the insertion tool apparatus of the removable cartridge cleaner assembly of FIG. 1 showing the spaced flanges connected to the handle and the setting pin and camming pin extending through and beyond the spaced flanges.

As shown in FIGS. 36-38, the coupler body 367 of the coupler device 365 includes a pair of spaced flange members 398 that are fixed to opposite sides 370 of an end of the elongate handle portion 366 as by welding or the like. The coupler body 365 can further include structural spacers 369 extending between the flanges 398. The flanges 398 include a pair of spaced throughbores 372 and 374 for receiving the pins 376 and 378 therethrough.

Figure 42:
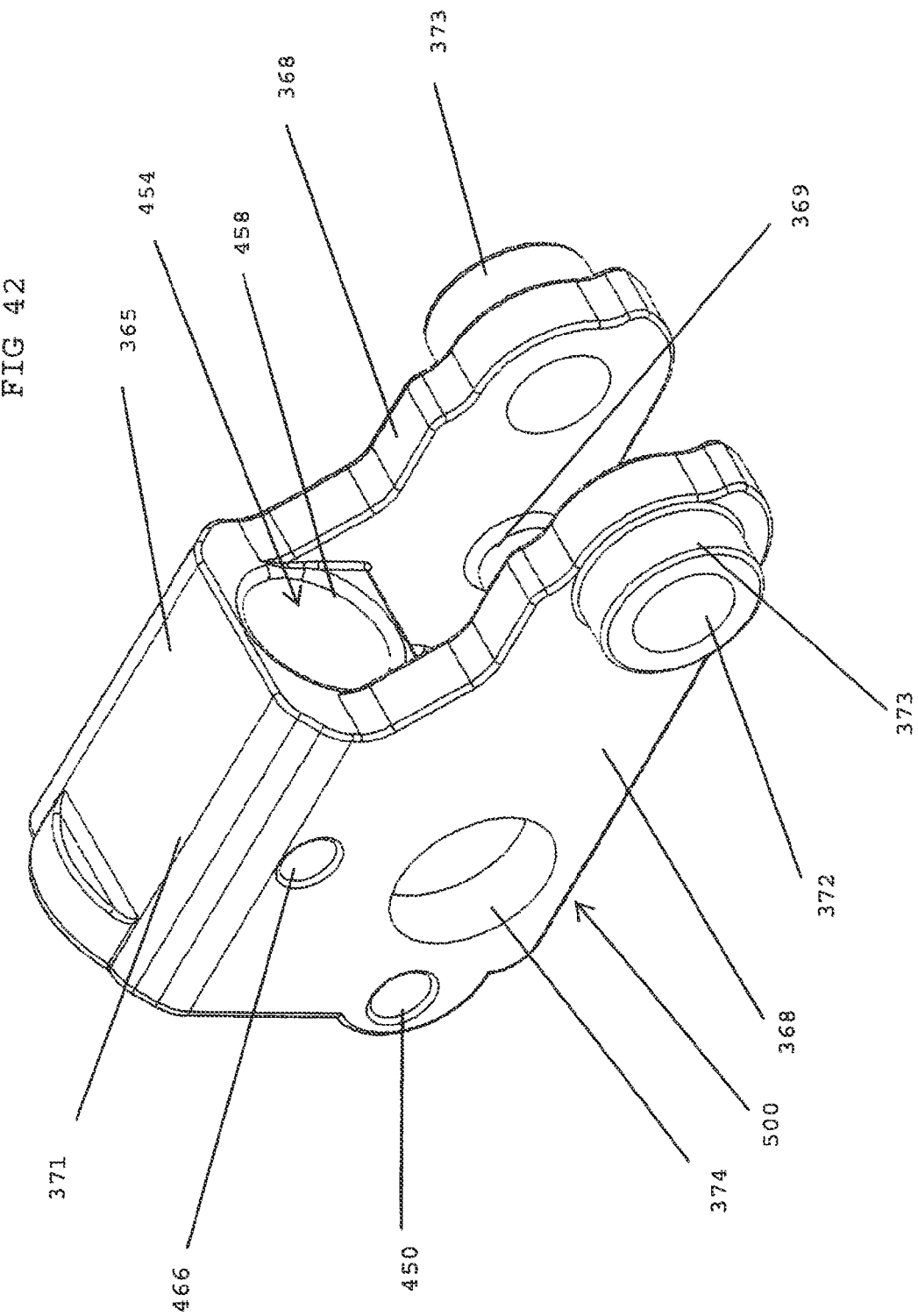
FIG. 42 is a perspective view of the coupler body of the insertion tool device of FIG. 39 showing a pair of spaced flange portion and an upper, tool receiving block portion of the coupler body.
Figure 43:
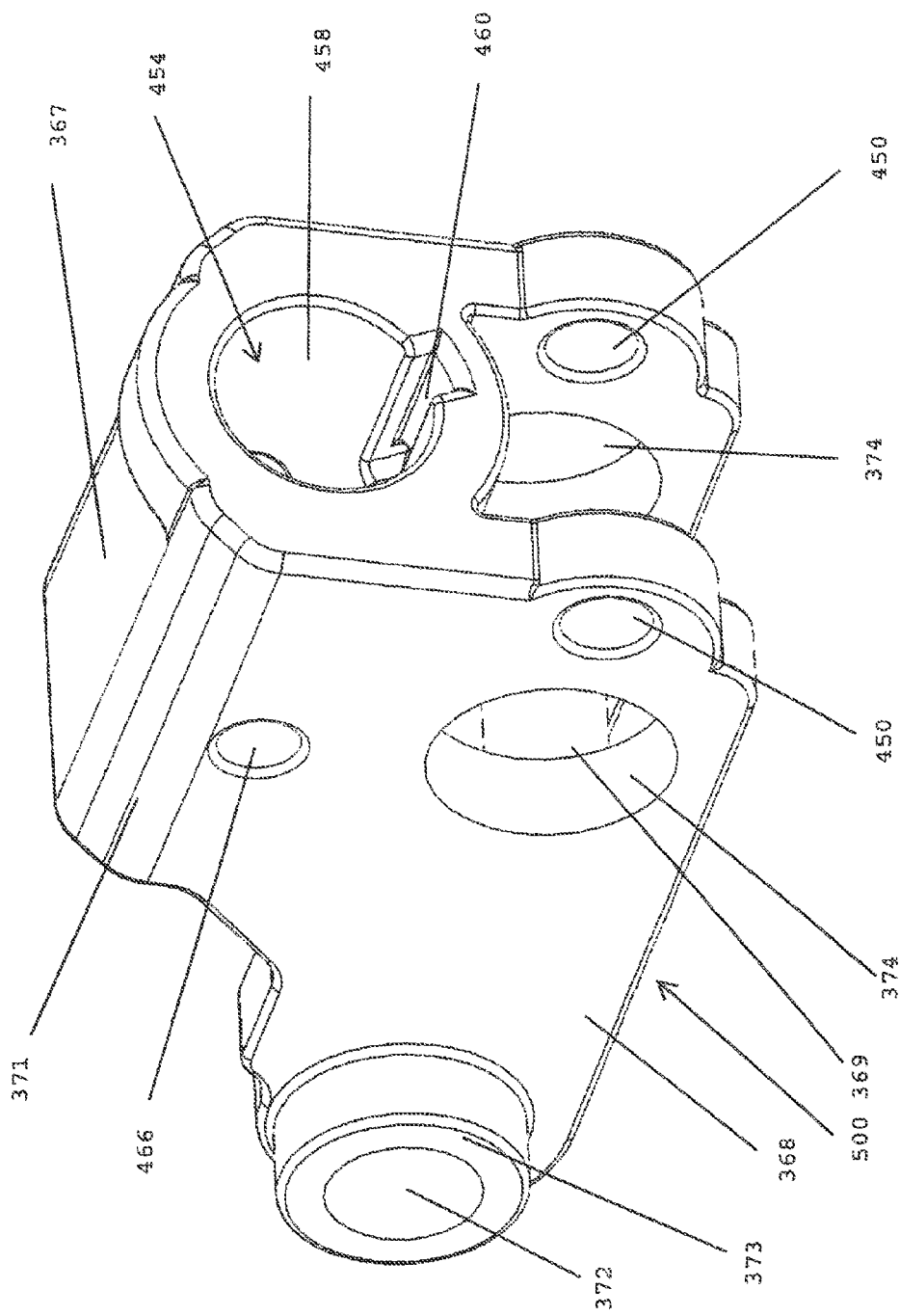
FIG. 43 is a perspective view of the coupler body of the insertion tool device of FIG. 39 showing the opening having a keyed groove for securing the lever handle in the opening.
Figure 44:
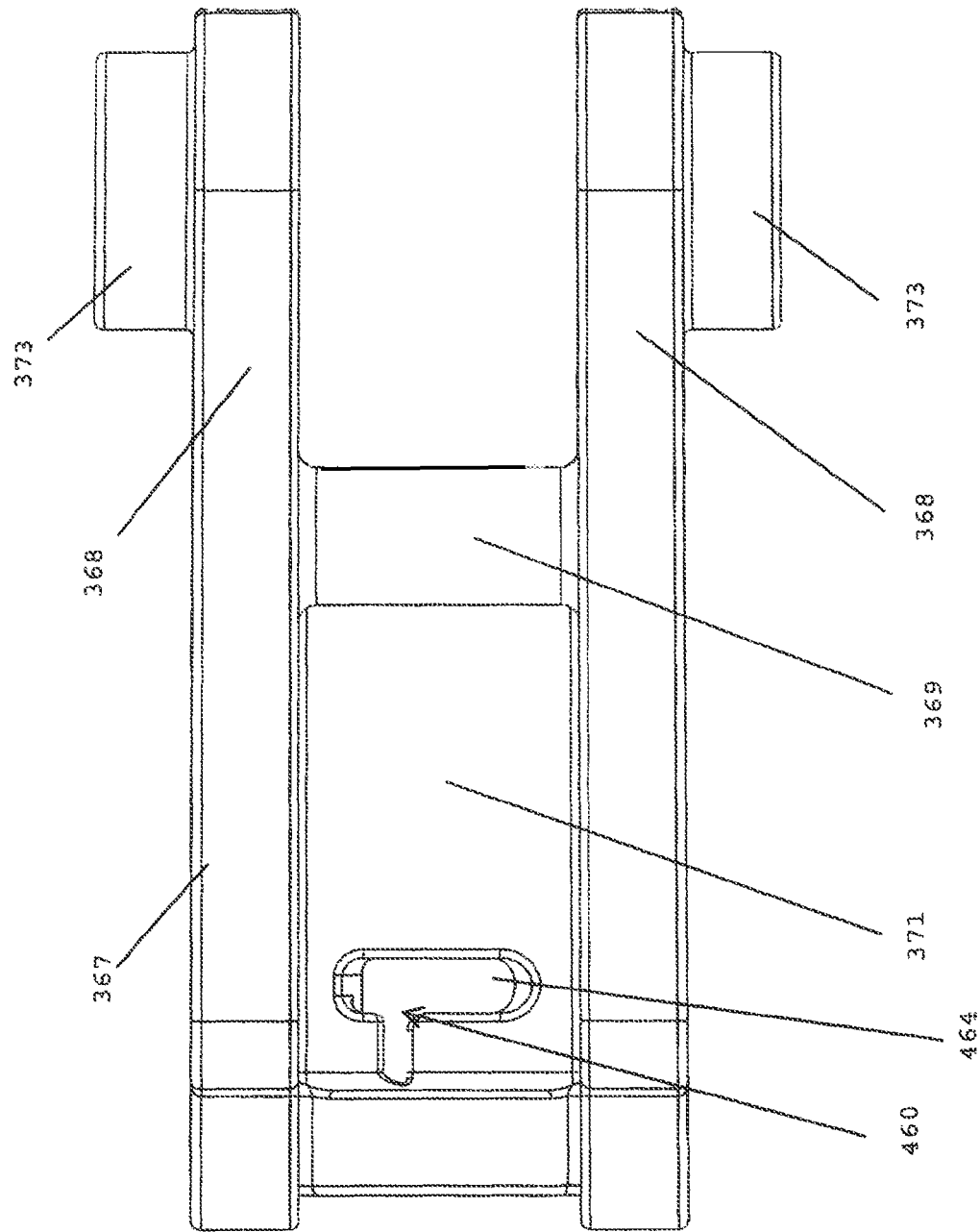
FIG. 44 is a bottom plan view of the coupler body showing annular projections extending from the flanges of the coupler body and the L-shaped groove for receiving a projection of the lever handle.
Figure 45:
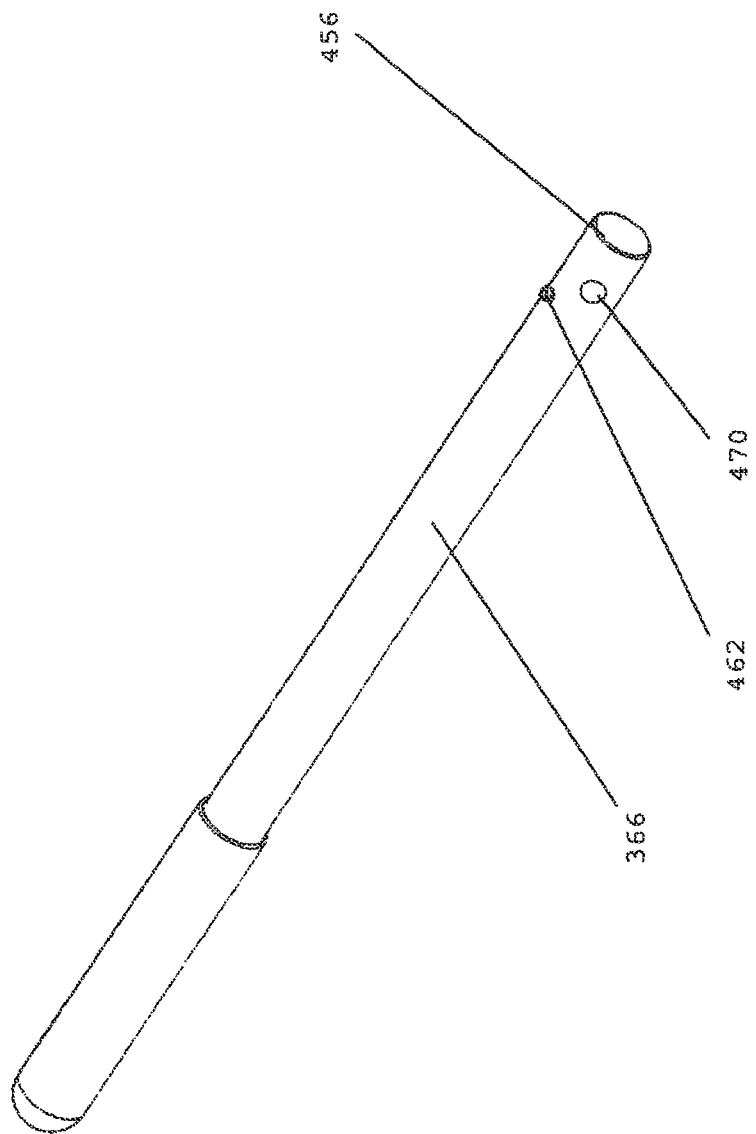
FIG. 45 is a perspective view of the lever handle showing a throughbore for receiving a securing bolt therein for positively securing the handle to the coupler body and the projection for being received in the L-shaped groove of the opening of the coupler body.

Alternatively, as shown in FIGS. 42-44, the coupler body can be formed as an integral casting with the flange portions 368 of the coupler body 365 being spaced by an upper handle receiving block portion 371. As indicated above, the coupler body 365 can include structural spacers 369, such as a rod member, to provide stability to the coupler body 367. The flanges 368 are connected to and extend in parallel from the block portion 371. As discussed above, the flanges 368 include a pair of spaced throughbores 372 and 374 for receiving the pivot pin device 376 and the camming pin member 378 therethrough. As shown in FIGS. 42 and 44, the flanges 368 can further each include an outwardly extending annular projection 373 about the throughbore 372. The outwardly extending annular projection 373 is sized to fit between the legs or flanges 94 of the rail member 86. In addition, as shown in FIGS. 42 and 43, the flanges 368 can include a securing throughbore 450 for receiving a securing member 452, such as a bolt, to positively secure the flanges 368 to the camming lugs 394.

The handle receiving block portion 371 includes an opening 454 sized to receive an end 456 of the elongate handle portion 366 therein. The elongate handle portion or shaft 366 can be secured within handle receiving portion 371. As shown in FIGS. 43 and 44, an inner surface 458 of the opening 454 of the handle receiving portion 371 includes an "L" shaped groove 460 sized to receive a projection 462 extending transversely from the elongate handle portion 366 adjacent the end 456 of the handle portion 366. The "L" shaped groove 460 allows an operator to selectively secure the handle portion or shaft 366 to the coupler body 367 by positioning the projection 462 of the handle portion or shaft 366 within the groove 460 and rotating the handle portion 366 so that the projection 462 shifts into a transverse leg portion 464 of the L-shaped groove 460 to form a bayonet connection therebetween. As a result, the handle portion or shaft 366 can be selectively secured to the handle receiving body 371 for installing and removing the rail assembly 8 without requiring the operator to reach under the conveyor belt 4.

Additionally, as shown in FIGS. 42 and 43, the handle receiving portion 371 includes a throughbore 466 extending transverse to the opening 454 and sized to receive a securing member 468, such as a bolt, therein. The elongate handle portion 366 includes a corresponding throughbore 470 for receiving the bolt 468 therethrough. As such, the elongate handle portion or shaft 366 can be positively secured to the handle receiving portion 371 of the coupler body 367. By positively securing the handle portion or shaft 366 to the coupler body 367, the handle portion or shaft 366 can remain engaged with the coupler body 367 during conveyor belt operation.

Figure 34:
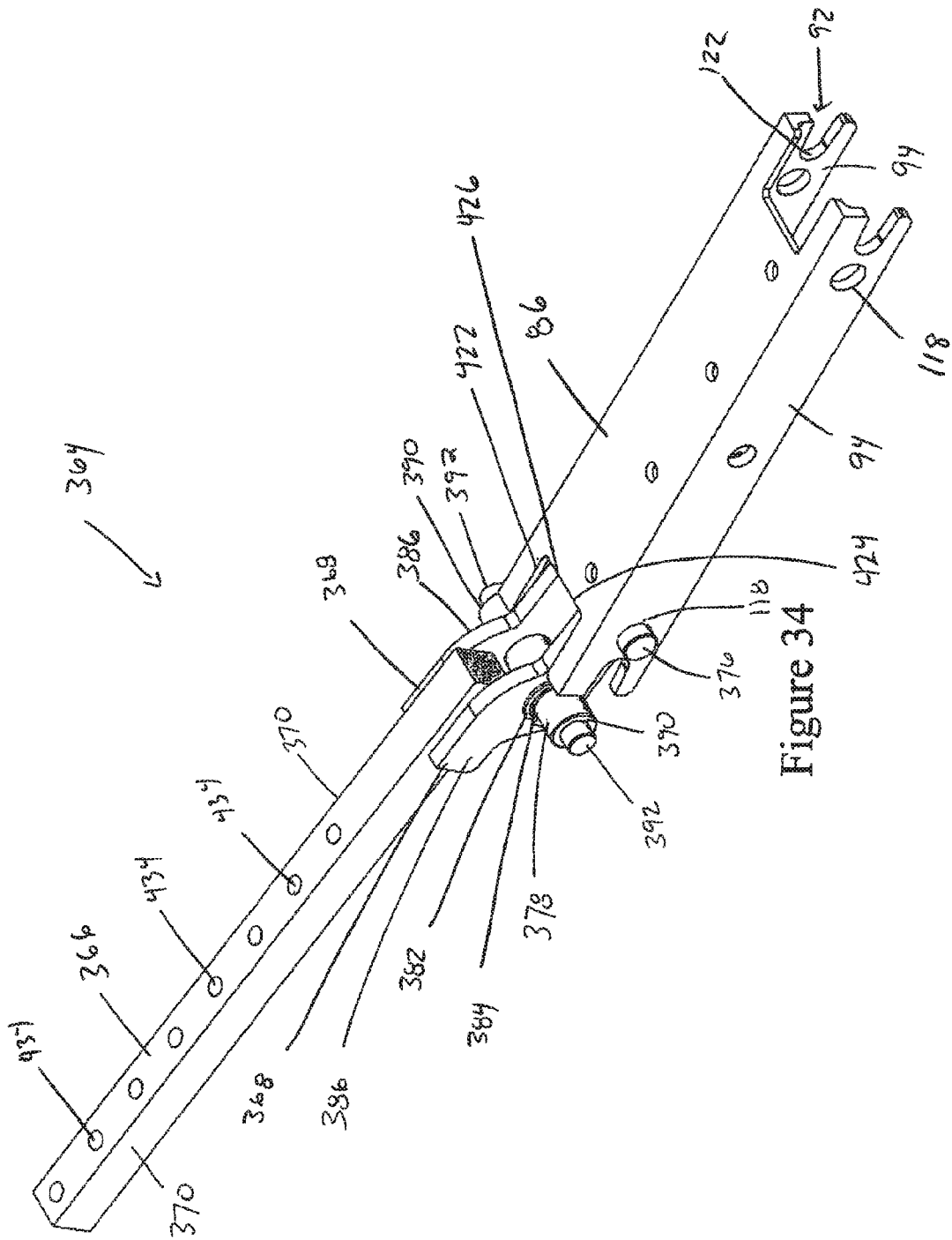
FIG. 34 is a perspective view of the insertion tool apparatus connected to the elongate rail of the removable cartridge cleaner assembly of FIG. 1 showing the setting pin extending through the flanges of the insertion tool apparatus and the depending legs of the elongate rail.
Figure 35:
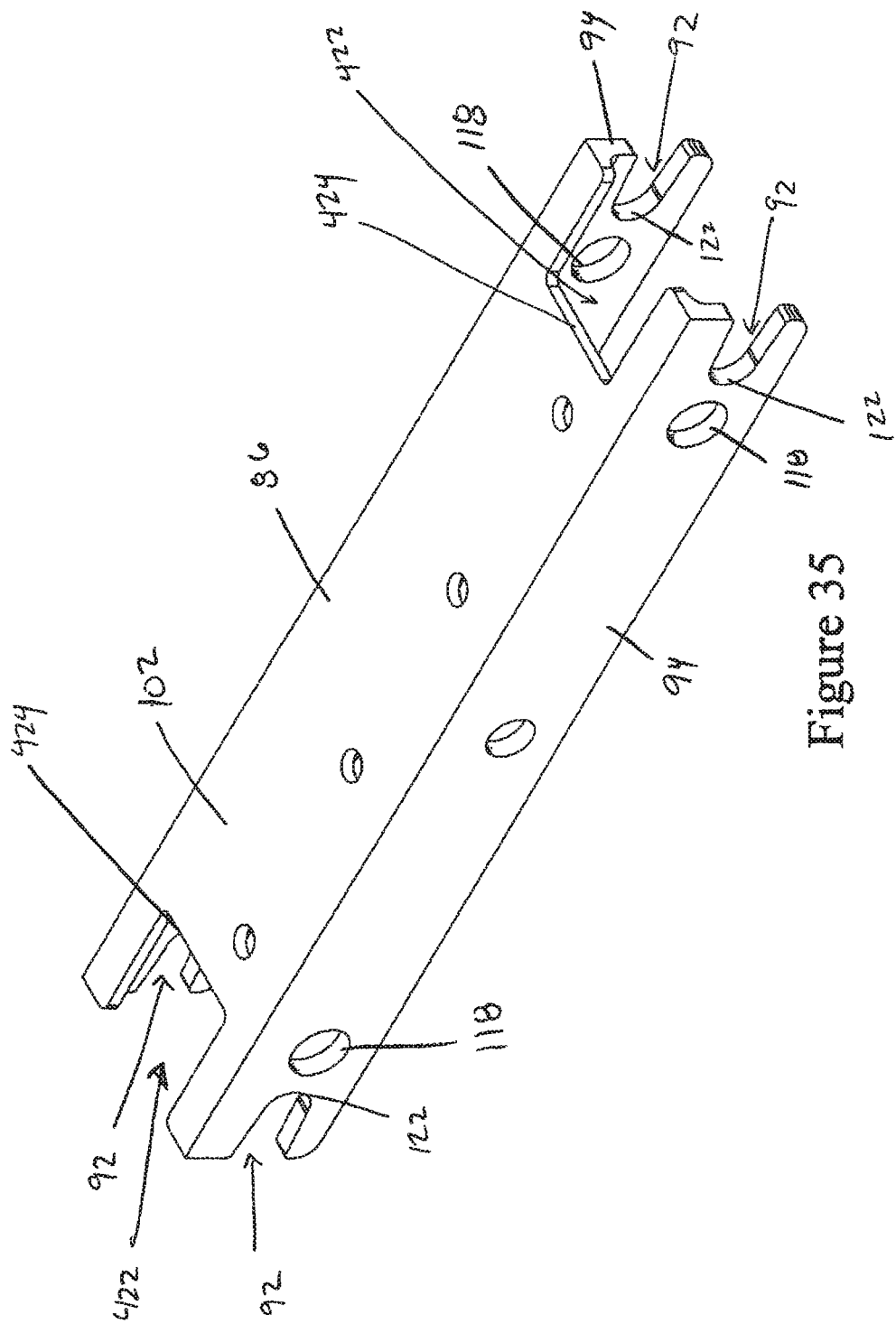
FIG. 35 is a perspective view of the elongate rail of removable cartridge cleaner assembly of FIG. 1 showing the cut-out portions of the web of the elongate rail.
Figure 39:
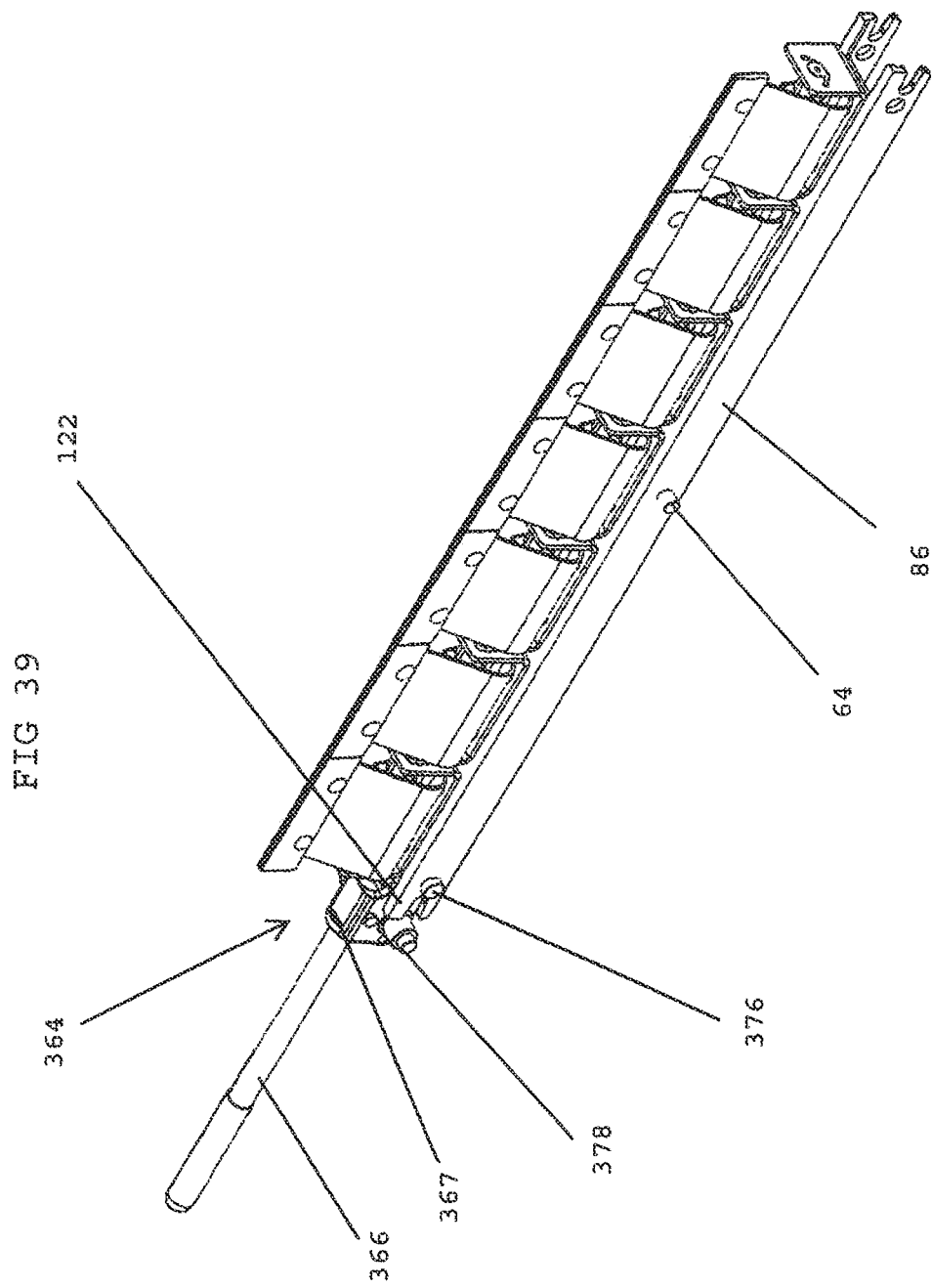
FIG. 39 is a perspective view of an alternative insertion tool device of the removable cartridge cleaner assembly of FIG. 1.

As shown in FIGS. 34, 36-38, 40 and 41, the coupler device 365 includes the pivot pin device 376 positioned adjacent one end of the coupler body 367 and the camming pin member 378 spaced from the pivot pin member 376. The pivot pin 376 is configured to be received in end apertures 118 of the elongate rail 86 to provide a pivot connection between the rail 86 and the coupler device 365. As shown in FIG. 35, to accommodate pivoting of the coupler device 365, the elongate rail 86 includes a cut-out 422 of the web 102 portion. The cut-out 422 is sized to accommodate pivoting of the coupler device 365. A leading edge 424 of the cut-out acts as a stop 426 to limit pivoting of the coupler device 365. As shown in FIGS. 34, 35 and 39, the elongate rail 86 includes a cut-out 422 at either end 110 and 112 to allow the coupler device 365 to be selectively connected to either end 110 and 112 of the rail 86.

As shown in FIG. 36, the pivot pin 376 includes a pair of throughbores 381 adjacent either end for receiving a cotter pin 380 therethrough. The throughbores 381 are located on the pivot pin member 376 so that securing members 380, such as cotter pins 380, are positioned between the flanges 386 and the legs or flanges 94 of the rail member 86 when the coupler device 365 is pivotably connected thereto. The cotter pins 380 allow an operator to easily disconnect and reconnect the coupler device 365 and the rail member 86 as needed.

Figure 46:
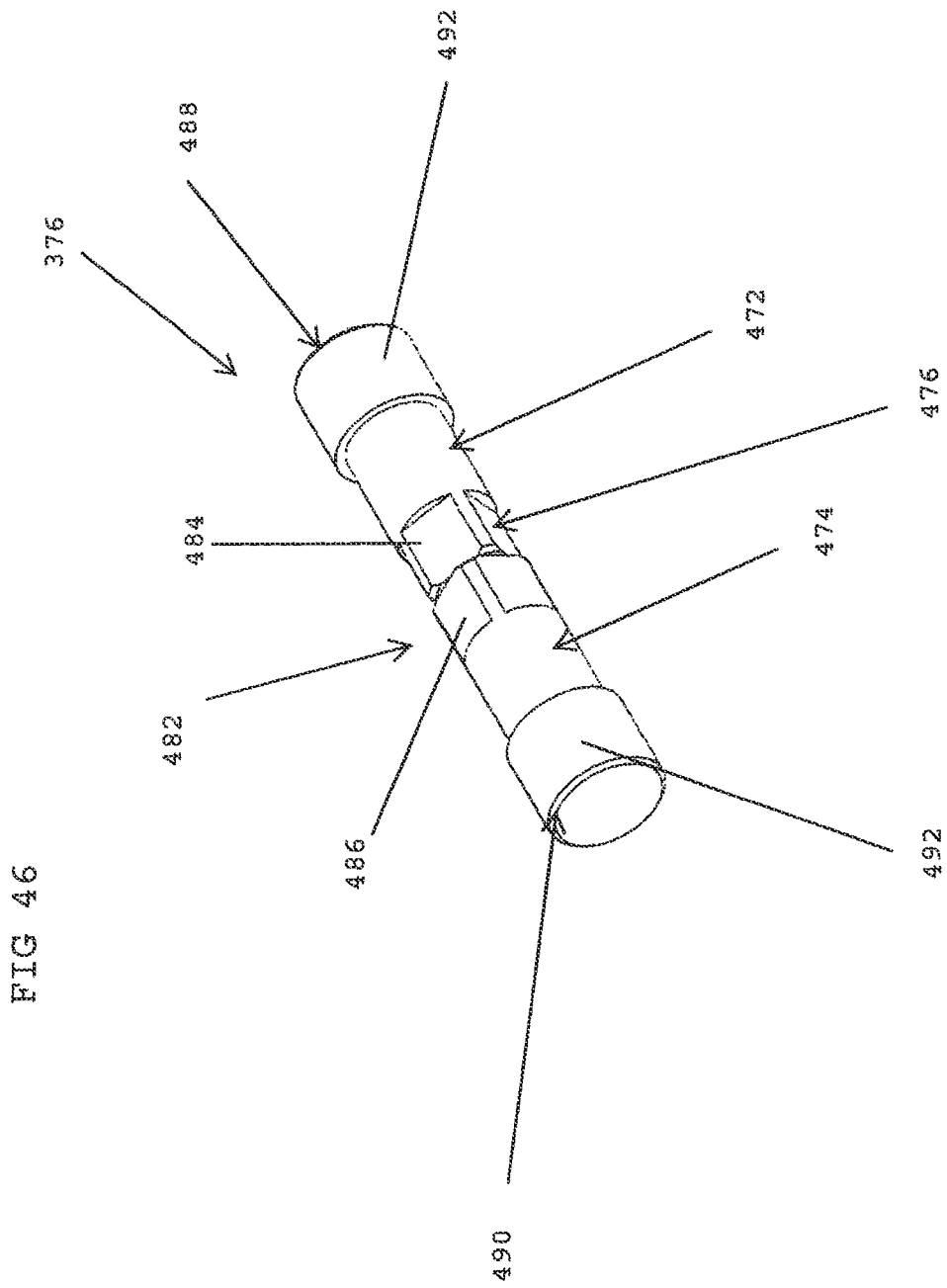
FIG. 46 is a perspective view of the pivot pin of the insertion tool device of FIG. 39 showing two pin end members connected to one another with each of the pin end members having an enlarged rounded distal end and a proximal end configured to be engaged by a tool for securing the two pin end members together.
Figure 47:
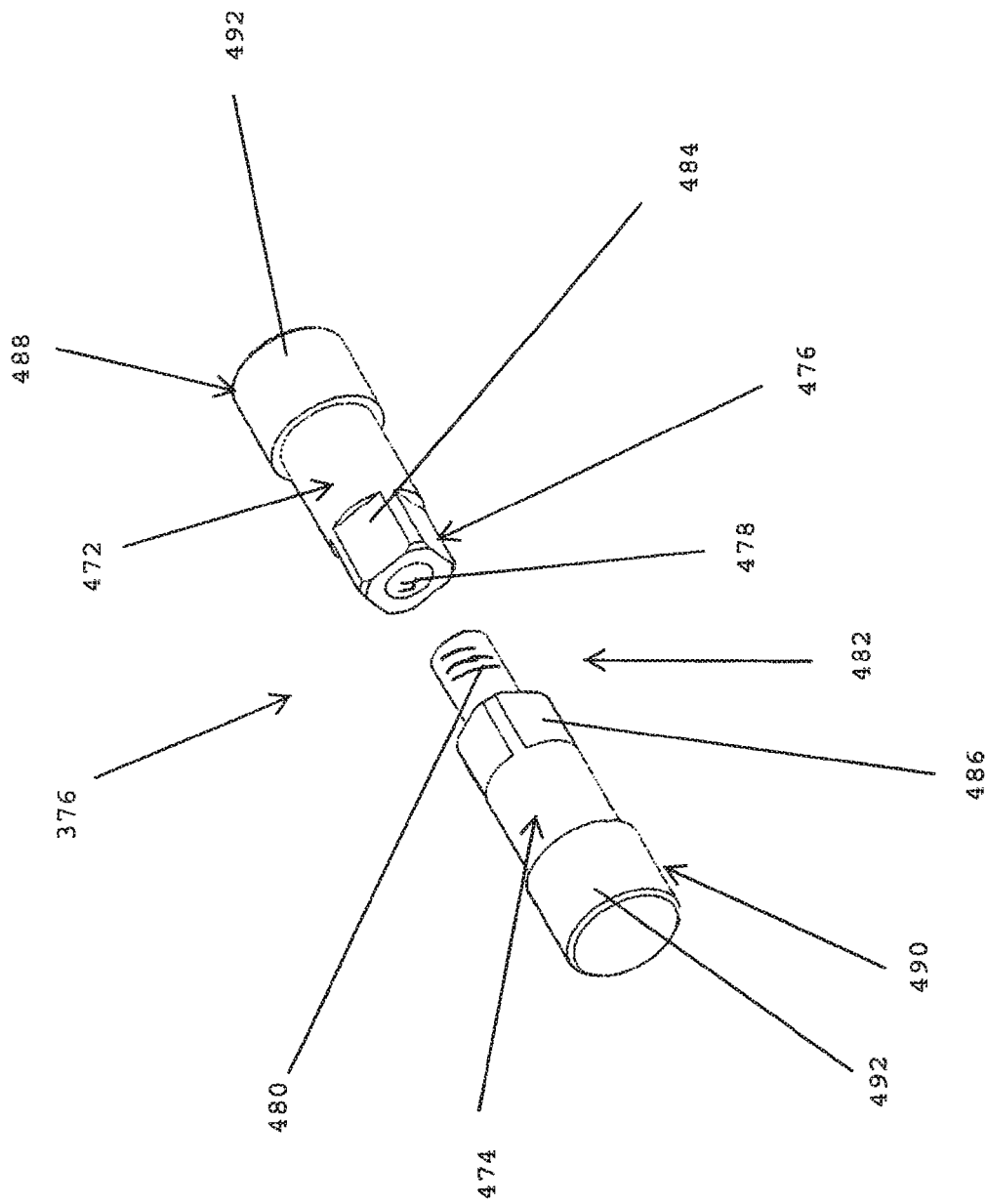
FIG. 47 is an exploded perspective view of the pivot pin of FIG. 46 showing a threaded rod portion extending from the proximal end of one of the pin end members and a threaded opening of the proximal end of the other pin end member for receiving the threaded rod portion therein.

Alternatively, as shown in FIGS. 46 and 47, the pivot pin device or member 376 can include separate pin end members 472 and 474 which can be inserted from either side of the rail member 86 through the rail member throughbores 118 and the flange throughbores 372. The separate pin end members 472 and 474 cooperate to provide a secure connection therebetween. As shown in FIG. 47, a proximal end 476 of one of the pivot pin end members 472 includes a threaded throughbore 478 sized to receive a threaded section or rod 480 extending from a proximal end 482 of the other pivot pin end member 474. The proximal ends 476 and 482 of the pin end members 472 and 474 preferably include an outer surface 484 and 486, such as including flattened sections, configured to be engaged by a tool, such as a wrench, for tightening the threaded connection of the pivot pin end portions 472 and 474. As with the cotter pins 380, the threaded connection allows an operator to easily remove the pin end members 472 and 474 so that the coupler body 367 can be disconnected from the rail member 86.

The pivot pin end members 472 and 474 each include at their distal ends 488 and 490 an enlarged head 492. The enlarged heads 492 are sized to be larger than the coupler throughbores 372 so that, with the pivot pin end members 472 and 474 connected to one another by the threaded connection, the enlarged heads 492 resist shifting of the pin end members 472 and 474 out from the flange throughbores 372 thus maintaining the enlarged heads 492 in the rail member through bores 118.

Figure 40:
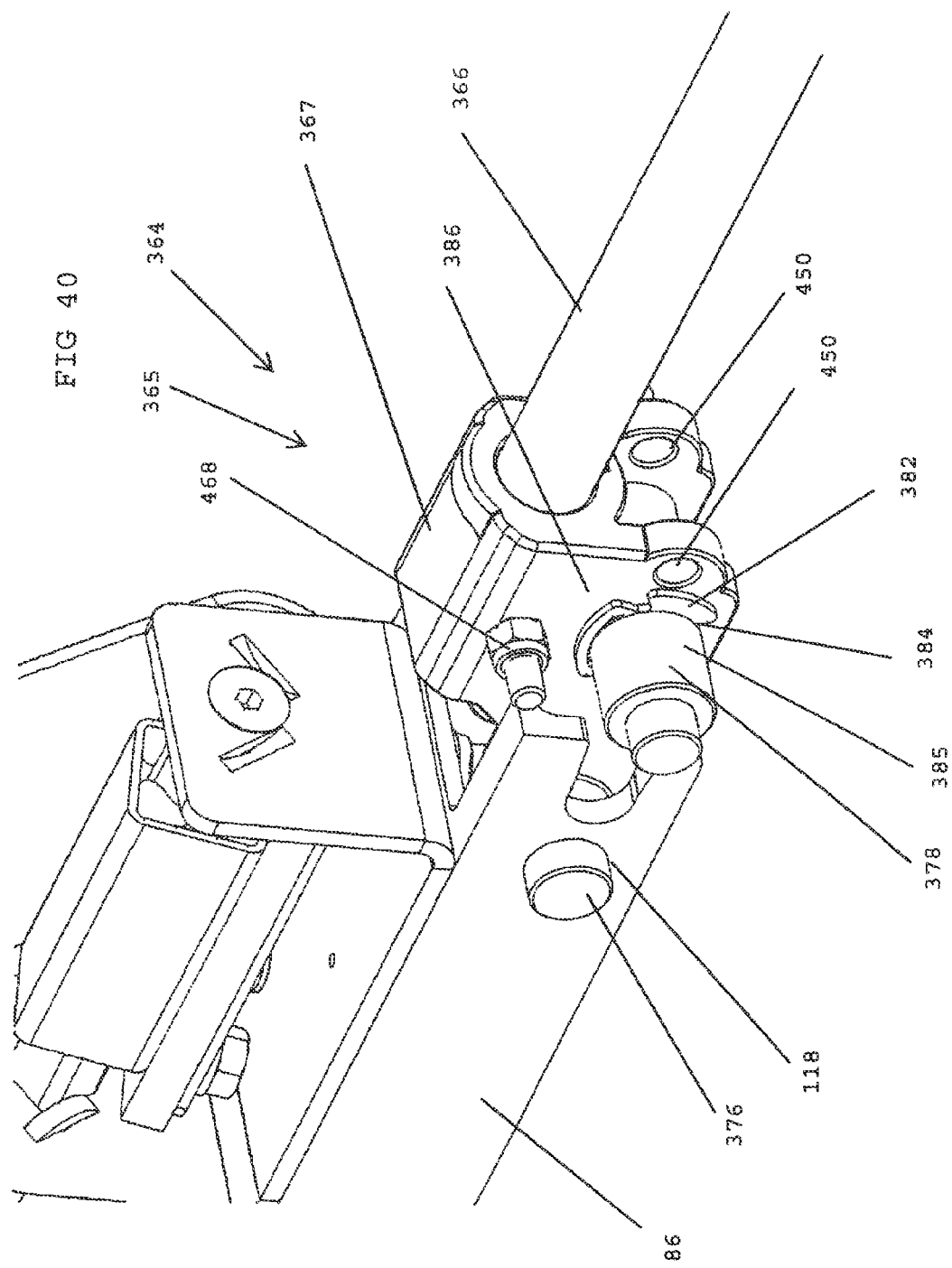
FIG. 40 is an enlarged perspective view of the alternative insertion tool device of FIG. 39 showing the pivot connection between the insertion tool device and the rail member.

Similar to the pivot pin member, the camming pin member 378 is secured to the coupler body 367 to resist movement of the camming pin member 378 out from within the throughbores 374. As shown in FIGS. 36 and 40, the camming pin member 378 includes annular grooves 384 extending about an outer surface 385 thereof. The grooves 384 are axially spaced on the outer surface 385 so that, with the camming pin member 378 extending through the throughbores 374 of the coupler body 367, the grooves 384 can be located adjacent the outer surfaces 386 of the coupler body 365. The grooves 384 are configured to receive a securing member 382, such a clip, therein to block movement of the camming pin member 378 relative to the coupler body 365.

Figure 32:
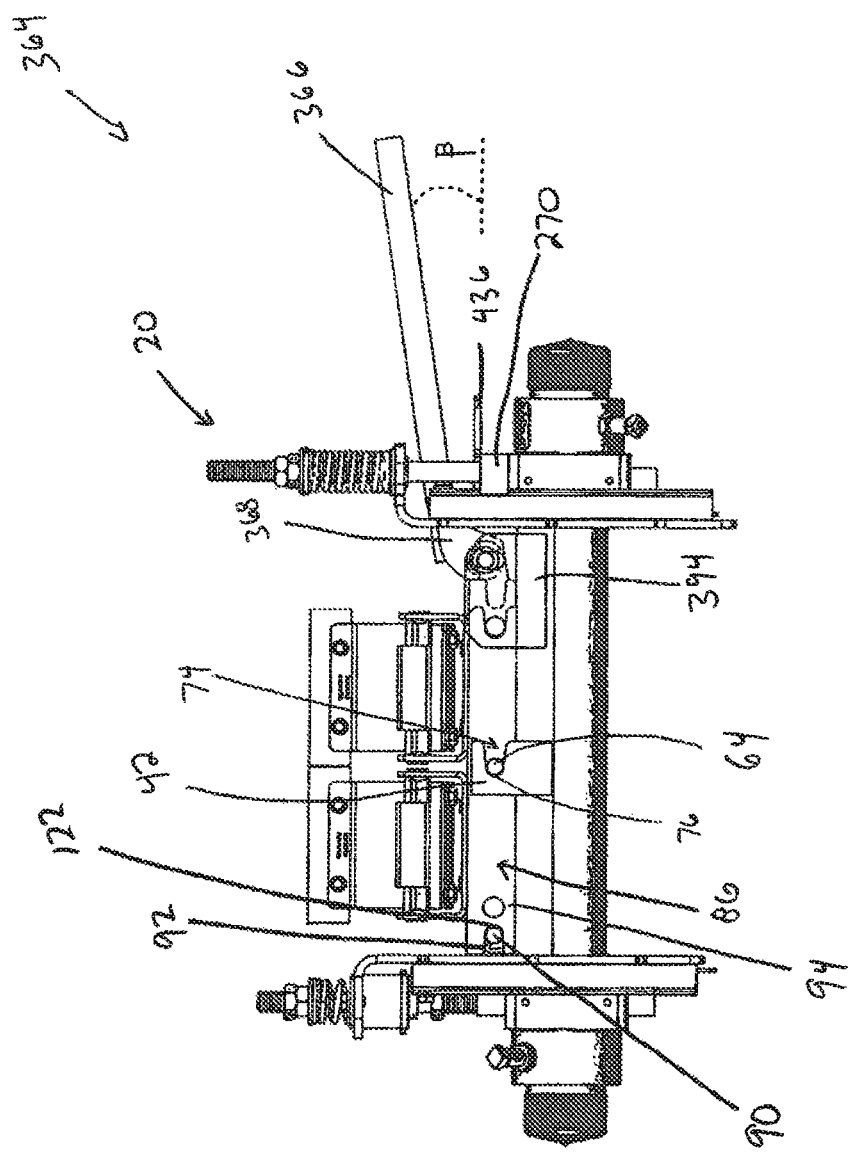
FIG. 32 is a front elevational view of the removable cartridge cleaner assembly of FIG. 1 showing the insertion tool apparatus in an intermediate position between first engaging the camming lugs and an operable orientation.
Figure 33:
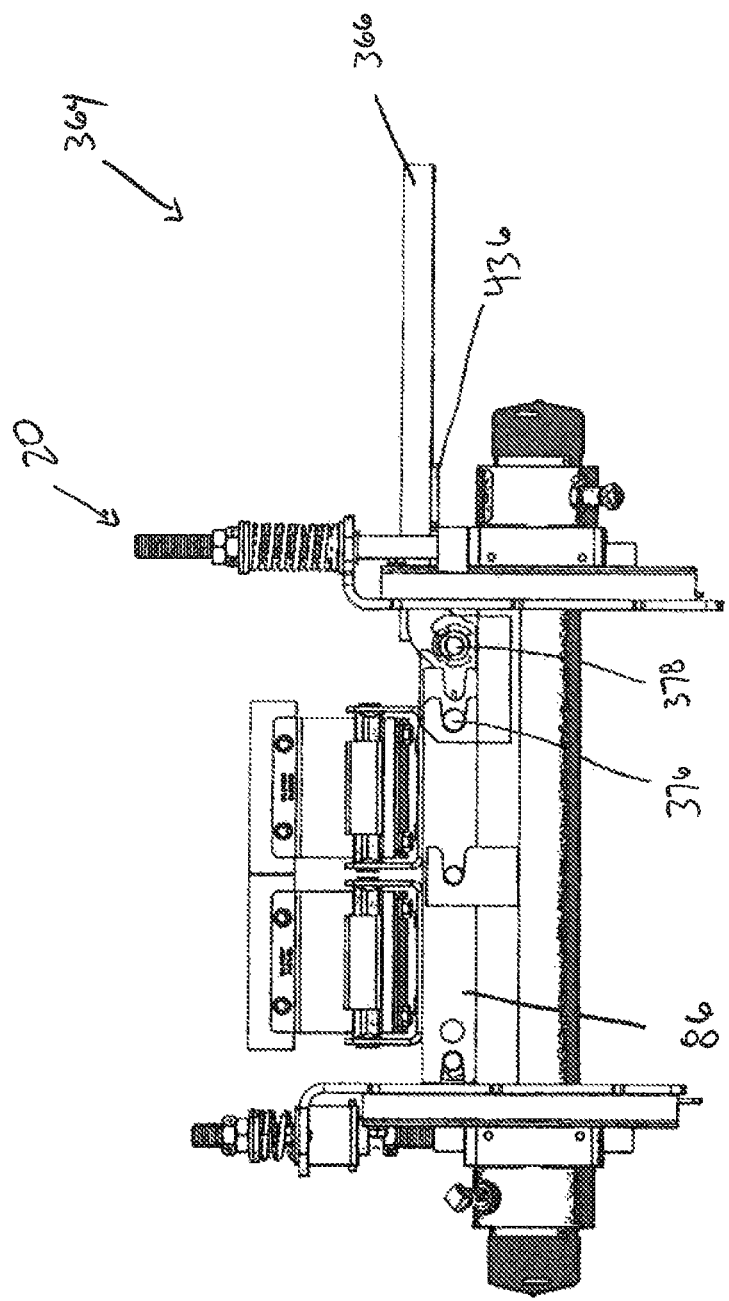
FIG. 33 is a front elevational view of the removable cartridge cleaner assembly of FIG. 1 showing the insertion tool apparatus in the operable orientation.
Figure 48:
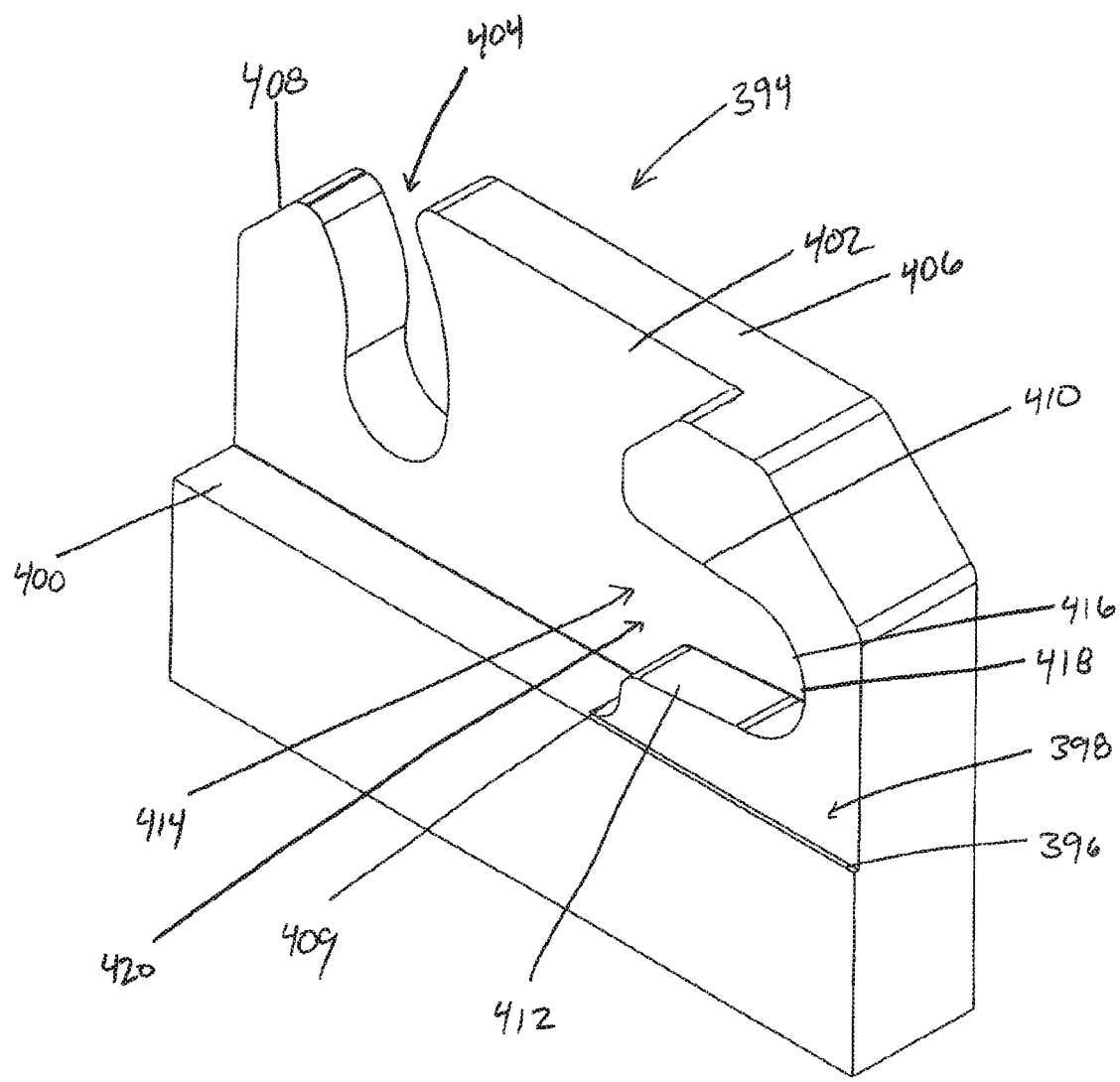
FIG. 48 is a perspective view of the camming lug of the removable cartridge cleaner assembly of FIG. 1 showing a shoulder portion, the tapered slot for receiving the setting pin and the camming slot for receiving the camming pin.
Figure 49:
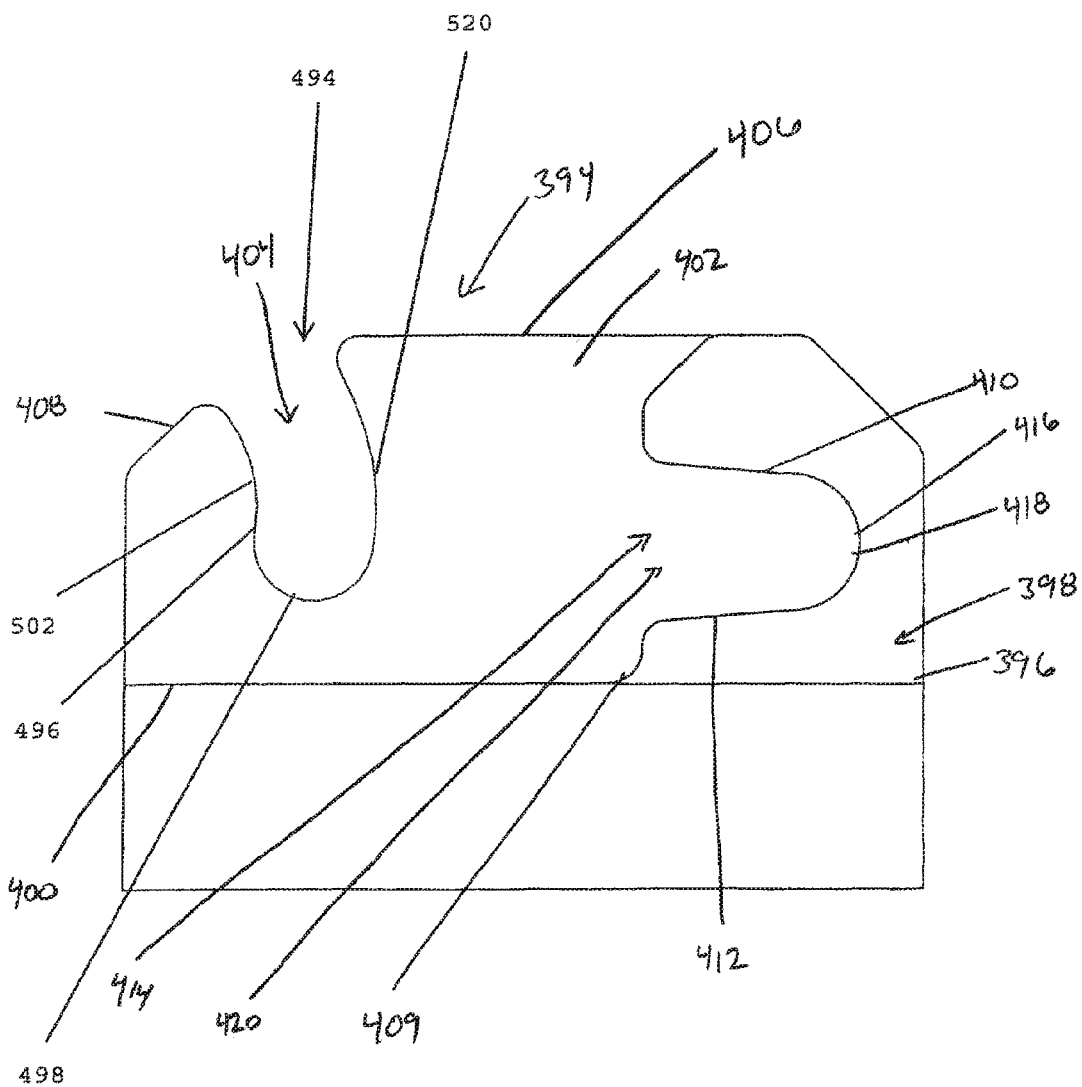
FIG. 49 is an elevational view of the camming lug of FIG. 48 showing the shoulder portion, the tapered slot for receiving the setting pin and the camming slot for receiving the camming pin.

As indicated above, to accommodate the insertion tool apparatus 364, the manual securing guide portions 40 are replaced with camming lugs 394. As shown in FIGS. 31-33, the camming lugs 394 are connected to the outer surface 48 of the flanges 36 of the base channel member 32 and extend upwardly and above the upper flat surface 10 of the base channel member 32. To accommodate the elongate rail assembly 8 therebetween, the camming lugs 394 can include a step 396 therein along inner faces 398 thereof, such as shown in FIGS. 48 and 49.

The camming lugs 394 each include an upper surface 406 configured to allow the central pin member 64 of the rail assembly 8 to shift therealong. Similar to the manual securing guide portions 40, the upper surface 406 of the camming lugs 394 has chamfered upper, lead-in inclined ramp surfaces 408 to aid in guiding the central pin member 64 extending from the rail member 86 up and along the camming lugs 394.

Figure 50:
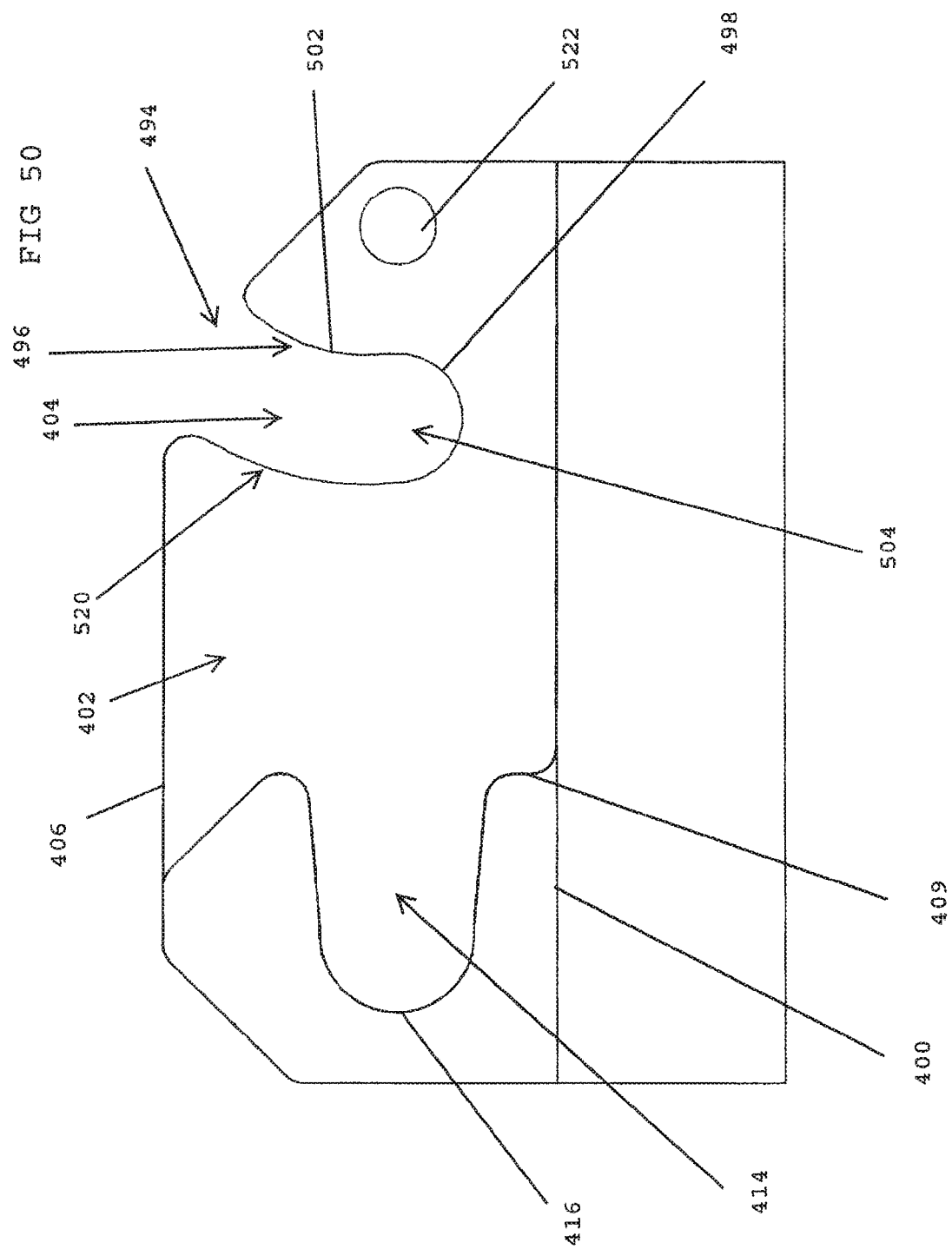
FIG. 50 is a front elevational view of an alternative camming lug of the removable cartridge cleaner assembly of FIG. 1 showing a throughbore of the camming lug for receiving a securing member therethrough.

The camming lugs 394 each include an internal shoulder portion or shelf 400. The shelf 400 is located adjacent the upper surface 10 of the elongate support assembly 12. As shown in FIGS. 48-50, a recessed inner wall surface 402 extends from the shoulder portion 400 toward the upper surface 406 of the camming lug 394. The recessed surfaces 402 of the camming lugs 394 are spaced from one another to receive the pivot pin 376 therebetween.

Extending from the shoulder portion 400 the camming lugs 394 is an opening 414 for receiving the distal ends 492 of the pivot pin member 376. The opening 414 includes an upper and lower inclined surfaces or wedge portions 410 and 412. A curved transition wall 409 extends up from the shoulder 400 to the lower inclined surface 412 to aid in shifting the pivot pin member 376 into the opening 414.

The upper and lower inclined surfaces 410 and 412 of the opening 414 extend obliquely to the longitudinal axis 28 of the elongate support assembly 12 and toward one another to define a tapered configuration having an open end 420 facing toward the shoulder portion 400 for receiving the pivot pin member 376 of the coupler device 365 as the coupling device 365 is shifted in the lateral assembly direction 14. A closed end 416 of the opening or tapered slot 414 operates as a stop portion 418 for limiting movement of the pivot pin member 376. The enlarged distal ends 492 of the pivot pin member 376 can have a rounded configuration to ease movement of the distal ends 492 along the upper and lower inclined surfaces 410 and 412 of the opening 414.

To accommodate the camming pin 378, the camming lugs 394 each include a camming slot 404 extending from the upper surface 406 down toward the shoulder 400. The camming slot 404 is configured to guide the camming pin member 378 as the pivot pin member 376 shifts along the tapered slot 414 and the coupler device 365 rotates downwardly toward the upper surface 10 of the elongate support assembly 12.

Figure 41:
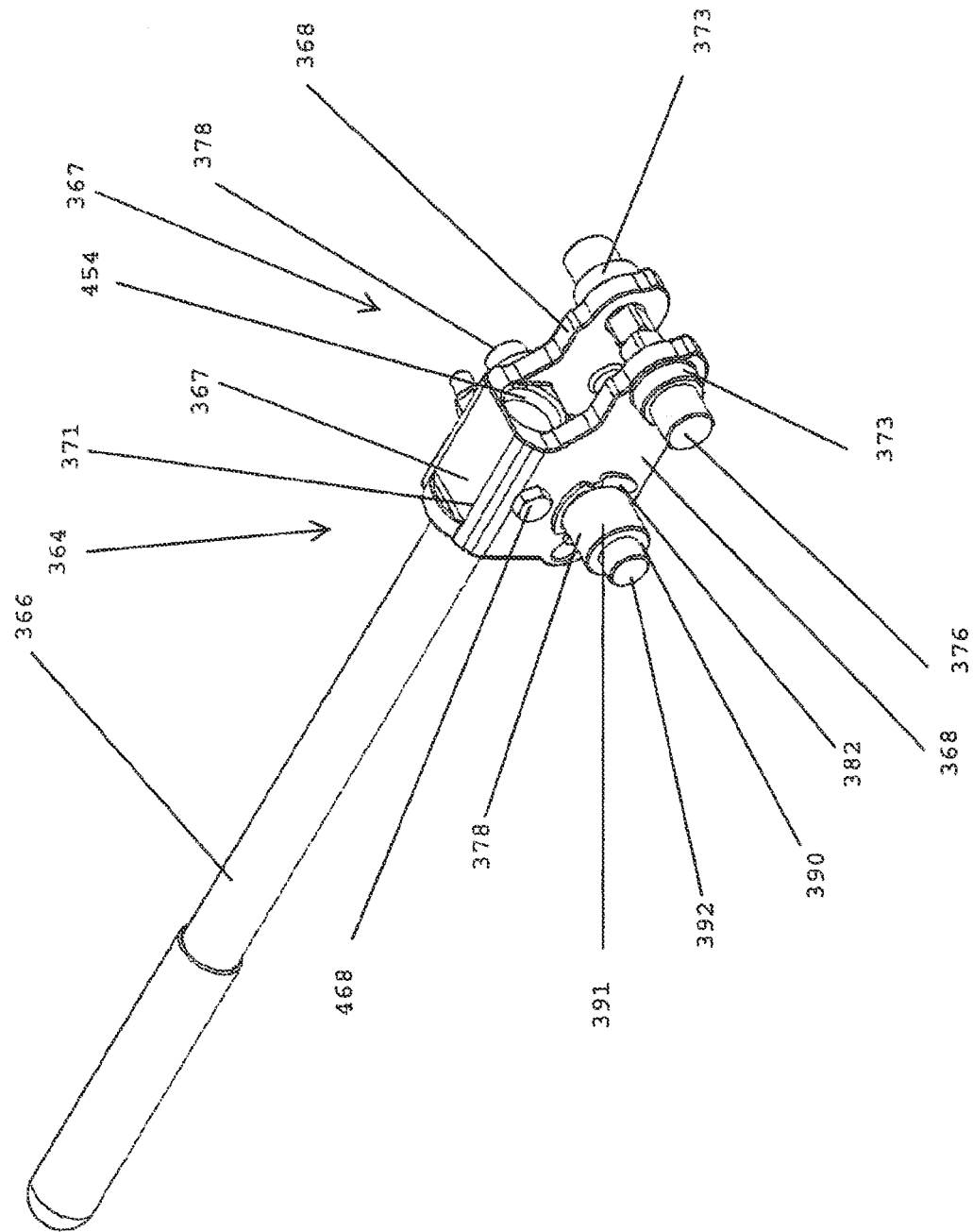
FIG. 41 is a perspective view of the insertion tool device of FIG. 39 showing a coupler having a coupler body and a pair of pin devices extending from the coupler body and an elongate lever handle for being gripped by an operator.

As shown in FIGS. 36 and 41, the camming pin member 378 includes a larger diameter central shaft portion 391 which extends through and out from the coupler body 367. The central portion 391 includes the annular outer surface 385 having the grooves 384 therein. The central portion 391 is sized so that it can fit between the recessed surfaces 402 as the camming pin member 378 is received in the camming slot 404.

More particularly, smaller diameter annular end portions 392 of the camming pin member 378 extend from ends of the central portion 391 of the camming pin member 378. The smaller diameter end portions 392 are sized to be received within the camming slots 404 of the camming lugs 394. Shoulders 390 of the camming pin member 378 extend between the larger diameter central portion 391 and small diameter end portions 392. The shoulders 390 are spaced from one another to fit between and face the recessed surfaces 402 of the camming lugs 394. As such, the shoulders 390 can engage the recessed surfaces 402 of the camming lugs 394 and restrict shifting of the coupler device 365 in a longitudinal direction parallel to the belt travel direction 19.

Prior to installation of the elongate rail 86, the pivot pin 376 is secured to the legs 94 of the elongate rail 86 and the distal throughbores 372 of the coupler body 365. In addition, the camming pin member 378 is shifted through the throughbores 374 of the coupler body 367 and secured in place, such as with clips 382. Once in place, one end 110 of the rail member 86 is positioned adjacent an upper surface 10 of the elongate support assembly 12. As shown in FIGS. 31-33, 52 and 53, the resilient mount 20 located at the end 82 of the elongate support assembly 12 is configured with upwardly extending spaced legs 252 to allow for insertion and removal of the rail member 86 therebetween. In particular and as discussed above, the resilient mount 20 can include spaced spring members 290 between which the rail member 86 can be shifted.

The end 110 of the rail member 86 is then guided through the camming lugs 394 and shifted along the upper surface 10 of the elongate support assembly 12. The rail member 86 can be shifted along the surface 10 via the insertion device 364 until the camming pin member 378 engages the camming lugs 394. The coupler device 365 is then pivoted about the pivot pin 376 so that the camming pin 378 can be supported on the ramp surfaces 408 of the camming lugs 394 adjacent the open upper end 494 of the cam slot 404. The handle portion 366 of the tool 364 is then used to shift the coupler body 365 along the elongate support assembly 12 so that the pivot pin 376 is adjacent the open end 420 of the tapered slots 414 of the camming lugs 394 and the camming pin 378 is positioned within the opening 494 of the camming slots 404 extending downwardly from the upper surface 406 of the camming lugs 394.

With the setting or pivot pin 376 within the tapered slots 414 of the camming lugs 394, the elongate handle 366 of the insertion tool apparatus 364 is urged downwardly toward the elongate support assembly 12 so that the annular projections 392 of the camming pin member 378 shift along a lower biasing surfaces 496 of the camming slots 404 of the camming lugs 394 toward a closed end portion 498 of the camming slots 404. As shown in FIGS. 48-50, the camming slots 404 extend from the upper edge 406 of the camming lugs 394 toward both the shoulder 400 and the tapered slots 414.

As such, as the camming pin 378 shifts along the slots 404, the coupler body 365 and the pivot pin 376 connected thereto are shifted lengthwise along the elongate support assembly 12. More particularly, the pivot pin 376 is shifted toward the closed end 416 of the tapered slots 414 and the coupler body 365 shifts toward the upper surface 10 of the elongate support assembly 12. Further, the central pin 64 is shifted toward the closed end 76 of the tapered slot 74 of the central lug mount portions 42 and the flanges 94 of the elongate rail 86 are shifted toward the end pin 90 so that the end pin 90 is positioned adjacent the closed end 122 of the tapered slots 92 of the elongate rail flanges 94. In this manner, use of the lever handle 366 provides a leveraged insertion force for precision mounting of the channel or rail member 86 on the support assembly 12a.

As shown in FIGS. 31-33, the angle between the handle portion 366 and a horizontal plane, such as the upper surface 10 of the elongate support assembly 12, is a sweep 13. The sweep 13 of the handle portion 366 is based on the distance the camming slot 404 extends from the upper surface 406 of the camming lugs 394. In particular, the farther the camming slot 404 extends from the upper surface 406, the farther the camming pin 378 and handle portion 366 extending from the coupler body 365 travel. The depth of the camming slot 404 is determined based on the distance the camming lugs 394 extend beyond the upper surface 10 of the elongate support assembly 12 and the relative positions of the pivot pin member 376 and camming pin member 378 relative to a lower surface 500 of the coupler body 367. An exemplary sweep is 18 degrees.

Figure 55:
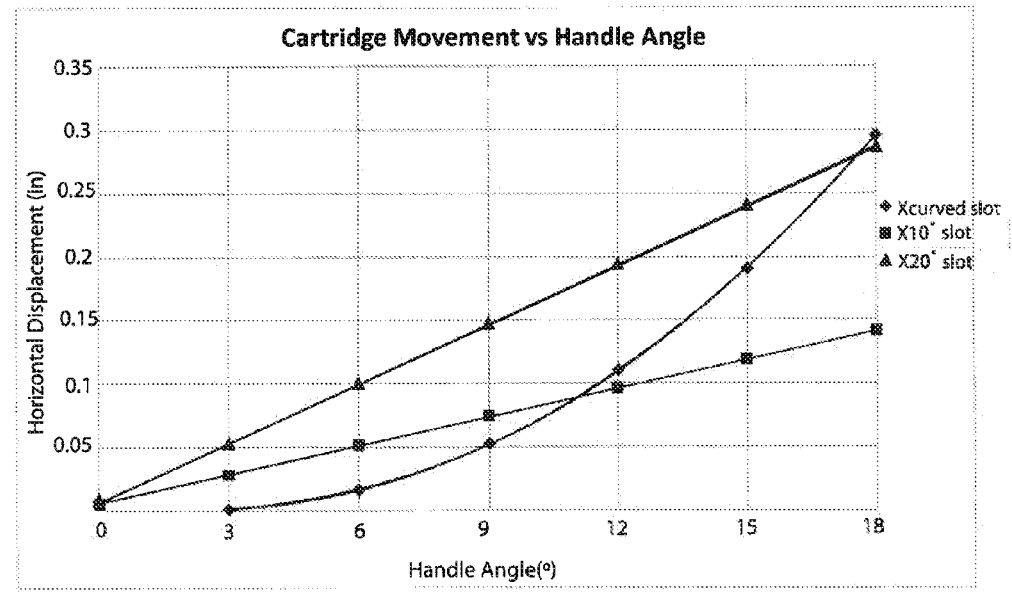
FIG. 55 is a graph illustrating the travel distance of the rail member across the elongate support assembly over the sweep of the handle for the 10 degree angled camming slot, the 20 degree angled camming slot and the curved camming slot.

The camming slot 404 is configured to provide a travel path for the camming pin member 378 as the coupler body 365 shifts toward the upper surface 10 of the elongate support assembly 12. The camming slot 404 can be a generally straight inclined slot extending from the upper surface 406 of the camming leg 394 obliquely to the upper surface 10 of the elongate support assembly 12. As shown in FIG. 55, the angle of the slot 404 can be selected to specify a travel distance of the elongate rail member 86 and insertion tool apparatus 364 along the elongate support assembly 12 as the camming pin 378 travels along the slot 404, with a steeper slot such as the 10 degree angled camming slot resulting in less travel across the elongate support assembly 12 than the less steep 20 degree angled slot.

Figure 54:
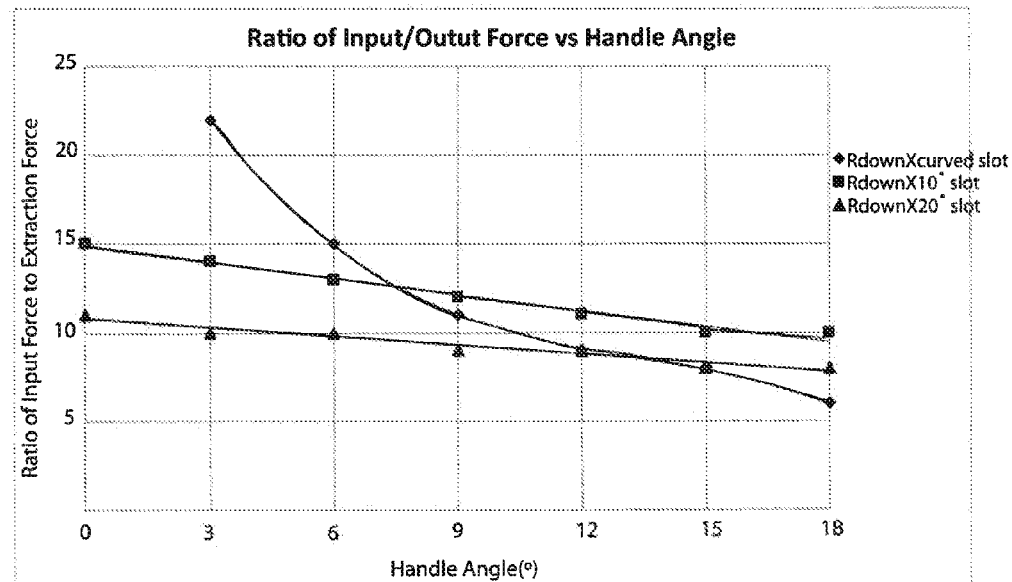
FIG. 54 is a graph illustrating the ratio of output force for a given input force on the lever handle over a sweep of the handle for a steep 10 degree from vertical angled camming slot, a less steep 20 degree from vertical angled camming slot and a curved camming slot.

Further, the angled configuration of the camming slot 404 provides a mechanical advantage when shifting the rail member 86 into tight engagement with elongate support assembly. As shown in FIG. 54, the steeper 10 degree camming slot provides a higher mechanical advantage than the 20 degree slot. In particular, the ratio of output force to input force is higher for a steep camming slot 404 compared to a more gradual slope of the camming slot 404. As the camming pin 378 is shifted along the slot 404 toward the closed end 498, a leverage force is applied to the rail assembly 8 to urge it into tight engagement with the elongate support assembly 12. As the camming pin member 378 travels along the camming slot 404, reactive forces acting on the camming pin member 378 work to urge the camming pin member 378 away from the closed end 498 and out of the camming slot 404. As such, a higher mechanical advantage allows an operator to provide less input force to shift the camming pin member 398 to the closed end 498 of the camming slot 404. Once the camming pin member 398 reaches the closed end 498 of the camming slot 404 and the rail member 86 is in the operative position 134, force must be continuously applied on the handle portion or shaft 366 by the operator until the insertion tool 364 can be secured to resist the forces acting on and the camming pin member 378 urging away from the closed end 498 of the camming slot 404.

Alternatively, the camming slot 404 can be configured to provide an over-center lock mechanism so that, after the camming pin member 378 shifts past the generally central location 502 of the camming slot 404 along which the camming pin member 378 shifts, the forces acting on the camming pin member 378 work to maintain the camming pin member 378 at the closed end 498 of the camming slot 404. As a result, the operator need not continue to apply force on the handle portion or shaft 366 after the camming pin member 378 is at the closed end 498 of the camming slot 404 and the rail member 86 is in the operable position 134.

As shown in FIGS. 49 and 50, the camming slot 404 has an arcuate configuration 504. The closed end portion 498 of the camming slot 404 extends slightly back toward the adjacent end of the rail member 86 to provide an over-center lock mechanism between the camming lugs 394 and the insertion tool apparatus 364. As can be seen in FIG. 54, the curved configuration 504 of the camming slot 404 provides a mechanical advantage that increases significantly as the camming pin member 378 travels along the camming slot 404, particularly as the lower handle is pushed further downwardly in contrast to the generally linear relationship between travel and mechanical advantage provided by the straight angled slots described above.

In particular, the mechanical advantage provided by the curved configuration of the camming slot 404 increases as the camming pin member 378 shifts closer toward the center location 502 of the curved camming slot 404. This is particularly useful as, when the camming pin member 378 is at the center location 502 of the camming slot 404, the rail member 86 has been shifted in the lateral assembly direction slightly beyond the operable position 134 so that the rail assembly 8 is preloaded and more tightly engaged with the elongate support assembly 12. As a result, the forces acting on the camming pin member 378 increases significantly as the camming pin member 378 shifts toward the center location 502 of the camming slot 404.

However, once the camming pin member 404 shifts beyond the center location 502 of the slot 404, the forces acting on the camming pin member 378 urge the camming pin member 378 toward the closed end 498 of the camming slot 404. This rapid lowering of the insertion or input force required by the operator on the lever handle causes it to essentially "pop" into place due to release of some of the preload on the cartridge assembly 2 providing the operator tactile feedback that the cartridge assembly 2 has properly been installed in its operative position. Further, the forces acting on the camming pin member 378 in the closed end 498 of the camming slot 404 act to maintain the camming pin 378 in the closed end 498 of the camming pin slot 404 and away from the center location 502 of the camming slot 404.

As shown in FIGS. 31-33, to accommodate the downward movement of the coupler body 365, the proximal lower end 430 of the flanges 368 are configured to extend above the upper housing block 270 of the spring tensioner 20 with the rail member 86 in the operative position 134. As shown in FIG. 37, the flanges 386 can include a cut-out portion 432. As such, the flanges 368 do not interfere with the operation of the spring tensioner 20 as the flanges 368 and upper housing block 270 shift during spring tensioner 20 operation.

The curved camming slot 404 can be configured to ensure that the rail member 86 is secured in the operable position 134. To provide the desired tight engagement between the rail member 86 and the elongate support assembly 12, the rail assembly 8, elongate support assembly 12 and the insertion tool apparatus 364 are engineered to have tight precision tolerances. In particular, the camming slot 404 of the camming lugs 394, the tapered slot 414 of the camming lugs 394, the flange openings 92 of the rail member 86, and the slots 74 of the central lug mount portions 42 are configured to have tight tolerance with their respective pin or securing members. In this regard, the camming pin 378 will not properly register with the curved camming slot 404 so that it cannot be properly advanced therein and past the center location 502 thereof if debris or material has accumulated in one of the openings or slots which would prevent the rail member 86 from being in tight engagement with the elongate support assembly 12. In that case, the operator would recognize that the over-center lock could not be achieved since they would not receive the tactile feedback because the rail member 86 has been blocked from being advanced sufficiently along the support assembly 12 for the securing pin portions to properly engage in the corresponding openings therefor due to the presence of debris or other material in one or more of the slots or opening which would need to be cleaned before retrying to install the rail member 86.

Figure 51:
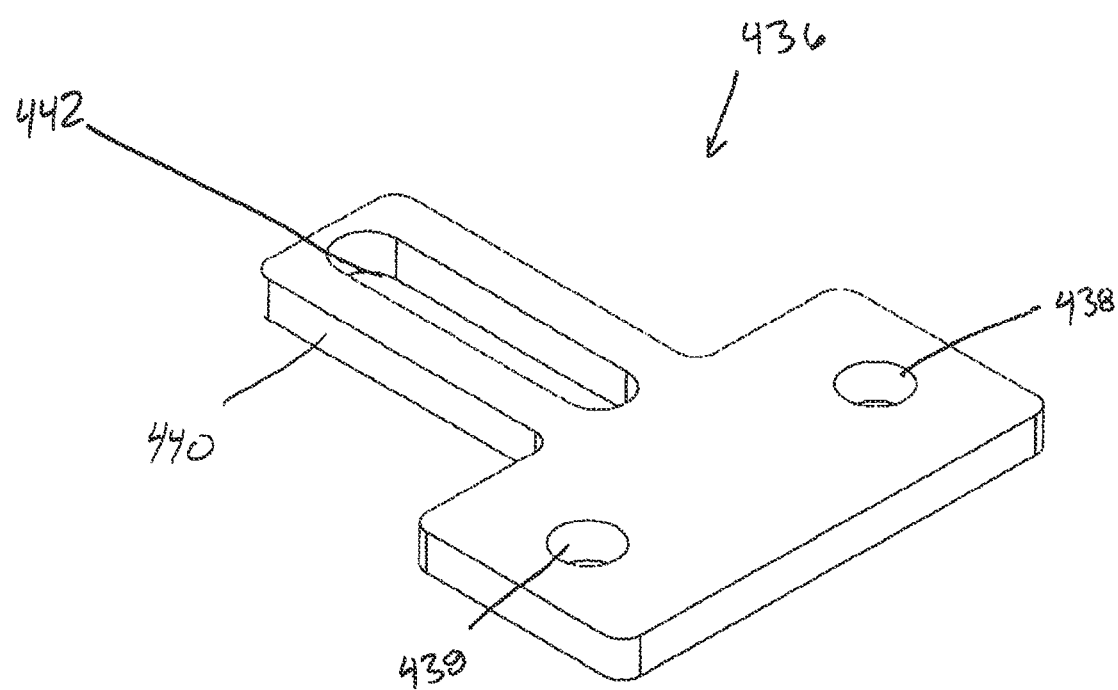
FIG. 51 is a perspective view of the T-shaped plate of the removable cartridge cleaner assembly of FIG. 1 for providing a securing location on the spring tensioner for the insertion tool.

Once in place, the insertion tool apparatus 364 can be secured or locked in place to further resist movement of the rail member 86. The insertion tool apparatus 364 can be secured out from under the conveyor belt 4 so that an operator need not reach under the conveyor belt 4. As shown in FIGS. 34 and 36, the elongate handle 366 of the tool 364 further includes a series of throughbores 434 so that the tool 364 and elongate rail 86 can be secured without requiring an operator to reach under the conveyor belt 4 or over the spring tensioner 20. As shown in FIGS. 31-33 and 51, the spring tensioner 20 can include a T-shaped plate 436 secured to the upper housing block 270 of the spring tensioner 20. More particularly, as shown in FIG. 51, the plate 436 can include a pair of apertures 438 for receiving securing mechanisms to secure the plate 436 to the upper housing block. Further, a stem 440 of the T-shaped plate 436 can include a slot 442 therein corresponding to securing throughbores 434 of the elongate tool handle 366. The handle 366 can therefore be positively secured to the T-shaped plate 436, such as by a hitch pin.

Figure 52:
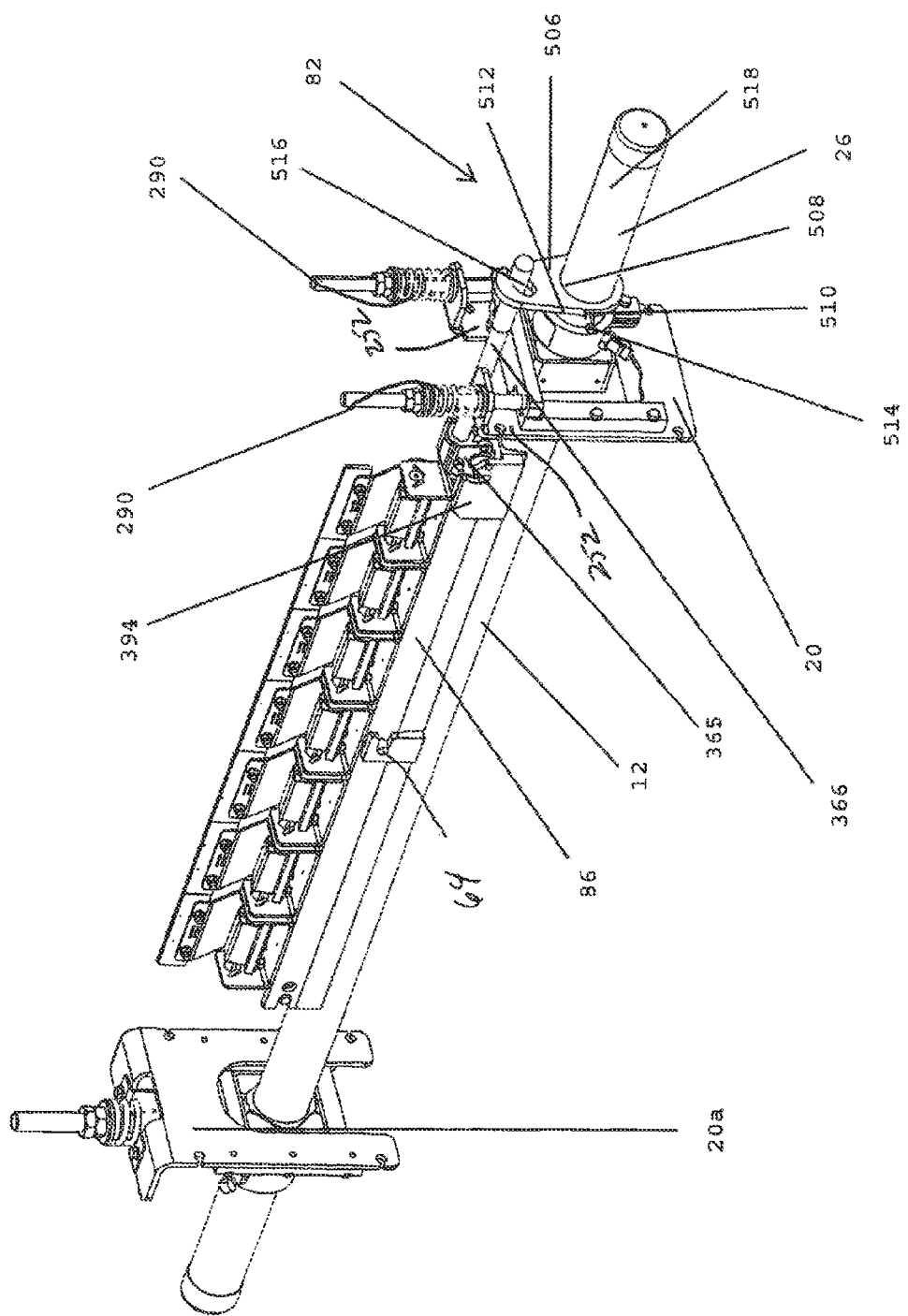
FIG. 52 is a perspective view of a removable cartridge cleaner assembly showing a securing plate fixed to the elongate support assembly and a slot of the securing plate receiving the lever handle of the alternative insertion tool device therein.

Alternatively, as shown in FIG. 52 the insertion tool apparatus 364 can include a securing or locking device 506, such as a plate, secured to the elongate support assembly 12. In particular, the plate 506 includes a circular opening 508 for receiving the elongate pole 26 of the elongate support assembly 12 therein and being rotatable thereabout. A throughbore 510 extends through a side edge 512 of the plate 506 and opens to the circular opening 508 to receive a securing member 514, such as a set screw, therein. The plate 506 includes a curved slot 516 for receiving the elongate handle portion or shaft 366 therein with the elongate handle portion or shaft 366 shifted down to its operative position. After the securing plate 506 has been rotated about the elongate pole 26 of the elongate support assembly 12 so that the handle portion 366 is received in the curved slot 516, the set screw 514 can be threaded in the throughbore 510 of the plate 506 to frictionally engage the outer surface 518 of the elongate pole 26 of the elongate support assembly 12 to fix the plate 506 against rotation about the pole 26. As such, the relative location of the handle portion or shaft 366 to the elongate support assembly 12 is fixed so that the handle portion 366 cannot shift back upwardly which could disconnect the coupler body 367 from the camming lugs 394.

In situations where it is desirable to remove the handle portion 366 from the coupler body 367 during operation of the belt cleaner assembly 2, the insertion tool apparatus 364 can be secured in the conveyor operating area such as under the conveyor belt 4. As shown in FIGS. 41-43 and 50 and described above, the camming lugs 394 and coupler body 365 can include corresponding throughbores 450 and 522 for being aligned to receive a securing member 452, such as a bolt or pin therein. To secure the coupler body 365, an operator reaches beyond the resilient mount 20 and/or under the conveyor belt 4 and inserts a securing member 452, such as a bolt or pin, through the throughbores 522 of the camming lugs 394 and throughbores 450 of the coupler body 367 and positively secures the coupler body 367 to the camming lugs 394. It is contemplated that, where applicable, the handle portion 366 can be disengaged from the coupler body 367 prior to or after the coupler body 367 is positively secured to the camming lugs 394.

To remove the elongate rail member 86, any additional securing mechanism should be removed or unsecured. If necessary, the handle portion 366 can be reconnected to the coupler body 367. With the handle portion 366 connected to the coupler body 367, an operator need not reach under the conveyor belt 4. An upward force is applied to the handle 366 to shift the camming pin 378 away from the closed end portions 498 of the camming slots 404 of the camming lugs 394 and break the insertion tool apparatus 364 and the rail assembly 8 free of any debris build-up or material bond which may have accumulated during conveyor belt operation.

As discussed above, during operation of a belt cleaner 2 the resulting dust, when mixed with water and allowed to dry, can create a cement-like bond which must be overcome to remove the elongate rail 86. While the configuration of the present invention reduces the space available for such cementing to occur, may still occur, particularly at the interface of any openings or slots and pins or other securing members. Therefore, additional force may be needed on some instances to initially break the material bond prior to shifting the elongate rail 86 along the elongate support assembly 12 away from the operable position 134 of the elongate rail 86. As such, the handle 366 acts as a lever to provide leverage so that the operator can provide an extraction force sufficient to overcome the material bond so that the operator can remove the elongate rail 86. For example, with the application of 70 pounds of force on a handle 366 having a length of 16 inches, an extraction force of about 2000 pounds can be generated with the insertion tool 362 herein. As a result, the operator can use the handle 366 to provide a sufficient extraction force to remove the elongate rail 86 without having to reach under the conveyor belt 4 and without having to use a force application tool, such as a mallet. In this manner, the insertion device 364 also can act as an efficient removal device by pivoting the handle 366 opposite to the insertion pivotal direction, e.g. upward versus downward.

Figure 53:
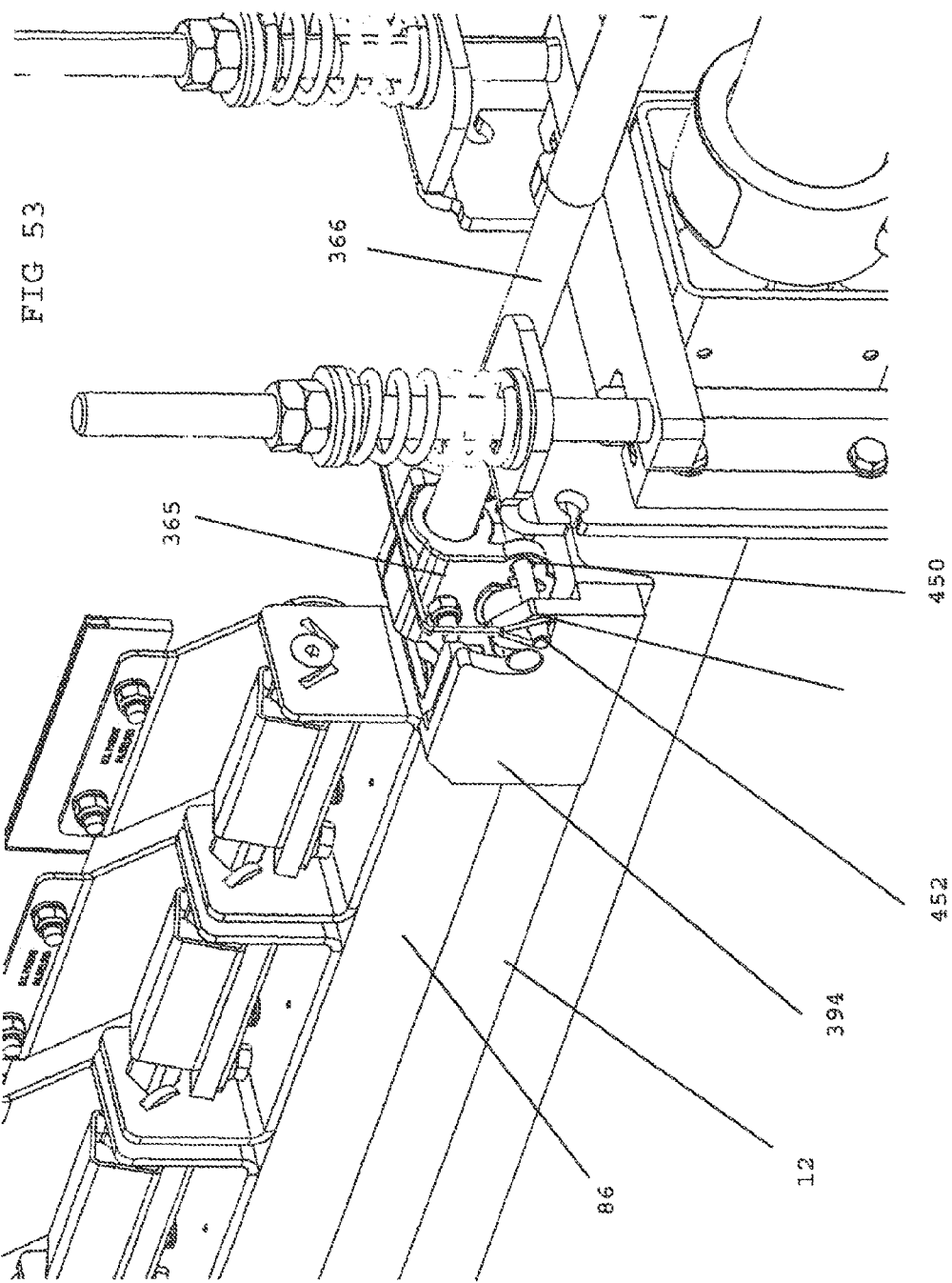
FIG. 53 is an enlarged perspective view of the insertion tool device of FIG. 52 showing a securing member inserted through throughbores of the camming lugs of the elongate support assembly and aligned throughbores of the coupler body for securing the position of the insertion tool device including the coupler relative to the elongate support assembly.

Once the elongate rail member 86 is free of any bond, the handle 366 can then be used to pull the elongate rail member 86 off of the elongate support assembly 12. In particular, force is applied to the handle 366 so that the camming pin member 378 shifts out of the camming slots 404 and the rail member 86 and insertion tool apparatus 364 shift along the upper surface 10 of the elongate support assembly 12 away from the operative position 134 of the rail member 86. With a curved camming slot 404 providing an over-center lock, as shown in FIGS. 52 and 53, the initial application of upward force on the handle 366 acts to shift the camming pin member 378 along an upper biasing surface 520 (FIGS. 49 and 50) of the camming slot 404 toward the center location 502 of the slot 404. As the camming pin member 378 travels toward the center location 502, the rail member 86 and insertion tool apparatus 364 shift along the elongate support assembly 12 in the lateral assembly direction 14 beyond the operative position 134. This distance of the travel along the elongate support assembly 12 is dependent on the configuration of the curved camming slot 404, in particular the distance the closed end 498 of the curved camming slot 404 extends away from a central location under the conveyor belt 4.

As the camming pin 378 travels toward and to the center location 502 of the curved camming slot 404, the potential energy of the camming pin member 378 increases due to the load placed thereon. Once the camming pin member 378 passes the center location 502 of the curved camming slot 404, that potential energy is released. In particular, the released potential energy, in cooperation with any force applied by an operator on the handle 366, works to break the material bond described above. As such, the rail member 86 and insertion tool apparatus 364 do not rapidly shift away from the operable position 134 once the camming pin member 378 shifts past the center location 502 of the curved camming slot 404.

Instead, the released potential energy is expended and dissipated breaking the material bond, thereby allowing for a smooth transition of the insertion tool apparatus 364 once the camming pin 378 shifts past the center location 502 of the curved camming slot 404.

Once past the center location 502 and any material bond has been broken, continued force applied on the handle allows the camming pin 378 to travel along and exit the camming slot 404. The operator can then pull the handle shaft 366 so that the rail member 86 shifts along the elongate support assembly 12 in a direction opposite the lateral assembly direction 14 away from the operative position 134 and out from under the conveyor belt.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of installing a belt cleaner assembly on an elongate support member extending below and across a conveyor belt with the elongate support member having opposite proximal and distal ends and guide members at the proximal end thereof, the belt cleaner assembly including a frame having opposite proximal and distal ends, belt cleaner blades secured to the frame, and a coupler device pivotably connected to the frame proximal end, the method comprising:
    positioning the distal end of the frame of the belt cleaner assembly under the conveyor belt;
    applying a pushing force to the proximal end of the frame of the belt cleaner assembly to cause the frame to translate along the elongate support member extending across and below the conveyor belt toward an operational position of the frame;
    pivoting the coupler device relative to the frame so that protruding portions of the coupler device are received in slots of the guide members of the elongate support member; and
    applying downward force on a handle of the coupler device to urge the protruding portions of the coupler device along the slots so that the frame pivotably connected to the coupler device shifts along the elongate support member to the operational position of the frame.

2. The method of claim 1 wherein the steps of positioning the distal end of the frame under the conveyor belt, applying the pushing force to the proximal end of the frame, pivoting the coupler device, and applying a downward force on the handle are accomplished without requiring an operator to reach under the conveyor belt.

3. The method of claim 1 wherein the slots of the guide device cooperate with the protruding portions of the coupler device to form an over-center locking mechanism.

4. The method of claim 1 including securing the coupler device against pivoting with respect to the frame with the frame in the operational position thereof to resist movement of the frame away from the operational position thereof.

5. The method of claim 4 wherein securing the coupler device includes fixing the handle in place to resist movement of the handle relative to the elongate support member.

6. The method of claim 4 wherein securing the coupler device includes positively securing the coupler device to the guide members of the elongate support member.

7. The method of claim 1 including, for removing the installed belt cleaner assembly out from under the conveyor belt, applying an upward force on the handle of the coupler device to urge the protruding portions of the coupler device out of the slots and away from the operational position of the frame; and pulling on the handle to cause the frame to translate away from the operational position of the frame along the elongate support member and out from under the belt.

* * * * *